US012586879B2

(12) United States Patent
Tada et al.

(10) Patent No.: US 12,586,879 B2
(45) **Date of Patent: *Mar. 24, 2026**

(54) DIELECTRIC RESONATOR, AND DIELECTRIC FILTER AND MULTIPLEXER USING SAME

(71) Applicant: Murata Manufacturing Co., Ltd., Nagaokakyo (JP)

(72) Inventors: Hitoshi Tada, Nagaokakyo (JP); Makoto Matsudaira, Nagaokakyo (JP); Takashi Nihei, Nagaokakyo (JP); Masashi Arai, Nagaokakyo (JP)

(73) Assignee: MURATA MANUFACTURING CO., LTD., Kyoto (JP)

( * ) Notice: Subject to any disclaimer, the term of this patent is extended or adjusted under 35 U.S.C. 154(b) by 178 days.

This patent is subject to a terminal disclaimer.

(21) Appl. No.: 18/371,589

(22) Filed: Sep. 22, 2023

(65) Prior Publication Data

US 2024/0014535 A1 Jan. 11, 2024

Related U.S. Application Data

(63) Continuation of application No. PCT/JP2022/007551, filed on Feb. 24, 2022.

(30) Foreign Application Priority Data

Mar. 29, 2021 (JP) ................................ 2021-055343

(51) Int. Cl.
*H01P 1/203* (2006.01)
*H01P 1/20* (2006.01)
(Continued)

(52) U.S. Cl.
CPC ............ *H01P 1/2002* (2013.01); *H01P 1/203* (2013.01); *H01P 1/2053* (2013.01); *H01P 3/16* (2013.01)

(58) Field of Classification Search
CPC ........ H01P 1/203; H01P 1/2053; H01P 1/202; H01P 1/205; H01P 1/20; H01P 1/201;
(Continued)

(56) References Cited

U.S. PATENT DOCUMENTS 12,368,221 B2 * 7/2025 Arai .......................... H01P 3/16
2001/0020880 A1 9/2001 Muzutani et al.
(Continued)

FOREIGN PATENT DOCUMENTS

JP 61-140604 U 8/1986
JP 63-23803 U 2/1988
(Continued)

OTHER PUBLICATIONS

Official Communication issued in International Patent Application No. PCT/JP2022/007551, mailed on May 24, 2022.
(Continued)

*Primary Examiner* — Stephen E. Jones
(74) *Attorney, Agent, or Firm* — Keating & Bennett, LLP

(57) ABSTRACT

A filter includes a multilayer body, plate electrodes, resonators, shield conductors, and connecting conductors. The multilayer body includes dielectric layers. The plate electrodes are spaced apart from one another in the multilayer body in a lamination direction thereof. The resonators are between the plate electrodes and extend in a first direction orthogonal or substantially orthogonal to the lamination direction. The shield conductors are on lateral surfaces of the multilayer body and are connected to the plate electrodes. The connecting conductors connect the resonators to the plate electrodes. The resonators are side by side in a second direction in the multilayer body. The resonators each include first and second ends. The first ends are connected to the shield conductor, and the second ends are spaced away from the shield conductor.

33 Claims, 33 Drawing Sheets

(51) Int. Cl.
*H01P 1/205* (2006.01)
*H01P 3/16* (2006.01)

(58) Field of Classification Search
CPC .... H01P 3/08; H01P 3/088; H01P 7/04; H01P 7/08; H01P 7/084
See application file for complete search history.

(56) References Cited

U.S. PATENT DOCUMENTS

| | | | | |
|---|---|---|---|---|
| 2004/0212460 | A1 | 10/2004 | Harada | |
| 2005/0134408 | A1 | 6/2005 | Hirabayashi | |
| 2022/0052430 | A1* | 2/2022 | Chou | H01P 1/2053 |

FOREIGN PATENT DOCUMENTS

| | | | |
|---|---|---|---|
| JP | S63190402 | A | 8/1988 |
| JP | 63-311801 | A | 12/1988 |
| JP | 3-98506 | U | 10/1991 |
| JP | 04-43703 | A | 2/1992 |
| JP | 05-299913 | A | 11/1993 |
| JP | 11-17404 | A | 1/1999 |
| JP | 11-27013 | A | 1/1999 |
| JP | 2000-252704 | A | 9/2000 |
| JP | 2001044706 | A | 2/2001 |
| JP | 2001-060809 | A | 3/2001 |
| JP | 2001-211005 | A | 8/2001 |
| JP | 2001-230610 | A | 8/2001 |
| JP | 2004-328118 | A | 11/2004 |
| JP | 2007-158440 | A | 6/2007 |

OTHER PUBLICATIONS

Arai et al., “Dielectric Filter”, U.S. Appl. No. 18/370,686, filed Sep. 20, 2023.
Arai et al., “Dielectric Filter”, U.S. Appl. No. 18/475,560, filed Sep. 27, 2023.

* cited by examiner

DIELECTRIC RESONATOR, AND DIELECTRIC FILTER AND MULTIPLEXER USING SAME

CROSS REFERENCE TO RELATED APPLICATIONS

This application claims the benefit of priority to Japanese Patent Application No. 2021-055343 filed on Mar. 29, 2021 and is a Continuation Application of PCT Application No. PCT/JP2022/007551 filed on Feb. 24, 2022. The entire contents of each application are hereby incorporated herein by reference.

BACKGROUND OF THE INVENTION

1. Field of the Invention

This disclosure relates to a dielectric resonator, and a dielectric filter and a multiplexer including the dielectric resonator, and more particularly to technologies to improve characteristics of the dielectric filter.

2. Description of the Related Art

Japanese Patent Laid-Open No. H04-43703 describes a stripline resonator (dielectric resonator). The stripline resonator described in Japanese Patent Laid-Open No. H04-43703 has a plurality of strip conductors between ground conductors facing each other in the dielectric material. Such a structural feature may advantageously ensure an adequate effective area in cross section without any substantial increase of the strip conductors, affording a reduction of conductor loss. As a result, smaller resonators with higher Q values can be provided.

The resonance frequency of a dielectric resonator is defined by the length of the strip conductor. In the dielectric resonator described in Japanese Patent Laid-Open No. H04-43703, a plurality of strip conductors are disposed between the ground conductors. Any variability in length between the strip conductors may lead to variability of the resonance frequency among the produced dielectric resonators, resulting in failure to achieve desired filtering characteristics.

SUMMARY OF THE INVENTION

Preferred embodiments of the present invention provide dielectric resonators that are each able to reduce variabilities of a passband and of a resonance frequency, and dielectric filters and multiplexers including such dielectric resonators.

A filter according to a preferred embodiment of the present invention includes a multilayer body with a cuboidal shape, a first plate electrode, a second plate electrode, a plurality of resonators, a first shield conductor, a second shield conductor, and a first connecting conductor. The multilayer body includes a plurality of dielectric layers. The first plate electrode and the second plate electrode are spaced apart from each other in the multilayer body in a lamination direction thereof. The plurality of resonators are between the first plate electrode and the second plate electrode and extend in a first direction orthogonal or substantially orthogonal to the lamination direction. In the multilayer body, the first shield conductor and the second shield conductor are respectively located on a first lateral surface and a second lateral surface that are orthogonal or substantially orthogonal to the first direction. The first and second shield conductors are connected to the first plate electrode and the second plate electrode. The first connecting conductor connects a first resonator included in the plurality of resonators to the first plate electrode and the second plate electrode. In the multilayer body, the plurality of resonators are side by side in a second direction orthogonal or substantially orthogonal to the lamination direction and the first direction. The plurality of resonators each include a first end and a second end. The first ends are connected to the first shield conductor, and the second ends are spaced away from the second shield conductor.

A dielectric resonator according to a preferred embodiment of the present invention includes a multilayer body with a cuboidal shape, a first plate electrode, a second plate electrode, a distributed parameter resonator, a first shield conductor, a second shield conductor, and a connecting conductor. The first plate electrode and the second plate electrode are spaced apart from one another in the multilayer body in a lamination direction thereof. The distributed parameter resonator is provided between the first plate electrode and the second plate electrode and extends in a first direction orthogonal or substantially orthogonal to the lamination direction. In the multilayer body, the first shield conductor and the second shield conductor are respectively located on a first lateral surface and a second lateral surface that are orthogonal or substantially orthogonal to the first direction. The first and second shield conductors are connected to the first plate electrode and the second plate electrode. The connecting conductor connects the distributed parameter resonator to the first plate electrode and the second plate electrode. The distributed parameter resonator includes a first end and a second end. The first end is connected to the first shield conductor, and the second end is spaced away from the second shield conductor.

In the dielectric resonators and dielectric filters disclosed herein, one end of each resonator (distributed parameter resonator) of the dielectric filter is connected to the first shield conductor provided on a lateral surface of the multilayer body, and the resonators are connected to the first plate electrode and the second plate electrode by the connecting conductor (first connecting conductor). These structural features may reduce possible processing variability during manufacturing, resulting in less variabilities of a passband of each of the dielectric filters and of a resonance frequency of each of the dielectric resonators.

The above and other elements, features, steps, characteristics and advantages of the present invention will become more apparent from the following detailed description of the preferred embodiments with reference to the attached drawings.

DETAILED DESCRIPTION OF THE PREFERRED EMBODIMENTS

Figure 1:
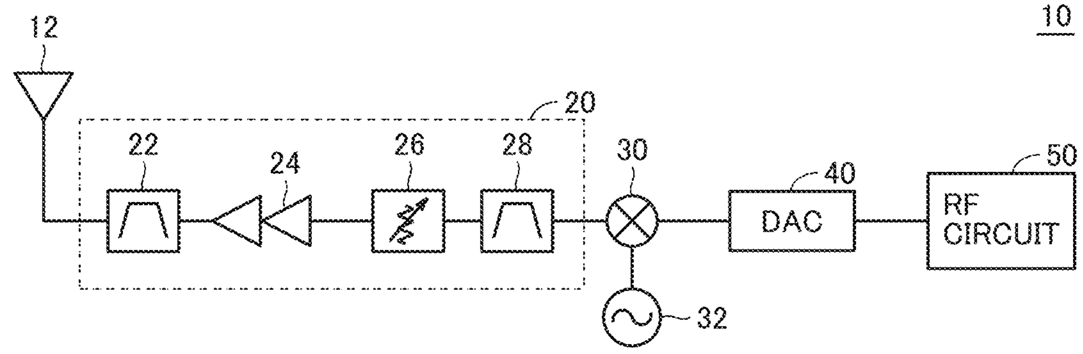
FIG. 1 is a block diagram of a communication apparatus including a radio frequency front-end circuit to which a filtering device according to a first preferred embodiment of the present invention is applicable.

Preferred embodiments of the present invention and modifications or combinations thereof are hereinafter described in detail referring to the accompanying drawings. The same or similar components and units in the drawings are denoted by the same reference signs, and redundant description thereof will basically be omitted.

First Preferred Embodiment

Basic Configuration of Communication Apparatus

FIG. 1 is a block diagram of a communication apparatus 10 including a radio frequency front-end circuit 20 to which a filtering device according to a first preferred embodiment of the present invention is applicable. Examples of communication apparatus 10 may include, for example, mobile terminals, typically smartphones, and base stations for mobile telephones.

With reference to FIG. 1, communication apparatus 10 includes an antenna 12, a radio frequency front-end circuit 20, a mixer 30, a local oscillator 32, a D/A converter (DAC) 40, and an RF circuit 50. Radio frequency front-end circuit 20 includes bandpass filters 22 and 28, an amplifier 24, and an attenuator 26. In the example described below referring to FIG. 1, radio frequency front-end circuit 20 includes a transmission circuit that transmits radio frequency signals through antenna 12. In addition, radio frequency front-end circuit 20 may include a reception circuit that receives radio frequency signals through antenna 12.

Communication apparatus 10 up-converts a signal transmitted from RF circuit 50 into a radio frequency signal and outputs the resulting signal through antenna 12. The modulated digital signal output from RF circuit 50 is then converted by D/A converter 40 into an analog signal. Mixer 30 mixes the analog signal obtained by D/A converter 40 with an oscillation signal from local oscillator 32 to up-convert the resulting signal into a radio frequency signal. Bandpass filter 28 removes any unwanted wave generated by the up-conversion and thus extracts signal components within a desired frequency band alone. Attenuator 26 adjusts the intensity of signals. Amplifier 24 amplifies the signal passing through attenuator 26 to a predefined power level. Bandpass filter 22 removes any unwanted wave generated during the amplification and lets through signal components having frequencies within a frequency band specified by the communication standards alone. The signal passing through bandpass filter 22 is emitted through antenna 12 as a transmission signal.

The filtering device configured as disclosed herein may be used as bandpass filter 22, 28 of communication apparatus 10 described above.

Filtering Device

A filtering device 100 according to the first preferred embodiment is hereinafter described in detail with reference to FIGS. 2 to 4. Filtering device 100 is a dielectric filter including a plurality of resonators, each of which defines and functions as a distributed parameter element.

Figure 2:
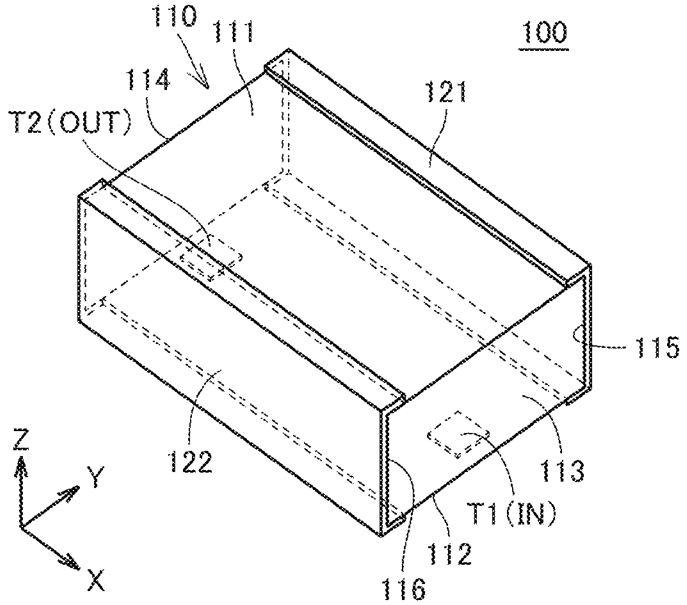
FIG. 2 is an external perspective view of the filtering device according to the first preferred embodiment of the present invention.

FIG. 2 is an external perspective view of filtering device 100. FIG. 2 shows structural features of filtering device 100 only visible from its outer surface side, but does not show its internal structure. FIG. 3 is a transparent perspective view that illustrates the internal structure of filtering device 100. FIG. 4 is a cross-sectional view of filtering device 100. FIG. 4 is a cross-sectional view of a resonator defining filtering device 100 in a direction along Y axis.

With reference to FIG. 2, filtering device 100 includes a cuboidal or substantially cuboidal multilayer body 110 including a plurality of dielectric layers arranged in the lamination direction. Multilayer body 110 has an upper surface 111, a lower surface 112, a lateral surface 113, a lateral surface 114, a lateral surface 115, and a lateral surface 116. Lateral surface 113 is a lateral surface in the positive direction of X axis, while lateral surface 114 is a lateral surface in the negative direction of X axis. Lateral surfaces 115 and 116 are perpendicular or substantially orthogonal to the Y-axis direction.

The dielectric layers of multilayer body 110 are each made of a resin or ceramics, for example, low temperature co-fired ceramics (LTCC). In the multilayer body 110, a plurality of flat conductors in the dielectric layers and a plurality of vias between the dielectric layers provide the distributed parameter elements defining the resonators and capacitors and inductors to couple the distributed parameter elements. The "via" described herein refers to a conductor extending in the lamination direction and connecting electrodes disposed in different ones of the dielectric layers. The via may be made using, for example, a conductive paste, a metallic pin and/or plating.

In the description below, "Z-axis direction" refers to the lamination direction of multilayer body 110, "X-axis direction" refers to a direction along the long sides of multilayer body 110 and perpendicular or substantially perpendicular to the Z-axis direction (second direction), and "Y-axis direction" refers to a direction along the short sides of multilayer body 110 (first direction). In the description below, "upper side" and "lower side" may respectively refer to the positive direction of Z axis and the negative direction of Z axis in the drawings.

As illustrated in FIG. 2, filtering device 100 includes shield conductors 121 and 122 that cover lateral surfaces 115 and 116 of multilayer body 110. Shield conductors 121 and 122 each have a C shape when viewed from the X-axis direction of multilayer body 110. Shield conductors 121 and 122 cover a portion of upper surface 111 and a portion of lower surface 112 of multilayer body 110. Portions of shield conductors 121 and 122 on lower surface 112 of multilayer body 110 are connected, with connecting members such as solder bumps, for example, to ground electrodes on a mounting substrate not illustrated in the drawings. Thus, shield conductors 121 and 122 also functionally operate as ground terminals.

Filtering device 100 includes an input terminal T1 and an output terminal T2 on lower surface 112 of multilayer body 110. Input terminal T1 is disposed at a position on lower surface 112 closer to lateral surface 113 in the positive direction of X axis. Output terminal T2 is disposed at a position on lower surface 112 closer to lateral surface 114 in the negative direction of X axis. Input terminal T1 and output terminal T2 are connected, with connecting members, for example, solder bumps, to corresponding ones of the electrodes on the mounting substrate.

Next, the internal structure of filtering device 100 is hereinafter described with reference to FIG. 3. Filtering device 100 includes, in addition to the configuration illustrated in FIG. 2, plate electrodes 130 and 135, a plurality of resonators 141 to 145, connecting conductors 151 to 155 and 171 to 175, and capacitor electrodes 161 to 165. In the description hereinafter provided, resonators 141 to 145 and connecting conductors 151 to 155 and 171 to 175 may be collectively referred to as "resonator(s) 140", "connecting conductor(s) 150", and "connecting conductor(s) 170", respectively.

Plate electrodes 130 and 135 face each other at positions spaced apart in the lamination direction (Z-axis direction) in multilayer body 110. Plate electrode 130 is disposed in a dielectric layer close to upper surface 111 and is connected to shield conductors 121 and 122 at ends of the multilayer body 110 along the X axis. In plan view from the lamination direction, plate electrode 130 covers or substantially covers the dielectric layers.

Plate electrode 135 is disposed in a dielectric layer close to lower surface 112. In plan view from the lamination direction, plate electrode 135 has an H shape including cutouts provided in portions corresponding to input terminal T1 and output terminal T2. Plate electrode 135 is connected to shield conductors 121 and 122 at ends of the multilayer body 110 along the X axis.

In multilayer body 110, resonators 141 to 145 are disposed between plate electrodes 130 and 135. Resonators 141 to 145 each extend in the Y-axis direction. Ends of resonators 141 to 145 in the positive direction of Y axis (first ends) are connected to a shield conductor 121. Ends of resonators 141 to 145 in the negative direction of Y axis (second ends) are spaced away from a shield conductor 122.

Resonators 141 to 145 are arranged side by side in the X-axis direction of multilayer body 110 of filtering device 100. Specifically, resonators 141, 142, 143, 144 and 145 are disposed in this order from the positive direction toward the negative direction of X axis.

Resonators 141 to 145 each include a plurality of conductors provided in the lamination direction. The plurality of conductors define an oval or substantially oval shape as a whole in cross section parallel or substantially parallel to Z-X plane of each resonator. In other words, uppermost and lowermost ones of the conductors have a dimension in the X-axis direction (first width) smaller than the dimension of a near-center conductor(s) in the X-axis direction (second width). Conventionally, radio frequency electric current is known to mostly flow around ends of a conductor because of the cut-edge effect. In case a plurality of conductors have, as a whole, a rectangular or substantially rectangular shape in cross section, therefore, electric current tends to concentrate on angular portions (i.e., ends of uppermost and lowermost electrodes). The oval or substantially oval shape in cross section of the plurality of conductors may avoid or reduce such concentration of electric current.

Figure 4:
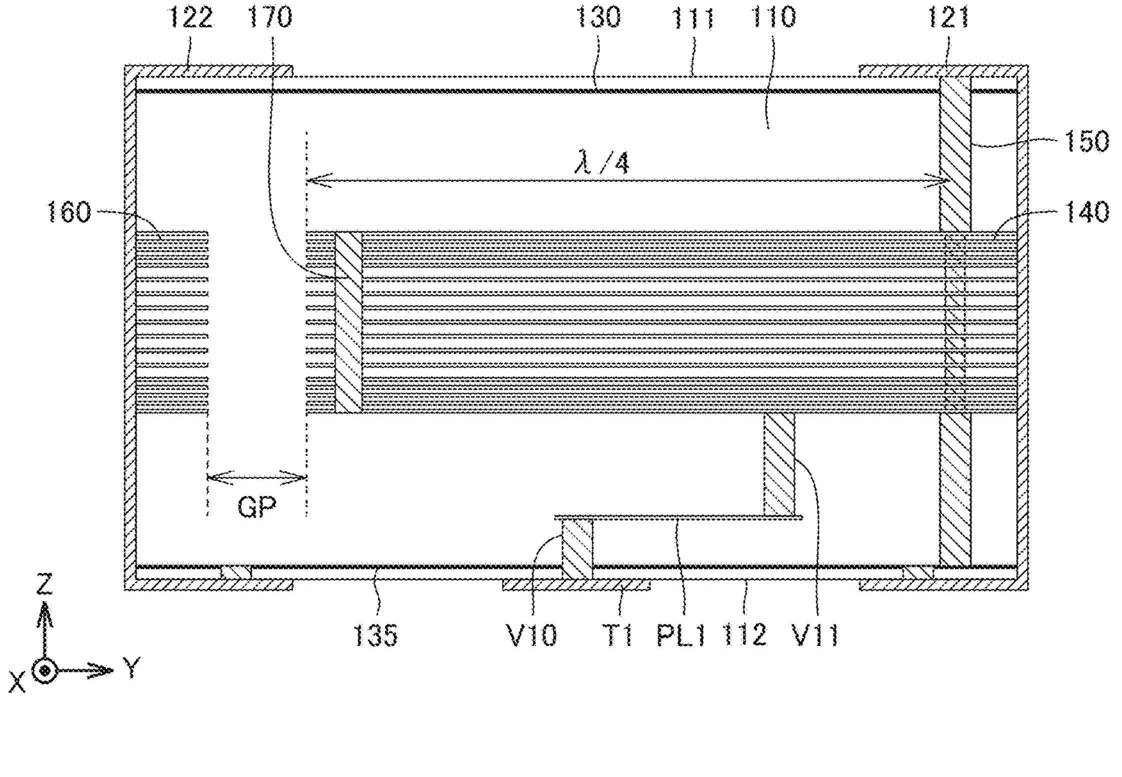
FIG. 4 is a cross-sectional view of the filtering device according to the first preferred embodiment of the present invention.

As illustrated in FIG. 4, resonators 140 are connected to plate electrodes 130 and 135 through connecting conductors 150 at positions near the first ends. In filtering device 100, connecting conductors 150 each extend from plate electrode 130 as far as plate electrode 135 through the plurality of conductors of a corresponding one of the resonators. The connecting conductors are each electrically connected to the plurality of conductors defining a corresponding one of a plurality of resonators.

In resonators 140, a plurality of conductors defining each resonator are electrically interconnected through connecting conductor 170 at a position near the second end. Assuming that A is the wavelength of a transmitted radio frequency signal, each resonator is designed such that a distance between the second end and connecting conductor 150 is approximately λ/4, for example.

Resonator 140 defines and functions as a distributed parameter TEM-mode resonator including a plurality of conductors as center conductors and plate electrodes 130 and 135 as outer conductors.

Resonator 141 is connected to input terminal T1 through vias V10 and V11 and a plate electrode PL1. In FIG. 3, resonator 145, although hidden from view, is connected to output terminal T2 through vias and a plate electrode. Resonators 141 to 145 are magnetically coupled to one another. A radio frequency signal input to input terminal T1 is transmitted to these resonators 141 to 145 and then outputted from output terminal T2. At the time, filtering device 100 defines and functions as a bandpass filter depending on the degree of coupling between the resonators.

On one side of resonator 140 closer to the second end, a capacitor electrode that protrudes between this resonator and another resonator adjacent thereto is provided. The capacitor electrode is structured such that at least a portion of the plurality of conductors defining the resonator protrudes outward. The degree of capacitive coupling between the resonators may be adjustable by the length in the Y-axis direction and distance to the adjacent resonator of the capacitor electrode and/or the number of conductors defining the capacitor electrode.

Figure 3:
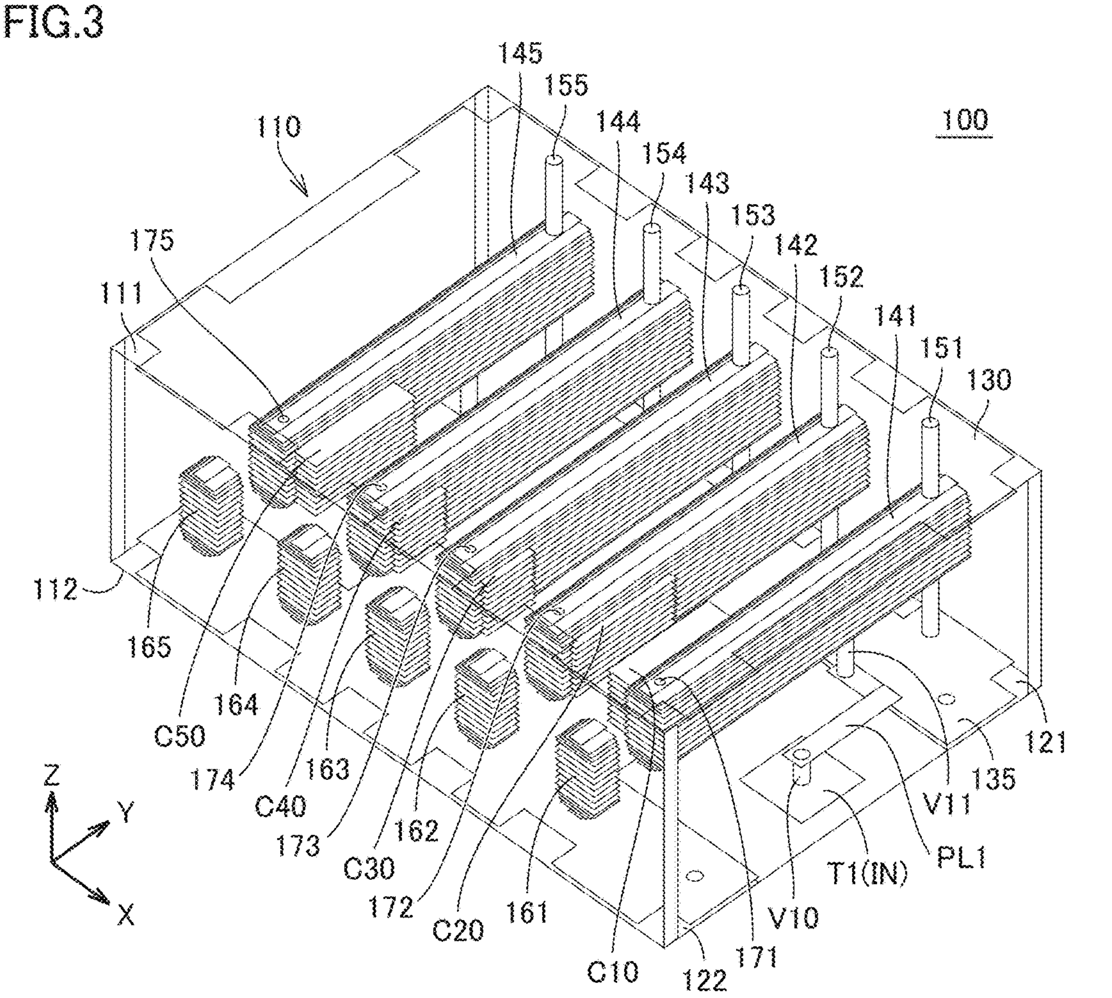
FIG. 3 is a transparent perspective view that illustrates the internal structure of the filtering device according to the first preferred embodiment of the present invention.

In filtering device 100, a capacitor electrode C10 protrudes from resonator 141 toward resonator 142, while a capacitor electrode C20 is disposed so as to protrude from resonator 142 toward resonator 141 as illustrated in FIG. 3. Further, a capacitor electrode C30 protrudes from resonator 143 toward resonator 142, while a capacitor electrode C40 protrudes from resonator 144 toward resonator 143. Also, a capacitor electrode C50 protrudes from resonator 145 toward resonator 144.

Capacitor electrodes C10 to C50 may not be provided. If a desired degree of inter-resonator coupling is achievable, some or all of capacitor electrodes C10 to C50 can be removed. In addition to the configuration illustrated in FIG. 3, the filtering device may further include other capacitor electrodes, for example, a capacitor electrode protruding from resonator 142 toward resonator 143, a capacitor electrode protruding from resonator 143 toward resonator 144, and a capacitor electrode protruding from resonator 144 toward resonator 145.

In addition, in filtering device 100, capacitor electrodes 160 are disposed so as to face the second ends of resonators 140. The shapes of capacitor electrodes 160 in cross section parallel or substantially parallel to a Z-X plane are the same as or similar to those of resonators 140. Capacitor electrodes 160 are connected to shield conductor 122. Each resonator 140 and a corresponding one of capacitor electrodes 160 define a capacitor. The pieces of capacitance of the capacitors each including resonator 140 and capacitor electrode 160 may be adjustable by adjusting a gap GP between the resonator and the capacitor electrode (distance in the Y-axis direction) illustrated in FIG. 4.

In a resonator including a distributed parameter element as described above, a resonance frequency of the resonator may be generally defined by the resonator's length (dimension in the Y-axis direction). In the case of a resonator including plurality of conductors disposed along the lamination direction, as illustrated in FIG. 3, the resonator's resonance frequency may possibly be affected by the dimensional accuracy of the conductors in manufacturing of each conductor and the positional accuracy of the conductors.

The plurality of conductors of the resonators are each manufactured as follows: sheets of an electrically conductive film or a dielectric sheet with the thin film bonded are stacked in layers and cut into pieces of a chip size by a cutting device, such as, for example, a dicer or a laser. The manufacture of these conductors, however, may involve the risk that the electrically conductive sheets or dielectric sheets are overlaid askew or displaced during the cutting process. In a filtering device with the frequency band of around 6 GHz, for example, such a dimensional error of about 40 μm may cause the frequency variation of about 100 MHz, for example.

In filtering device 100 according to the first preferred embodiment, on the other hand, connecting conductors 150 are connected to ends of the conductors of the resonators closer to shield conductor 121, and the connecting conductors 150 are connected to plate electrodes 130 and 135. As a result of these structural features, end surfaces for electrical short circuit of the resonators (ground potential) may be located near connecting conductors 150. Thus, connecting conductors 150 have an advantage in reducing resonance frequency variability in the resonators, as compared with any resonator not including connecting conductor 150.

In filtering device 100 according to the first preferred embodiment, connecting conductors 170 are disposed near open ends of the resonators closer to shield conductor 122. The conductors of each resonator are connected to each other with connecting conductor 170. Thus, resonators 141 to 145 may be consistent in phase, thus operating as one resonator.

Figure 5:
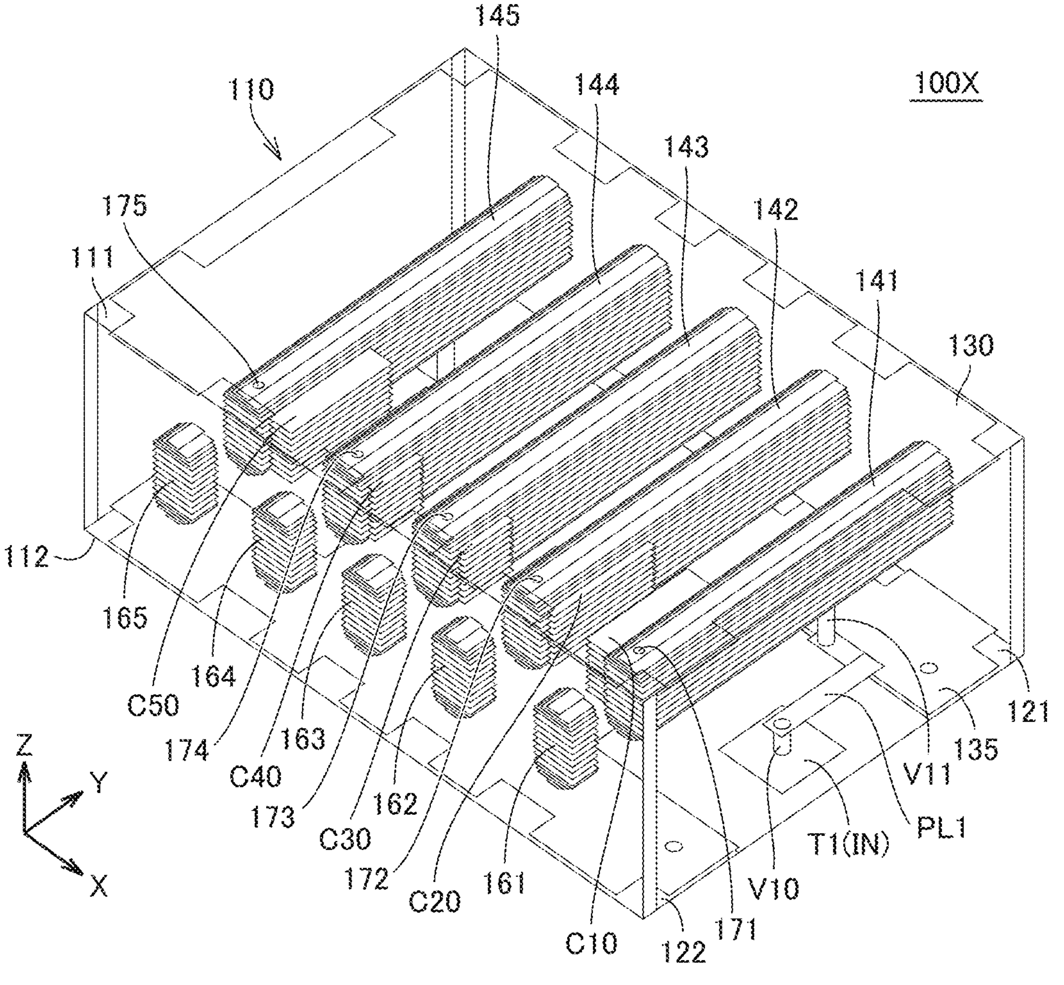
FIG. 5 is a perspective view that illustrates the internal structure of a filtering device according to a comparative example.

The variability of the passband characteristics of the filtering device will be described with reference to FIGS. 5 and 6 depending on the presence or absence of connecting conductors 150. FIG. 5 is a perspective view that illustrates the internal structure of a filtering device 100X according to a comparative example. Filtering device 100X may be the same or substantially the same as the filtering device 100 except that this filtering device does not include connecting conductors 151 to 155 of filtering device 100 illustrated in FIG. 3. Any other structural elements of filtering device 100X the same as or similar to those of filtering device 100 will not be described again.

Figure 6:
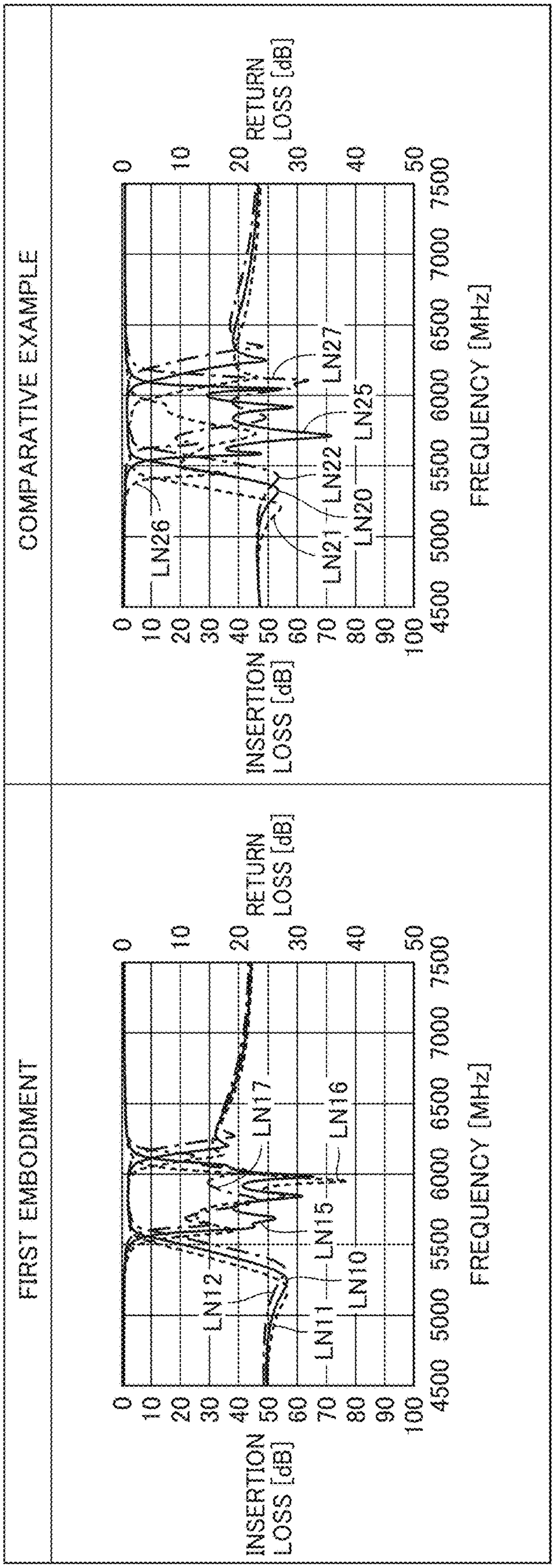
FIG. 6 is a graph showing variability of passband characteristics in the filtering devices of the first preferred embodiment of the present invention and of the comparative example.

FIG. 6 shows a passband characteristics simulation result of three filtering devices (first filter, second filter, third filter) including resonators that differ in electrode length, comparing two cases, in one of which the structure of the first preferred embodiment (left drawing) is provided, in the other of which the structure of the comparative example (right drawing) is provided. FIG. 6 is a graph showing variability of passband characteristics in filtering device 100 of the first preferred embodiment and filtering device 100X of the comparative example. In FIG. 6, insertion loss in the first filter is illustrated with solid lines LN10 and LN20, while return loss in this filter is illustrated with solid lines LN15 and LN25. Further, insertion loss in the second filter is illustrated with broken lines LN11 and LN21, while return loss in this filter is illustrated with broken lines LN16 and LN26. Also, insertion loss in the third filter is illustrated with dashed-and-dotted lines LN12 and LN22, while return loss in this filter is illustrated with dashed-and-dotted lines LN17 and LN27.

As illustrated in FIG. 6, variability of passband characteristics among these three filtering devices is reduced in the structure of filtering device 100 of the first preferred embodiment including connecting conductors 150 than in the structure of the comparative example.

In filtering device 100 according to the first preferred embodiment, connecting conductors 150 connected to plate electrodes 130 and 135 are connected to the end sides, which are connected to shield conductor 121, of the distributed parameter elements defining the resonators. This structural feature may successfully reduce resonance frequency variability in the resonators and also passband variability in the filtering device.

The "plate electrode 130" and "plate electrode 135" according to the first preferred embodiment respectively correspond to the "first plate electrode" and "second plate electrode". The "lateral surface 115" and "lateral surface 116" according to the first preferred embodiment respectively correspond to the "first lateral surface" and "second lateral surface". The "shield conductor 121" and "shield conductor 122" according to the first preferred embodiment respectively correspond to the "first shield conductor" and "second shield conductor". The "Y-axis direction" and "X-axis direction" according to the first preferred embodiment respectively correspond to the "first direction" and "second direction". The "connecting conductors 150 (151 to 155)" according to the first preferred embodiment correspond to the "first connecting conductor". The "connecting conductors 170 (171 to 175)" according to the first preferred embodiment correspond to the "second connecting conductor".

Variation of Connecting Conductor

A detailed configuration of connecting conductors 150 and 170 are described below with reference to FIGS. 7 to 9. The description with reference to FIGS. 7 to 9 focuses on connecting conductors 150.

Figure 7:
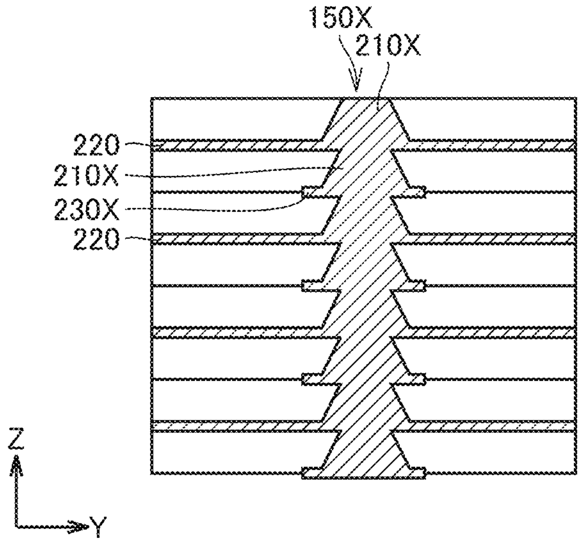
FIG. 7 is a cross-sectional view of a connecting conductor according to the comparative example.
Figure 8A:
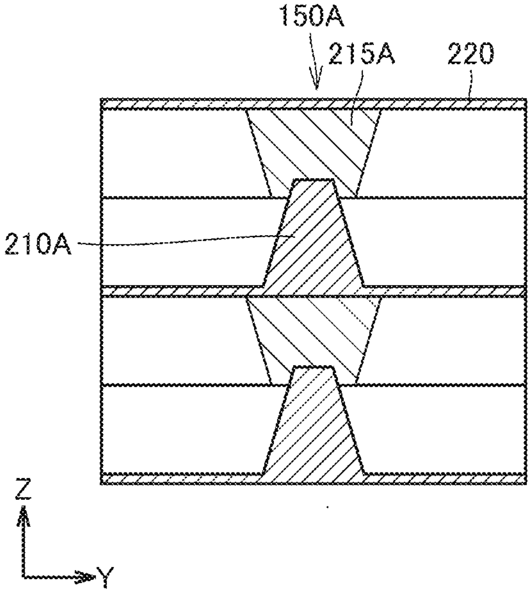
FIGS. 8A and 8B are cross-sectional views that illustrate a first example and a second example of the connecting conductor in the filtering device according to the first preferred embodiment of the present invention.
Figure 8B:
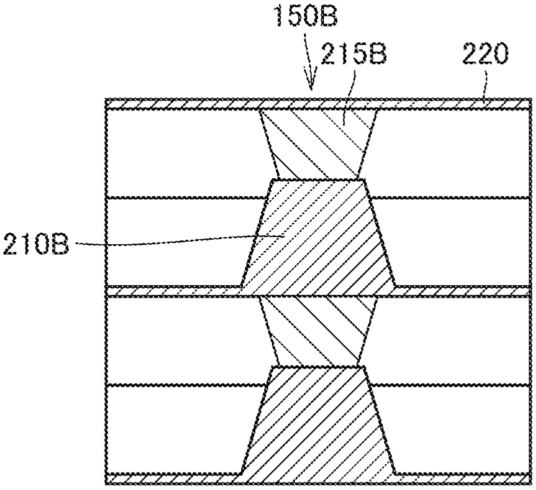

FIG. 7 is a cross-sectional view of a connecting conductor 150X according to the comparative example. FIGS. 8A and 8B are cross-sectional views of a first example (FIG. 8A) and a second example (FIG. 8B) of the configuration of the connecting conductor in filtering device 100 according to the first preferred embodiment. FIG. 9 is a cross-sectional view of a third example of the connecting conductor in filtering device 100 according to the first preferred embodiment.

With reference to FIG. 7, connecting conductor 150X of the comparative example has a structure in which a plurality of trapezoidal via conductors 210X each including a bottom surface in the negative direction of Z axis are connected in series along the lamination direction. In FIG. 7 and FIGS. 8A, 8B, and 9 described later, electrodes 220 define a plurality of conductors of the distributed parameter elements of the resonator. In the dielectric layers where electrodes 220 are provided, via conductors 210X adjacently disposed in the lamination direction are connected in series through electrode 220. In the dielectric layer where no electrode 220 is provided, adjacent ones of via conductors 210X are connected in series to each other through pad electrode 230X.

In a case in which the conductor defining the connecting conductor has a cylindrical or substantially cylindrical shape, the connecting conductor's aspect ratio may increase, making it difficult to adequately fill via holes with an electrically conductive paste which will define the connecting conductor. For this reason, vias provided in a multilayer body may typically be structured as illustrated in FIG. 7.

Connecting conductor 150X of the comparative example illustrated in FIG. 7 is serrated in cross section. Typically, radio frequency electric current are known to flow around ends of a conductor because of the cut-edge effect. In the case of connecting conductor 150X of the comparative example illustrated in FIG. 7, radio frequency electric current may have to pass through a longer current path than in a conductor having a cylindrical or substantially cylindrical cross section. This may possibly increase power loss due to such a longer passage of electric current.

When a plurality of via conductors 210X are continuously connected in the lamination direction, the dielectric material around these via conductors 210X may be difficult to shrink during the formation of the multilayer body, and the portion of via conductors 210X may bulge more upward than adjacent the dielectric material on the surface of the multilayer body due to the differences of thermal expansion coefficients. This may increase the likelihood of a structural defects, for example, cracks between the dielectric material and conductors and/or poor flatness of the multilayer body's surface. In particular, the structure illustrated in FIG. 7 is likely to suffer from cracks due to stress concentration, because via conductors 210X are connected through sharp angles on the lower surface side of pad electrode 230X and electrode 220.

In the connecting conductor according to the first preferred embodiment, the connecting conductor includes two different conductive materials, and adjacent ones of the conductors are tapered in directions opposite to each other, as illustrated in FIGS. 8A and 8B.

More specifically, a connecting conductor 150A of the first example illustrated in FIG. 8A includes via conductors 210A and 215A that are alternately connected in series to each other. Via conductor 210A is structured using the same material as that of electrode 220. Via conductor 215A has a smaller value of the Young's modulus than that of via conductor 210A and is thus more easily deformable.

Via conductor 210A is tapered so as to be diametrically smaller in the positive direction of Z axis (forward taper), while via conductor 215A is tapered so as to be diametrically smaller in the negative direction of Z axis (reverse taper). In connected portions of via conductor 210A and via conductor 215A, via conductor 210A is smaller in dimension than via conductor 215A.

Thus, via conductor 210A tapered forward and via conductor 215A tapered reversely are alternately arranged, so that any gap in height may be reduced where the conductors are connected. This may reduce a length of an electric current path on the surface of connecting conductor 150A, successfully reducing any loss associated with the passage of electric current. Another advantage is less stress concentration in the conductors, which may reduce the risk of cracks being generated between the dielectric material and conductors.

The Young's modulus of via conductor 215A smaller than that of via conductor 210A may enable via conductor 215A to deform in part and define and function as a cushioning material. As a result, any difference in dimension to the dielectric material nearby in the lamination direction may decrease, as compared with the structure using via conductors 210A alone. This may reduce adverse impact on the degree of flatness of the multilayer body's surface. In connected portions of the conductors, via conductor 210A with a greater value of the Young's modulus is smaller in dimension than via conductor 215A. This may be another advantage because via conductor 210A may be more easily inserted into via conductor 215A, resulting in better control of dimensional variability in the lamination direction. Any difference in dimension to the dielectric material nearby in the lamination direction may be effectively reduced.

In connecting conductor 150B of the second example illustrated in FIG. 8B, via conductor 210B and via conductor 215B with different values of the Young's modulus are alternately connected such that these conductors are tapered in opposite directions, as in the case of connecting conductor 150A. In connected portions of the conductors, via conductor 210B with a greater value of the Young's modulus has a larger dimension than via conductor 215B. In this instance, the degree of insertion of via conductor 210B into via conductor 215B becomes smaller than in connecting conductor 150A, which may slightly increase a difference in dimension to the dielectric material nearby in the lamination direction. Yet, a greater contact area between the conductors may successfully decrease any stress and contact resistance acting on the conductors. As a result, such a configuration can prevent structural faults, such as cracks, and a decrease in Q value.

Figure 9:
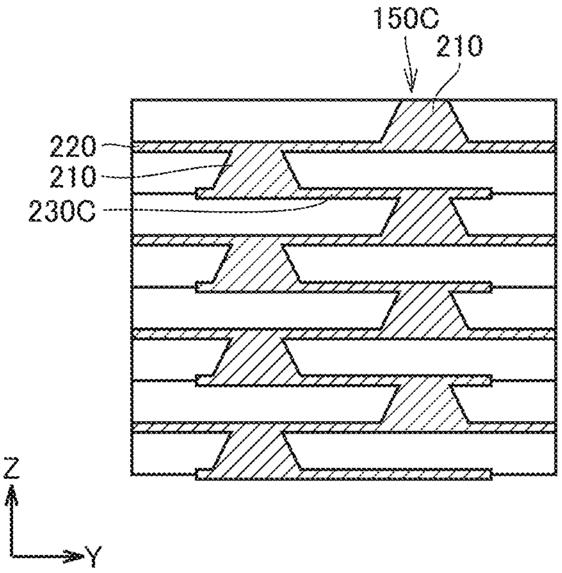
FIG. 9 is a cross-sectional view that illustrates a third example of the connecting conductor in the filtering device according to the first preferred embodiment of the present invention.

In connecting conductor 150C of the third example illustrated in FIG. 9, a plurality of via conductors 210 connecting conductor 150C are disposed in zigzag arrangement in the lamination direction. Via conductors 210 in adjacent ones of the dielectric layers are electrically connected through electrode 220 or pad electrode 230C.

In connecting conductor 150C, an increase of loss associated with the passage of electric current may be due to a slightly longer current path. Yet, the dielectric material between via conductors 210 in the lamination direction may help to reduce possible deformation in the lamination direction during the manufacture, resulting in reducing the occurrence of structural faults.

The structures illustrated in FIGS. 8A, 8B, and 9 may also be applicable to connecting conductor 170.

Modification of Resonator

Figure 10:
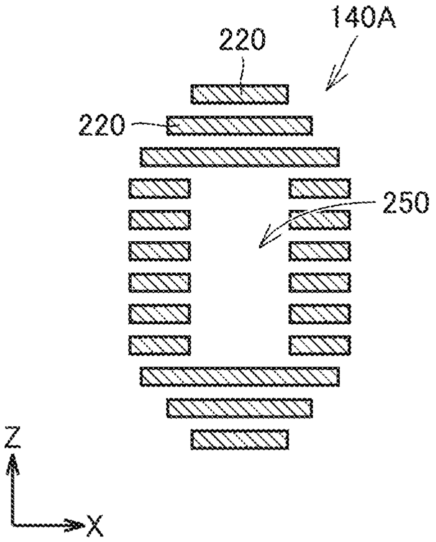
FIG. 10 illustrates a modification of a resonator according to a preferred embodiment of the present invention.

FIG. 10 illustrates a modification of the resonator. FIG. 10 shows a cross section parallel or substantially parallel to Z-X plane of a resonator 140A according to a modification of a preferred embodiment of the present invention.

With reference to FIG. 10, the cross section of resonator 140A is oval or substantially oval. This resonator includes an aperture near the center of electrodes 220 in the lamination direction (Z-axis direction), which defines a space 250.

As described earlier, radio frequency electric current tends to flow around ends of a conductor because of the cut-edge effect. Even in the case where there is no conductor near the center of electrodes 220, any power loss associated with the passage of electric current may not increase. Thus, a desired Q value can be provided.

In addition, a lower conductor density in the lamination direction where resonators 140 are disposed can be reduced, which may favorably reduce any difference in deformability to the dielectric material nearby during the manufacture. As a result, structural faults, such as cracks, can be prevented.

Second Preferred Embodiment

A second preferred embodiment of the present invention describes a configuration to reduce resonance frequency variability and passband variability by strengthening inductive coupling of the resonators.

Figure 11:
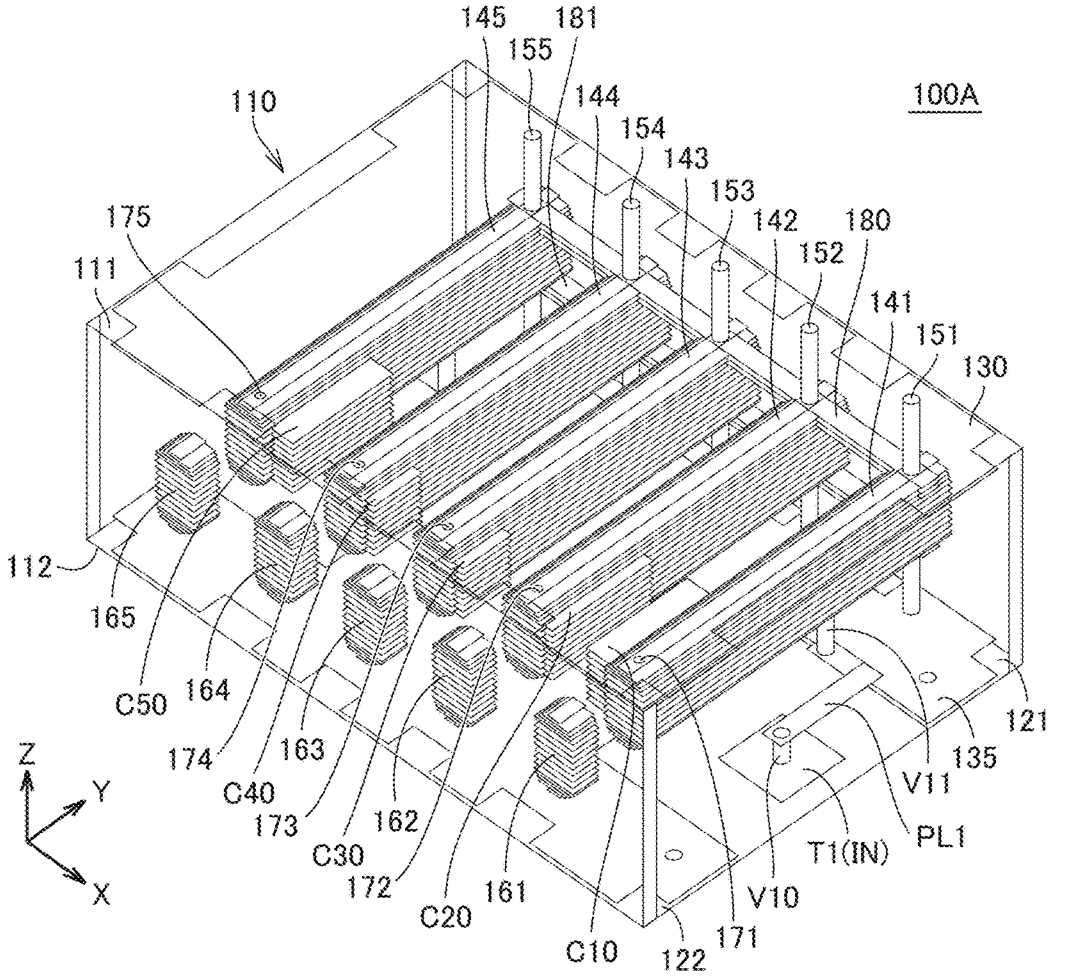
FIG. 11 is a perspective view that illustrates the internal structure of a filtering device according to a second preferred embodiment of the present invention.

FIG. 11 is a perspective view that illustrates the internal structure of a filtering device 100A according to the second preferred embodiment. Filtering device 100A includes connecting conductors 180 and 181 providing connection between resonators 140 in addition to the structural elements of filtering device 100 according to the first preferred embodiment. Any structural elements of FIG. 11 the same as or similar to those of FIG. 3 will not be described again.

With reference to FIG. 11, connecting conductors 180 and 181 are used to connect adjacent ones of resonators 140 at positions at which connecting conductors 150 are connected to the resonators. Connecting conductor 180 connects at least two conductors of the resonators located at positions adjacent to upper surface 111. Connecting conductor 181 connects at least two conductors of the resonators located at positions adjacent to lower surface 112.

Connecting conductors 180 and 181 functionally operate as inductors connected between the resonators, so as to strengthen inductive coupling of the resonators. Since connecting conductors 180 and 181 are located at positions adjacent to shield conductor 121 connected to the ground potential, connecting conductors 180 and 181 can stabilize potentials of adjacent ones of the resonators. This enables frequency stability.

Figure 12:
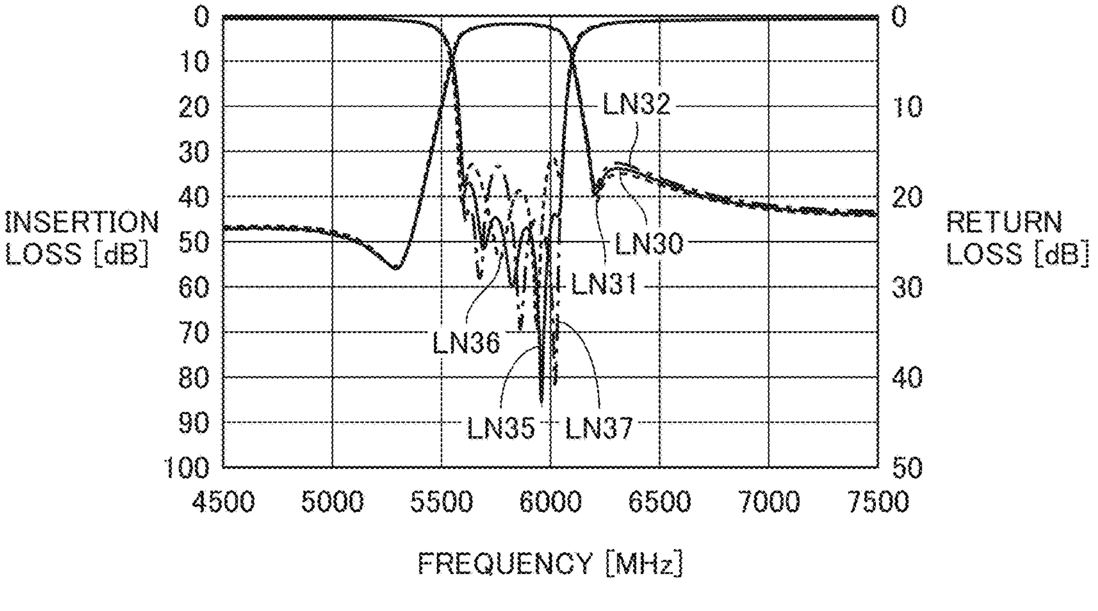
FIG. 12 is a graph showing variability of passband characteristics in the filtering device according to the second preferred embodiment of the present invention.

FIG. 12 is a graph showing variability of passband characteristics in filtering device 100A of the second preferred embodiment. As with FIG. 6 illustrating the first preferred embodiment, FIG. 12 shows a passband characteristics simulation result of three filtering devices (first filter, second filter, third filter) including resonators that differ in electrode length when the structure of the second preferred embodiment is provided. In FIG. 12, insertion loss in the first filter is illustrated with a solid line LN30, while return loss in this filter is illustrated with a solid line LN35. Further, insertion loss in the second filter is illustrated with a broken line LN31, while return loss in this filter is illustrated with a broken line LN36. Also, insertion loss in the third filter is illustrated with a dashed-and-dotted line LN32, while return loss in this filter is illustrated with a dashed-and-dotted line LN37.

In filtering device 100A, as illustrated in FIG. 12, passband characteristics of the three filtering devices was discovered to be less variable than passband characteristics of filtering device 100 according to the first preferred illustrated in FIG. 6.

In filtering device 100A according to the second preferred embodiment, the resonators are connected to each other with connecting conductors 180 and 181 at positions adjacent to the connecting ends of the resonators with the shield conductors. This achieves potential stability among adjacent ones of the resonators, resulting in successfully reducing resonance frequency variability in the resonators and passband variability of the filtering device.

The “connecting conductors 180 and 181” according to the second preferred embodiment correspond to the “third connecting conductor”.

First Modification

The first modification of a preferred embodiment of the present invention describes a structure in which connecting conductors 150, which connects resonators 140 to plate electrodes 130 and 135, are partially not included.

Figure 13:
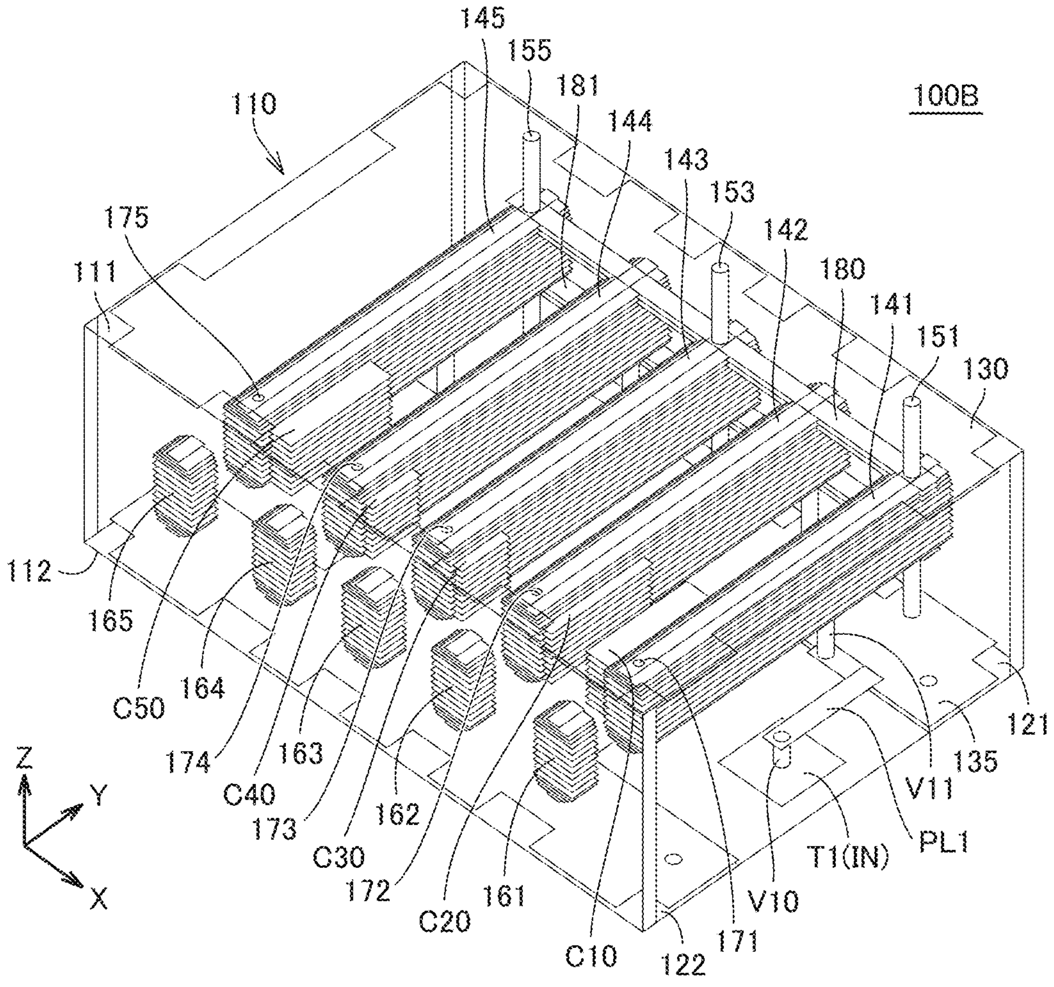
FIG. 13 is a perspective view that illustrates the internal structure of a filtering device according to a first modification of a preferred embodiment of the present invention.

FIG. 13 is a perspective view that illustrates the internal structure of a filtering device 100B according to the first modification. Filtering device 100B does not include connecting conductors 152 and 154 of filtering device 100A of FIG. 11. Except for this difference of connecting conductors 152 and 154, filtering device 100B is structurally the same as or similar to filtering device 100A. Any structural elements in FIG. 13 the same as or similar to those of filtering device 100A will not be described again.

In filtering device 100B, the resonators are connected to each other with connecting conductors 180 and 181, similarly to filtering device 100A. In the absence of connecting conductors 152 and 154, potentials in connected portions of connecting conductors 180 and 181 and resonators 140 may become equal or substantially equal. Thus, resonance frequency variability in the resonators and passband variability in the filtering device can be successfully reduced in filtering device 100B of the first modification. Filtering device 100B of the first modification not including connecting conductors 152 and 154 can reduce manufacturing cost, as compared with filtering device 100A according to the second preferred embodiment.

When the resonators are connected to each other with connecting conductor 180 and 181, all of connecting conductors 150 may be unnecessary insofar as at least one connecting conductor is used, in which case connecting conductors 151 and 155 of FIG. 13 may be further removed.

Third Preferred Embodiment

In the first and second preferred embodiments, connecting conductors 150 are used to connect resonators 140 to plate electrodes 130 and 135 and also to connect the conductors of resonators 140 to each other. A third preferred embodiment of the present invention describes a structure in which the connecting conductors are only used to connect resonators 140 to plate electrodes 130 and 135.

Figure 14:
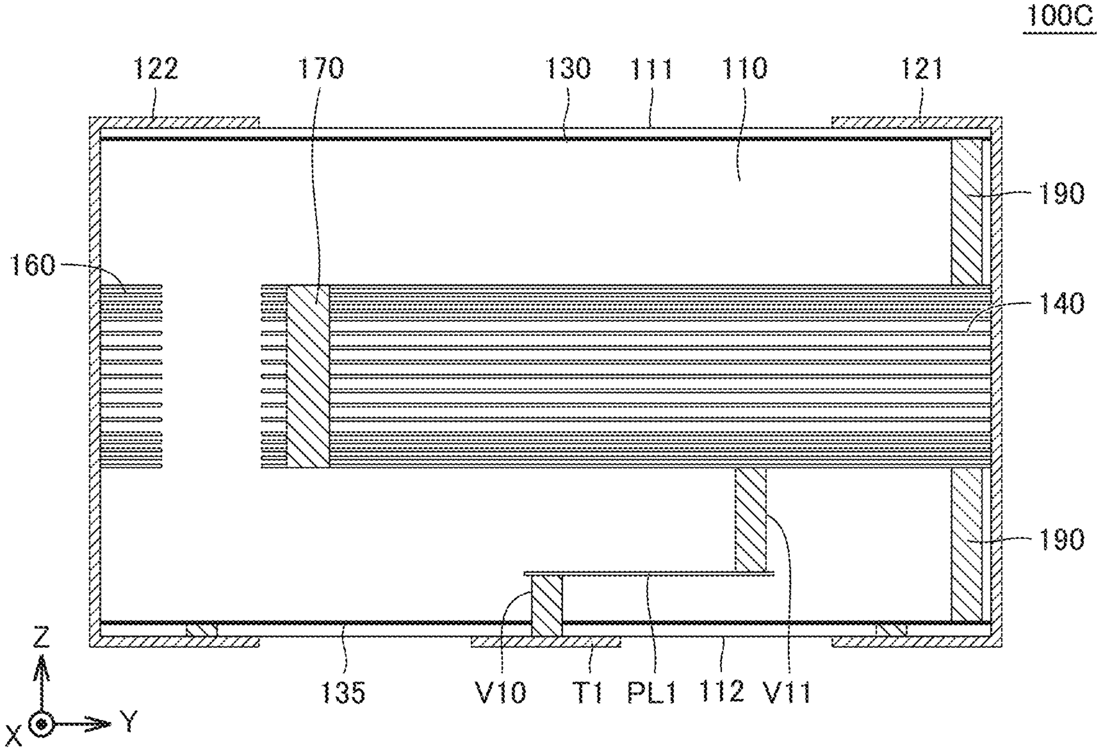
FIG. 14 is a cross-sectional view of a filtering device according to a third preferred embodiment of the present invention.

FIG. 14 is a cross-sectional view of a filtering device 100C according to the third preferred embodiment. FIG. 14 is a cross-sectional view of filtering device 100C in the Y-axis direction. In filtering device 100C, each of resonators 140, at positions adjacent to their ends on the side of shield conductor 121, is connected to plate electrodes 130 and 135 with connecting members 190. Connecting members 190 are, however, only disposed between resonators 140 and plate electrodes 130 and 135. These connecting members are not used to connect the conductors of resonators 140. Although not illustrated in FIG. 4, filtering device 100C also includes connecting conductors 180 and 181 that connect the resonators, similarly to filtering device 100B.

Figure 15:
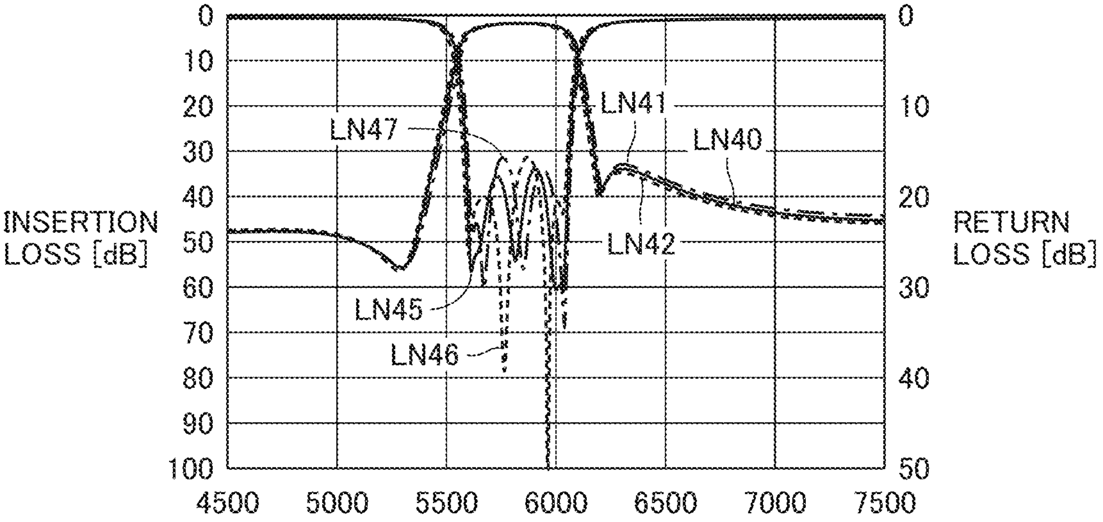
FIG. 15 is a graph showing frequency variability of passband characteristics in the filtering device according to the third preferred embodiment of the present invention.

FIG. 15 is a graph showing frequency variability of passband characteristics in filtering device 100C of the third preferred embodiment. As with FIG. 6 illustrating the first preferred embodiment, FIG. 15 shows a passband characteristics simulation result of three filtering devices (first filter, second filter, third filter) including resonators that differ in electrode length when the structure of the third preferred embodiment is provided. In FIG. 15, insertion loss in the first filter is illustrated with a solid line LN40, while return loss in this filter is illustrated with a solid line LN45. Further, insertion loss in the second filter is illustrated with a broken line LN41, while return loss in this filter is illustrated with a broken line LN46. Also, insertion loss in the third filter is illustrated with a dashed-and-dotted line LN42, while return loss in this filter is illustrated with a dashed-and-dotted line LN47.

As illustrated in FIG. 15, in filtering device 100C, the conductors of the resonators are not connected by the connecting conductors. Therefore, potential stability is not obtained, leading to more variability than in filtering device 100A of the second preferred embodiment (FIG. 12). Yet, connecting conductors 180 and 181 result in potential stability among the resonators, resulting in providing an improved variability as compared with filtering device 100 of the first preferred embodiment (FIG. 6).

Filtering device 100C according to the third preferred embodiment has a configuration not including via conductors to connect the resonators’ conductors in the connecting conductors used to connect resonators 140 to plate electrodes 130 and 135. This configuration results in cost reduction, while, at the same time, achieves a certain degree of improvement in resonance frequency variability in the resonators and passband variability of the filtering device.

Fourth Preferred Embodiment

The first to third preferred embodiments described the use of a single type of dielectric material for multilayer body 110. A fourth preferred embodiment of the present invention hereinafter describes a multilayer body 110 including a plurality of types of dielectric materials having different dielectric constants.

Figure 16:
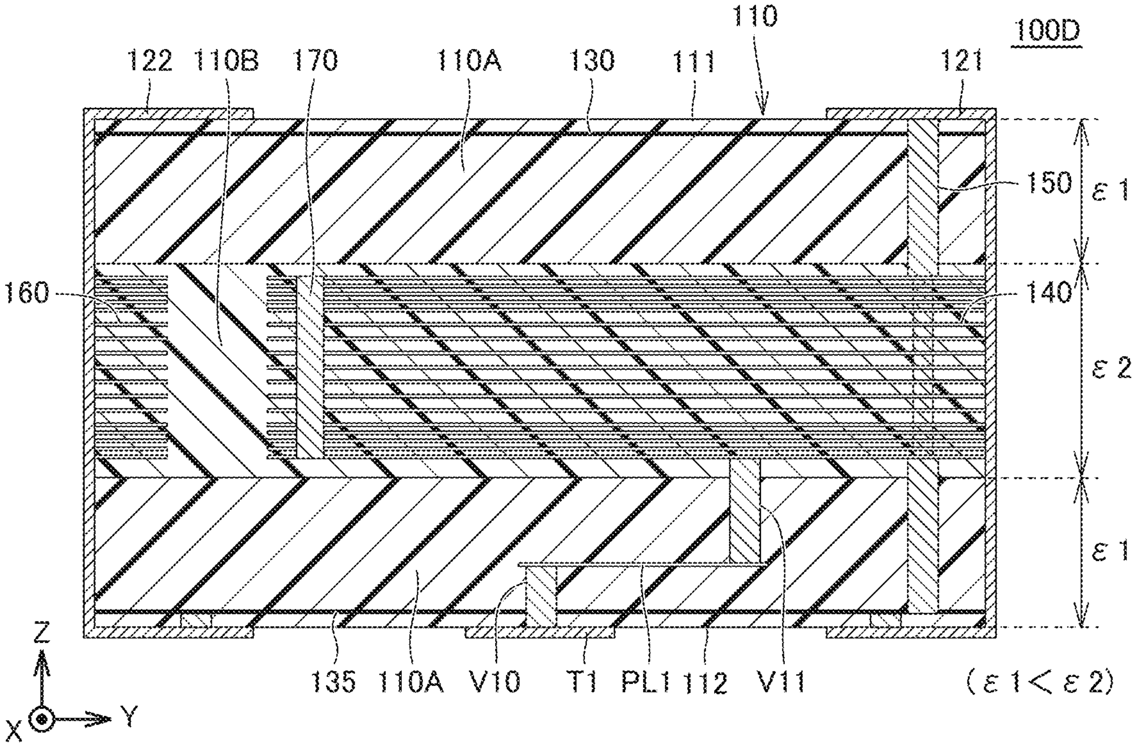
FIG. 16 is a cross-sectional view of a filtering device according to a fourth preferred embodiment of the present invention.

FIG. 16 is a cross-sectional view of a filtering device 100D according to the fourth preferred embodiment. FIG. 16 is a cross-sectional view of filtering device 100D in the Y-axis direction. Filtering device 100D differs from filtering device 100 of FIG. 3 according to the first preferred embodiment in that multilayer body 110 includes dielectric substrates 110A and 110B having different dielectric constant. Other structural features of filtering device 100D are the same as or similar to those of filtering device 100. Any structural elements of FIG. 16 the same as or similar to those of FIG. 3 will not be described again.

With reference to FIG. 16, multilayer body 110 of filtering device 100D has a structure in which dielectric substrates 110A having a dielectric constant ε1 are disposed at positions adjacent to upper surface 111 and lower surface 112, and a dielectric substrate 110B having a dielectric constant ε2 higher than that of dielectric substrates 110A (ε1<ε2) is disposed between two dielectric substrates 110A. Further, resonators 140 and capacitor electrodes 160 are disposed where dielectric substrate 110B is located.

In dielectric substrate 110B mounted with resonators 140, higher dielectric constants may weaken the degree of inductive coupling, while increasing the degree of capacitive coupling. Thus, the resonance frequency may be adjustable in each resonator 140. The degree of capacitive coupling between the resonators can also be increased, and damping characteristics may be accordingly adjustable.

Conventionally, such a filtering device is known to generate TE harmonics that circulate around multilayer body 110 in the vicinity of upper surface 111 and lower surface 112 of multilayer body 110. As in filtering device 100D, by decreasing dielectric constant ε1 of dielectric substrate 110A in the vicinity of upper surface 111 and lower surface 112 of multilayer body 110, an effective dielectric constant in TE mode can be decreased. As a result, the frequency of TE harmonics shifts to a higher frequency band than the passband. This can reduce any adverse impact from TE harmonics.

Second Modification

Figure 17:
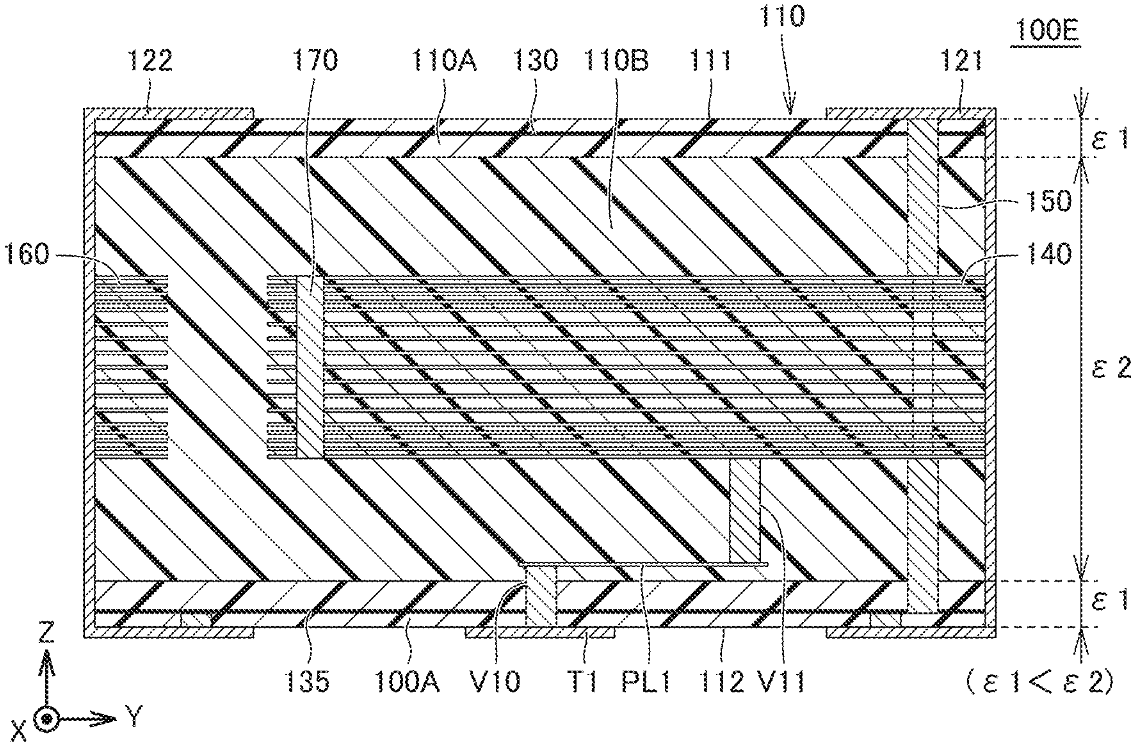
FIG. 17 is a cross-sectional view of a filtering device according to a second modification of a preferred embodiment of the present invention.

FIG. 17 is a cross-sectional view of a filtering device 100E according to a second modification of a preferred embodiment of the present invention. FIG. 17 is a cross-sectional view of filtering device 100E in the Y-axis direction. As with filtering device 100D of the fourth preferred embodiment, filtering device 100E is structured such that dielectric substrate 110B with a high dielectric constant is disposed between dielectric substrates 110A with a low dielectric constant. However, filtering device 100E is distinct from filtering device 100D in that a ratio of dielectric substrates 110B in multilayer body 110 is larger. Thus, the effective dielectric constant can be adjusted by adjusting the proportion of low dielectric layers and high dielectric layers. Thus, the resonance frequency of resonator 140 and the degree of inter-resonator coupling can be successfully adjusted.

The relative proportion between dielectric substrate 110A and dielectric substrate 110B may be suitably decided depending on desired filtering characteristics.

Third Modification

Figure 18:
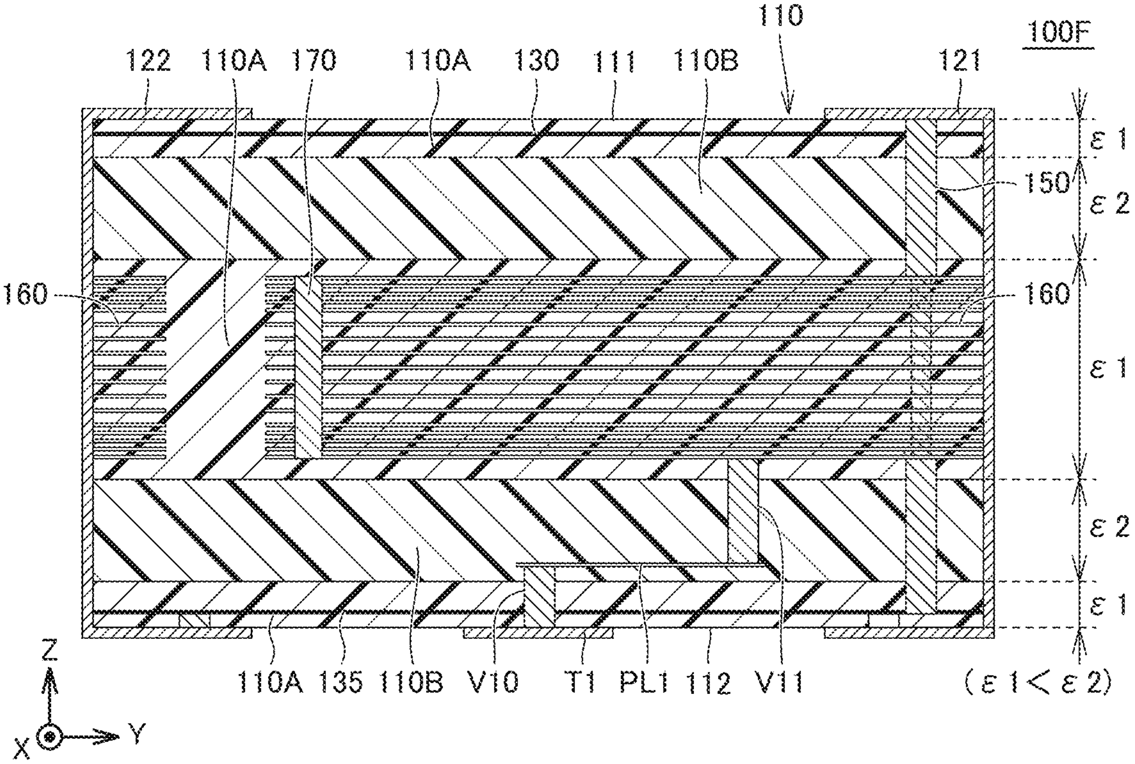
FIG. 18 is a cross-sectional view of a filtering device according to a third modification of a preferred embodiment of the present invention.

FIG. 18 is a cross-sectional view of a filtering device 100F according to a third modification of a preferred embodiment of the present invention. FIG. 18 is a cross-sectional view of filtering device 100F in the Y-axis direction. Filtering device 100F includes multilayer body 110 having a five-layer structure. In filtering device 100F, resonators 140 and capacitor electrodes 160 are disposed on dielectric substrate 110A with a lower dielectric constant, unlike filtering devices 100D and 100E. Dielectric substrates 110B with a higher dielectric constant are disposed at positions adjacent to upper surface 111 and lower surface 112 of dielectric substrate 110A, and dielectric substrates 110A with a lower dielectric constant are further disposed on the outer sides of these dielectric substrates 110B.

Resonators 140 and capacitor electrodes 160 are disposed on the lower dielectric constant layers, which may weaken the capacitive coupling and strengthen the inductive coupling between resonators 140. Thus, the resonance frequency may be adjustable in each resonator 140, and damping characteristics of filtering device 100F may also be adjustable.

The "dielectric substrate 110A" and "dielectric substrate 110B" according to the fourth preferred embodiment and second and third modifications respectively correspond to the "first substrate" and "second substrate".

Fifth Preferred Embodiment

A fifth preferred embodiment of the present invention describes a multiplexer including a plurality of filtering devices disclosed herein.

Figure 19:
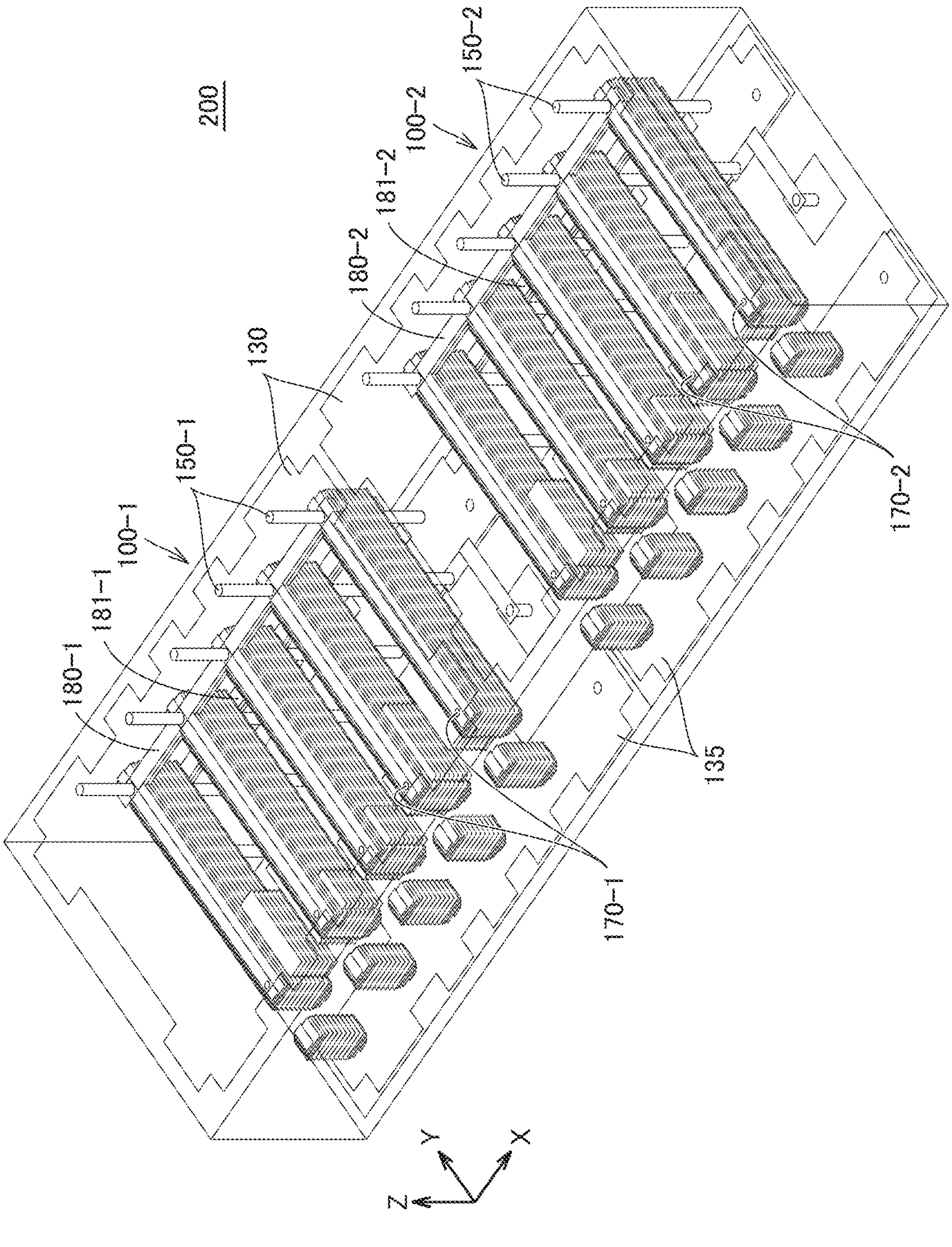
FIG. 19 is a perspective view that illustrates the internal structure of a multiplexer according to a fifth preferred embodiment of the present invention.

FIG. 19 is a perspective view that illustrates the internal structure of a multiplexer 200 according to the fifth preferred embodiment. Multiplexer 200 is, for example, a diplexer including two filtering devices 100-1 and 100-2 structurally illustrated in FIG. 11 according to the second preferred embodiment. Filtering devices 100-1 and 100-2 have different passbands from each other. Structural elements of filtering devices 100-1 and 100-2, which are similar to filtering device 100A of FIG. 11, will not be described again.

In multiplexer 200, filtering devices 100-1 and 100-2 are arranged in the X-axis direction, as illustrated in FIG. 19. In filtering device 100-1 of multiplexer 200, external terminals in the positive direction of X axis are input terminals, while external terminals in the negative direction of X axis are output terminals. In filtering device 100-2, on the other hand, external terminals in the negative direction of X axis are input terminals, while external terminals in the positive direction of X axis are output terminals. In other words, a radio frequency signal input to filtering device 100-1 is transmitted in the negative direction of X axis, whereas a radio frequency signal input to filtering device 100-2 is transmitted in the positive direction of X axis.

In filtering device 100-1 of multiplexer 200, the resonators are each connected to plate electrode 130 with connecting conductor 150-1, and conductors of the resonators are connected to each other with connecting conductor 170-1. Further, the resonators are connected to each other with connecting conductors 180-1 and 181-1. In filtering device 100-2, the resonators are each connected to plate electrode 130 with connecting conductor 150-2, and conductors of the resonators are connected to each other with connecting conductor 170-2. Further, the resonators are connected to each other with connecting conductors 180-2 and 181-2. Thus, resonance frequency variability and passband variability can be reduced in filtering devices 100-1 and 100-2.

Sixth Preferred Embodiment

In a sixth preferred embodiment of the present invention, plate electrodes disposed in proximity to upper surface 111 and lower surface 112 of multilayer body 110 have a mesh structure.

Figure 20:
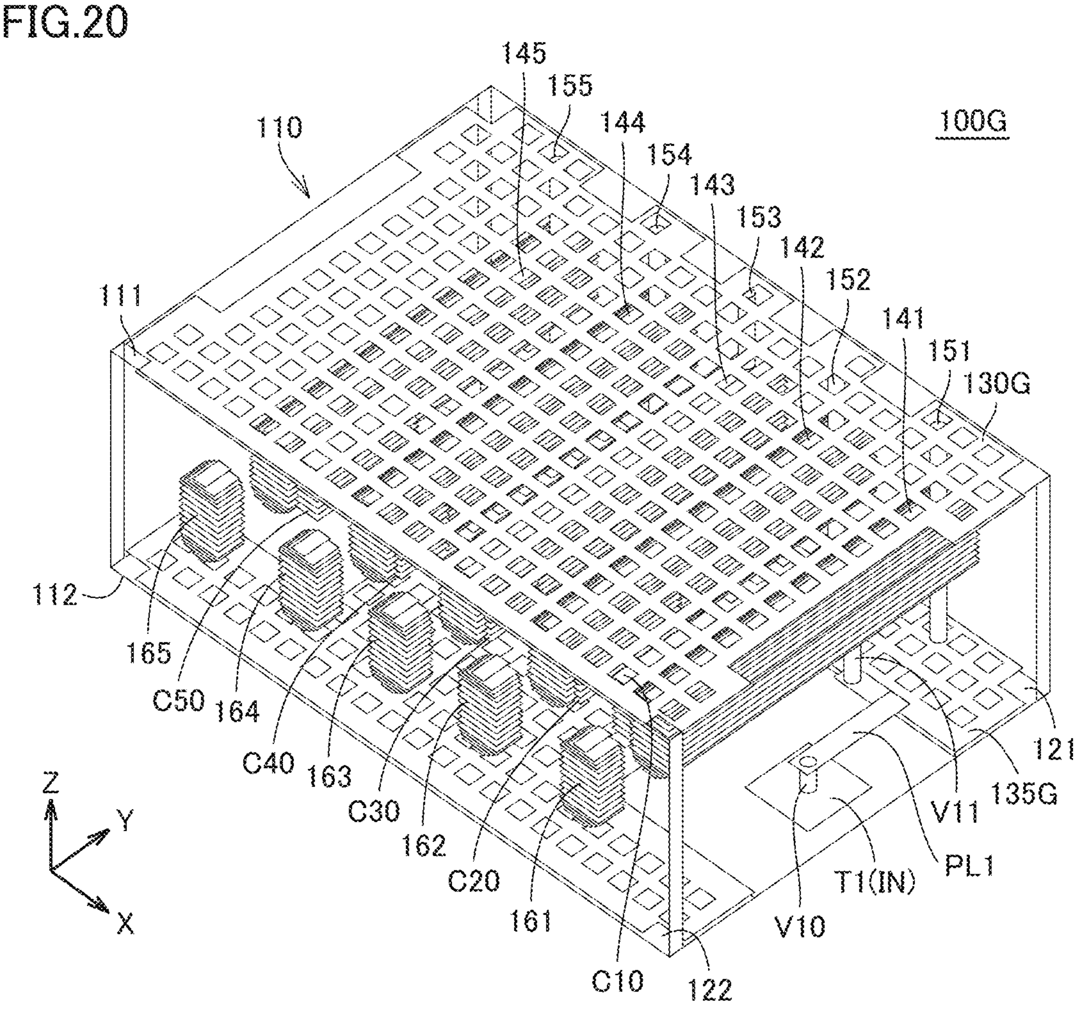
FIG. 20 is a perspective view that illustrates the internal structure of a filtering device according to a sixth preferred embodiment of the present invention.

FIG. 20 is a perspective view that illustrates the internal structure of a filtering device 100G according to the sixth preferred embodiment. In Filtering device 100G, plate electrodes 130 and 135 in filtering device 100 of the first preferred embodiment illustrated in FIG. 3 have been replaced with plate electrodes 130G and 135G. Any structural elements of FIG. 20 the same as or similar to those of FIG. 3 will not be described again.

With reference to FIG. 20, plate electrode 130G, 135G is a mesh structured conductor including a plurality of apertures provided in plate electrodes 130 and 135 of filtering device 100. The apertures are square or substantially square shaped holes and are arranged at predetermined intervals in the X-axis direction and in the Y-axis direction.

In a case in which the dielectric layers are almost entirely covered with plate electrodes with no aperture plate electrode 130 or 135 of filtering device 100 of FIG. 3, the dielectric layers on the upper and lower sides of the plate electrodes are connected only through partial ends of multilayer body 110. Generally, a bonding strength between a dielectric material and a metal conductor is weaker than an inter-dielectric bonding strength. A plate electrode with no aperture, therefore, may cause a poor bonding strength, which may result in the risk of peeling off a dielectric layer(s) from the plate electrode.

Figure 21:
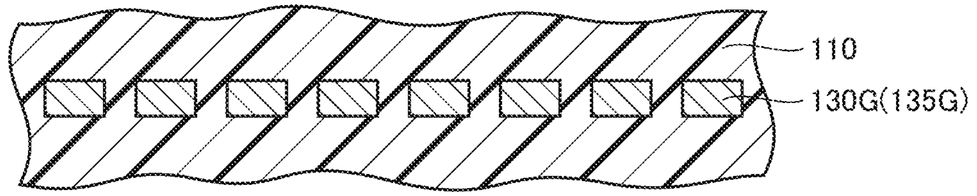
FIG. 21 is a cross-sectional view of a plate electrode illustrated in FIG. 20.

In filtering device 100G of the sixth preferred embodiment, plate electrodes 130G and 135G each have a mesh structure including apertures. These apertures are filled with the dielectric material, as illustrated in cross section of FIG. 21, which ensures firm bonding of the dielectric material in the upper and lower dielectric layers of plate electrodes 130G and 135G. This may lead to an increased bonding strength between the dielectrics so as to prevent a dielectric layer(s) from peeling off from the plate electrodes.

Plate electrodes 130G and 135G are required to function as ground potential, i.e., reference potential. If the aperture ratio relative to the entire electrode area is too large, it may lead to a poor functional performance as a reference potential. Another disadvantage may be an increase in resistance, possibly generating loss resulting from ground current flowing through plate electrode 130G, 135G. To avoid these problems, the apertures provided in plate electrode 130G, 135G should preferably have an appropriate area.

Figure 22:
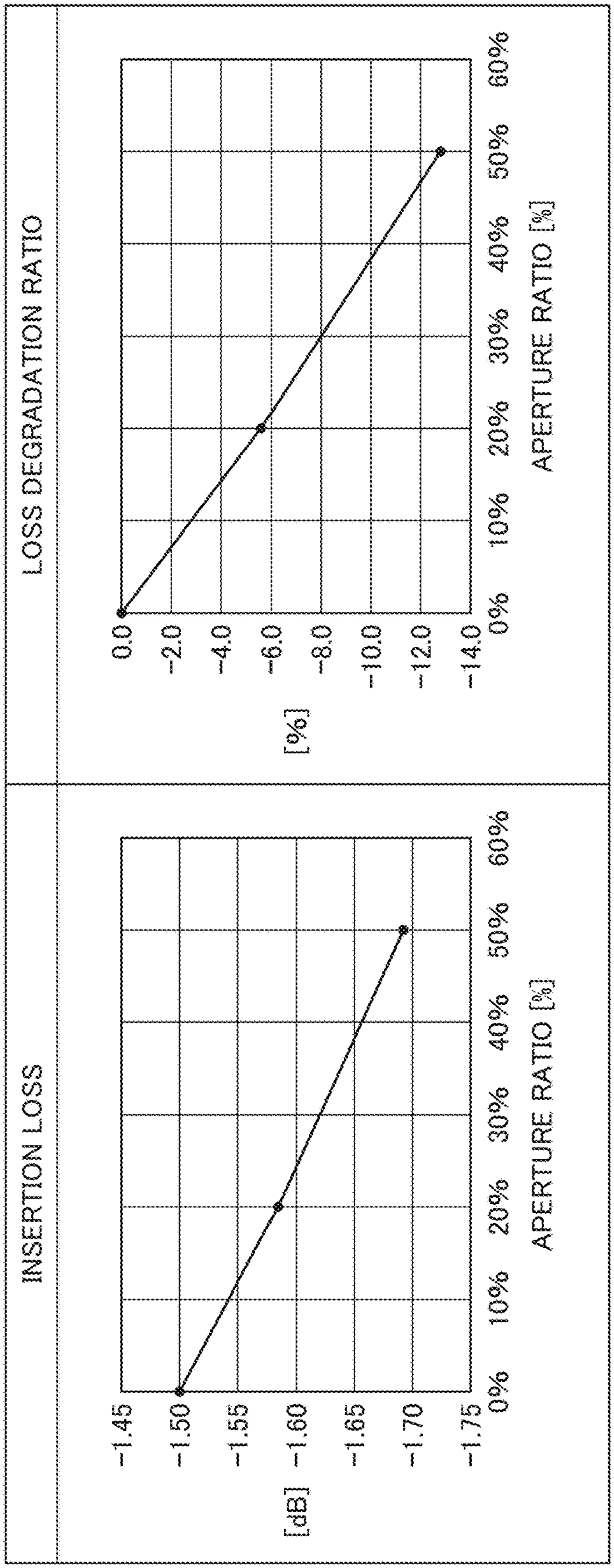
FIG. 22 is a graph that shows insertion loss affected by aperture ratios of plate electrodes.

FIG. 22 is a graph that shows insertion loss affected by aperture ratios of plate electrodes 130G and 135G. The left drawing of FIG. 22 shows changes of insertion loss relative to the aperture ratio, while the right drawing of FIG. 22 shows the ratio of loss degradation relative to the aperture ratio. The "aperture ratio" described herein refers to the area ratio of a region in plate electrode 130G, 135G with no electrically conductive member to the entire dielectric layers in plan view from the Z-axis direction of multilayer body 110. The aperture ratio includes, as a factor to be considered, cutouts provided at ends, as well as apertures provided in plate electrodes 130G and 135G. The "ratio of loss degradation" described herein refers to changes of insertion loss in which insertion loss at the aperture ratio of 0% is the reference level.

As illustrated in FIG. 22, insertion loss degrades with an increase of the aperture ratio, as does the ratio of loss degradation. When the ratio of loss degradation is preferably, for example, at most about 6%, the aperture ratio may need to be about 20% or less, for example.

In the plate electrodes disposed in proximity to the upper and lower surfaces of the multilayer body including the mesh structure with the aperture ratio of about 20% or less, for example, filtering characteristics may be unlikely to degrade and the dielectric layers can be successfully prevented from peeling off from the plate electrodes.

Seventh Preferred Embodiment

The filtering devices according to the preferred embodiments including the TEM-mode resonators may involve, for example, physical occurrence of higher-order resonances in TE and TM modes or unwanted resonance modes resulting from outer dimensions of cuboidal filtering devices. As a result, spurious components may typically occur at higher frequencies of around second and/or third harmonics of the passband.

In a seventh preferred embodiment of the present invention, variations of a filtering device further including a circuit that remove spurious components at certain frequencies.

First Example

A first example of the seventh preferred describes filtering device 100 of FIG. 3 in which one or more resonators include a resonator circuit(s) having a resonance frequency corresponding to the frequency of any spurious component to be removed.

Figure 23:
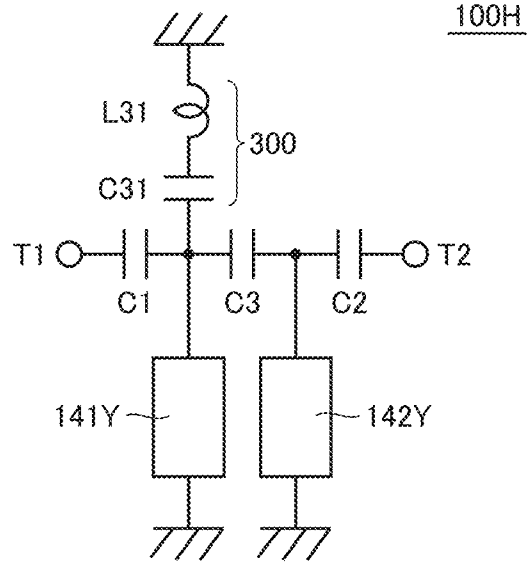
FIG. 23 is an equivalent circuit diagram of a filtering device according to a first example of a seventh preferred embodiment of the present invention.

FIG. 23 is an equivalent circuit diagram of a filtering device 100H according to the first example of the seventh preferred embodiment. With reference to FIG. 23, filtering device 100H including two resonators 141Y and 142Y is illustrated to simplify the description. In the seventh preferred embodiment, resonators 141Y and 142Y may be collectively referred to as "resonator(s) 140".

In filtering device 100H illustrated in FIG. 23, resonator 141Y is connected to input terminal T1 through a capacitor C1. Resonator 142Y is connected to output terminal T2 through a capacitor C2. Resonators 141Y and 142Y are connected to each other through a capacitor C3.

Filtering device 100H includes a resonator circuit 300 between resonator 141Y and the ground potential. In resonator circuit 300, a capacitor C31 and an inductor L31 are connected in series to each other. In resonator circuit 300, the capacitance value of capacitor C31 and the inductance value of inductor L31 are defined and set to obtain a resonance frequency corresponding to the frequency of any spurious component to be removed. Including resonator circuit 300 ensures removal of a spurious component(s) generated in the filtering device.

Figure 24:
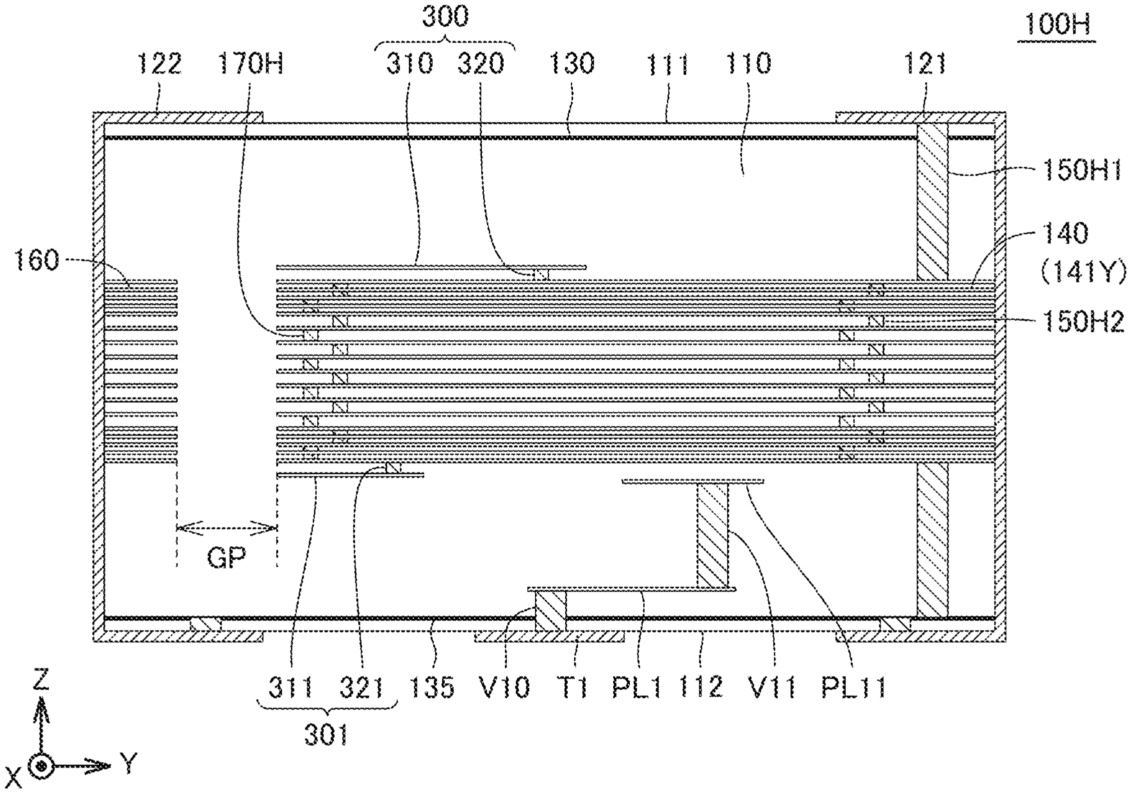
FIG. 24 is a cross-sectional view of the filtering device illustrated in FIG. 23.

FIG. 24 is a cross-sectional view of filtering device 100H illustrated in FIG. 23 including resonator 140 (resonator 141Y) in a view from the positive direction of X axis. Any structural elements of FIG. 24 the same as or similar to those of FIG. 4 of the first preferred embodiment will not be described again.

In filtering device 100H, resonator 141Y extending in the Y-axis direction is connected to plate electrodes 130 and 135 with a connecting conductor 150H1, as illustrated in FIG. 24. A plurality of conductors defining each resonator 141Y are connected to each other with a connecting conductor 150H2 at a position near one end in the positive direction of Y axis (first end) and are connected to each other with a connecting conductor 170H at a position near the other end in the negative direction of Y axis (second end). In connecting conductor 150H2 and connecting conductor 170H, a plurality of via conductors are disposed in zigzag arrangement in the lamination direction (Z-axis direction).

Of resonators 140, resonator 141Y on the side of input terminal T1 faces, at a distance, plate electrode PL11 connected to input terminal T1 through vias V10 and V11 and plate electrode PL1. Plate electrode PL11 and resonator 141Y define capacitor C1 illustrated in FIG. 23. Although not illustrated in the drawings, capacitor C2 illustrated in FIG. 23 is provided on the side of output terminal T2 between resonator 142Y and the plate electrode connected to output terminal T2. Capacitor C3 defines the capacitive coupling of resonator 141Y and resonator 142Y.

A plate electrode 310 extending in the Y-axis direction is connected, through a via 320, to a conductor on the uppermost layer of resonator 141Y. A plate electrode 311 extending in the Y-axis direction is connected, through a via 321, to a conductor on the lowermost layer of resonator 141Y. The connecting positions of vias 320 and 321 are closer to shield conductor 121 than connecting conductor 170H.

Plate electrodes 310 and 311 are capacitive-coupled to an end of resonator 141Y on the opening end side (negative direction of Y axis) and are further connected to shield conductor 121 through vias 320 and 321 and connecting conductor 150H1. The capacitive coupling of resonator 141Y and plate electrodes 310 and 311 define capacitor C31, while plate electrodes 310 and 311 and vias 320 and 321 define inductor L31. Specifically, plate electrode 310 and via 320 define an LC serial resonator circuit 300, while plate electrode 311 and via 321 define an LC serial resonator circuit 301. In resonator circuit 300 and 310, the inductance value and the capacitance value can be adjusted by changing the length of plate electrode 310 and 311 to achieve a resonance frequency adjusted to the frequency of any spurious component to be removed.

In the description with reference to FIGS. 23 and 24, resonator circuit 300 is connected to resonator 141Y, instead of which the resonator circuit may be connected to resonator 142Y. In the filtering device including five resonators as illustrated in FIG. 3, the resonator circuit may be provided in any one of these resonators.

A plurality of resonator circuits having the same resonance frequency are used to increase the amount of attenuation of an attenuation pole in these resonator circuits. This enables a large reduction of a spurious component(s) at a particular frequency. Spurious components in a broader range of frequencies may be decreased by using a plurality of resonator circuits having different frequencies.

Fourth Modification

The filtering device illustrated in FIGS. 23 and 24 includes, as a resonator circuit for spurious removal, the LC serial resonator circuit in which the capacitor is connected to the resonator side and the inductor is connected to the ground potential side. This LC serial resonator circuit may be replaced with an LC serial resonator circuit in which the capacitor and the inductor are connected in the reverse order.

Figure 25:
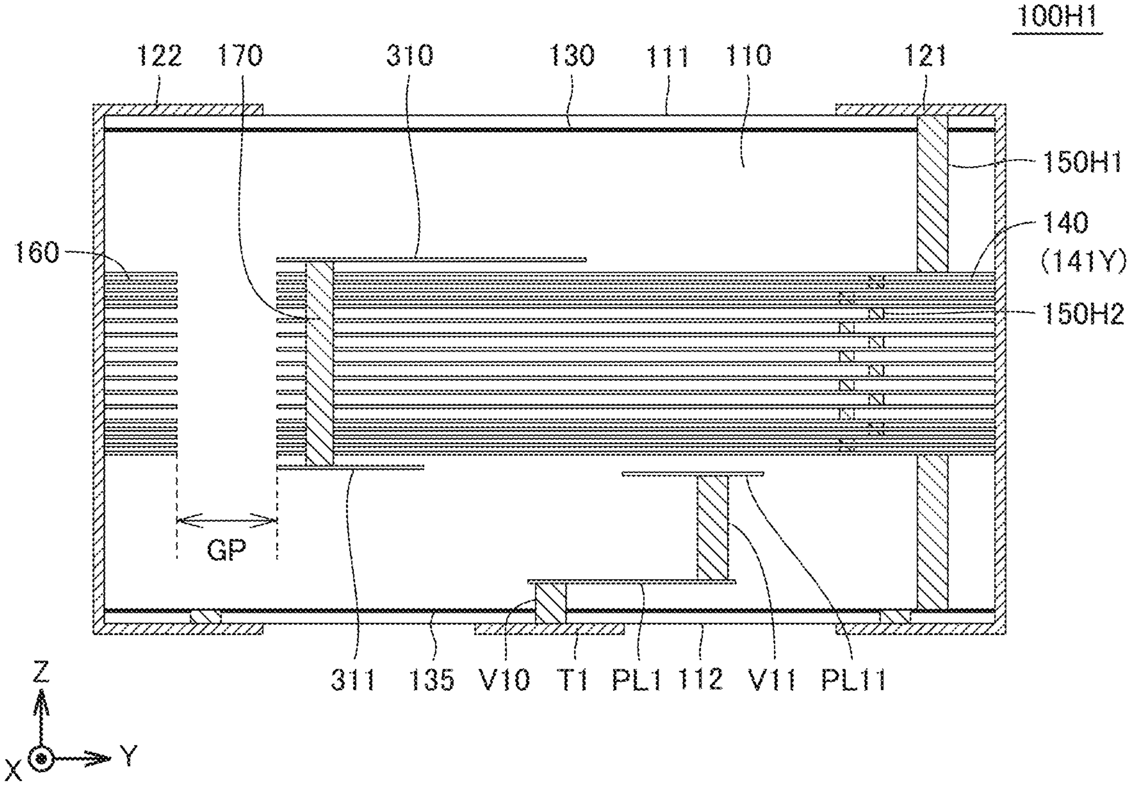
FIG. 25 is a cross-sectional view of a filtering device according to a fourth modification of a preferred embodiment of the present invention.

FIG. 25 is a cross-sectional view of a filtering device 100H1 according to a fourth modification of a preferred embodiment of the present invention. A distinct difference of filtering device 100H1 to filtering device 100H of FIG. 24 is the configurations of connection of resonator 141Y and plate electrodes 310 and 311 defining the resonator circuit.

Specifically, a plurality of conductors defining resonator 141Y are connected to each other with connecting conductor 170 at a position near the ends of resonator 141Y in the negative direction of Y axis, similarly to filtering device 100 of FIG. 4. Plate electrodes 310 and 311 are connected to connecting conductor 170.

In this instance, inductor L31 is defined by plate electrodes 310 and 311 connected to an opening end of resonator 141Y through connecting conductor 170, and capacitor C31 is defined by the capacitive coupling of plate electrodes 310 and 311 to resonator 141Y at positions closer to shield conductor 121 than the opening end.

In the structure described above, an LC serial resonator circuit(s) for spurious component removal may be added to the resonators of the filtering device.

Second Example

The filtering device of the first example describes a configuration in which the spurious-removal resonator circuit is connected to the resonator. A second example of the seventh preferred embodiment describes a filtering device in which the spurious-removal resonator circuit is disposed at an input terminal and/or an output terminal.

Figure 26:
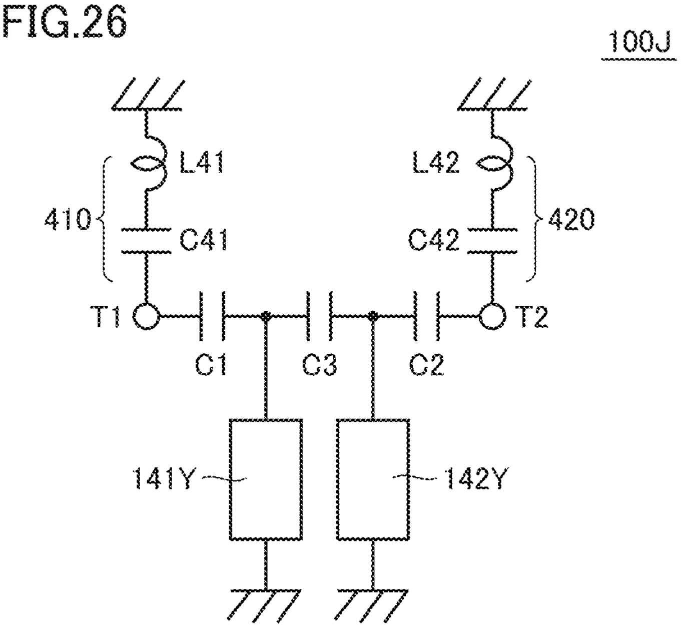
FIG. 26 is an equivalent circuit diagram of a filtering device according to a second example of the seventh preferred embodiment of the present invention.

FIG. 26 is an equivalent circuit diagram of a filtering device 100J according to the second example of the seventh preferred embodiment. With reference to FIG. 26, filtering device 100J including two resonators 141Y and 142Y is illustrated to simplify the description.

In filtering device 100J, resonator 141Y is connected to input terminal T1 through capacitor C1 similarly to filtering device 100H of the first example, as illustrated in FIG. 26. Resonator 142Y is connected to output terminal T2 through a capacitor C2. Resonators 141Y and 142Y are connected to each other through capacitor C3.

An LC serial resonator circuit 410 in which inductors L41 and capacitors C41 are connected in series is connected to input terminal T1. An LC serial resonator circuit 420 connected to output terminal T2 includes inductors L42 and capacitors C42 connected in series. Optionally, this filtering device may only include one of resonator circuits 410 and 420. The resonance frequency of resonator circuit 410, 420 is adjusted to a frequency adjusted to the frequency of any spurious component to be removed.

Figure 27:
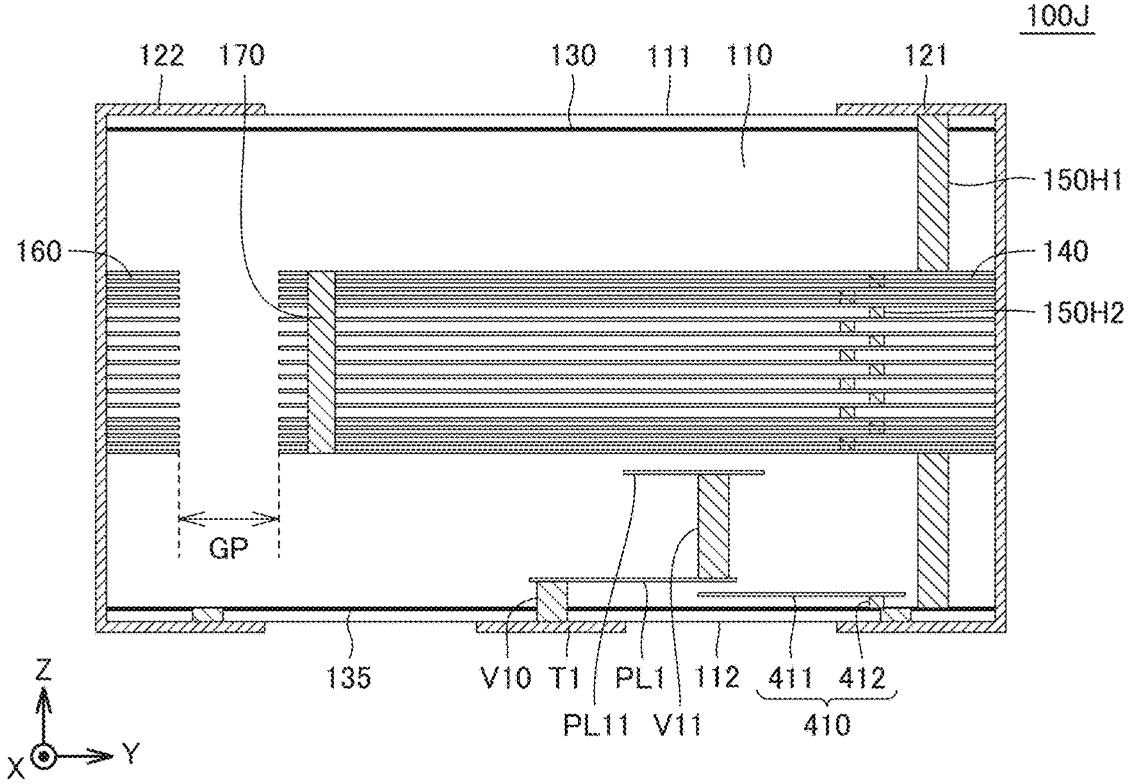
FIG. 27 is a cross-sectional view of the filtering device illustrated in FIG. 26.

FIG. 27 is a cross-sectional view of filtering device 100J illustrated in FIG. 26 including resonators 140 (resonator 141Y) when viewed from the positive direction of X axis. In filtering device 100J, resonators 140 are connected as in filtering device 100H1 of FIG. 25, except for plate electrodes 310 and 311.

Filtering device 100J includes a via 412 and a plate electrode 411 defining resonator circuit 410 connected to input terminal T1. One end of plate electrode 411 is connected to plate electrode 135 through via 412. Plate electrode 411 faces at least a portion of plate electrode PL1 connected to input terminal T1 through via V10.

The capacitive coupling of plate electrode PL1 and plate electrode 411 defines capacitor C41 illustrated in FIG. 26. Plate electrode 411 and via 412 define inductor L41 illustrated in FIG. 26. Plate electrode PL1 and plate electrode 411 define resonator circuit 410 illustrated in FIG. 26. The resonance frequency of resonator circuit 410 can be adjusted to a frequency adjusted to the frequency of any spurious component to be removed by adjusting the dimension of plate electrode 411 and/or by adjusting the distance and the degree of overlap between plate electrode PL1 and plate electrode 411. Although not illustrated in the drawing, resonator circuit 420 connected to output terminal T2 can be configured similarly to the configuration illustrated in FIG. 27.

As described above, the resonator circuit for spurious removal thus connected to the input terminal and/or output terminal can successfully reduce any spurious components generated in the filtering device.

Fifth Modification

A fifth modification of a preferred embodiment of the present invention describes a configuration in which the sequential order of capacitor-inductor connection is reversed in the LC serial resonator circuit illustrated as an equivalent circuit diagram of FIG. 26. In the LC serial resonator circuit according to the fifth modification, inductors are connected to input terminal T1 and output terminal T2, and capacitors are connected between the inductors and the ground potential.

Figure 28:
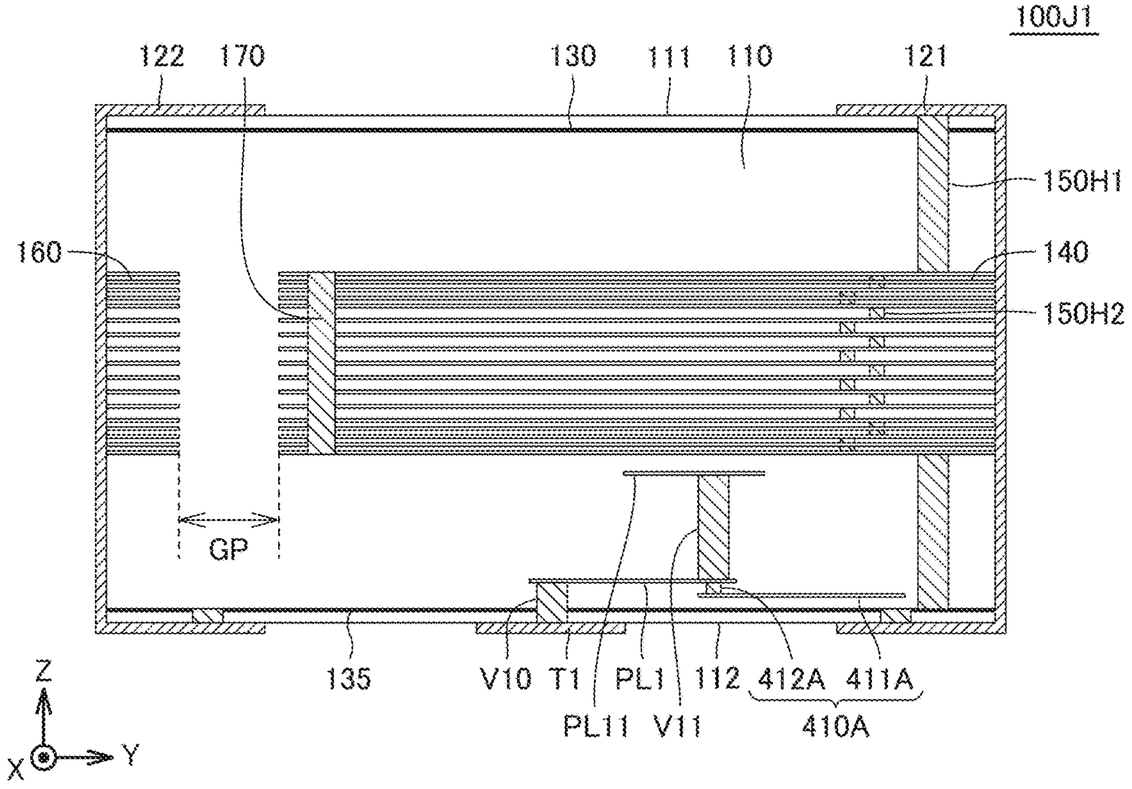
FIG. 28 is a cross-sectional view of a filtering device according to a fifth modification of a preferred embodiment of the present invention.

FIG. 28 is a cross-sectional view of a filtering device 100J1 according to the fifth modification. Filtering device 100J1 includes a resonator circuit 410A instead of resonator circuit 410 of filtering device 100J illustrated in FIG. 27.

Resonator circuit 410A includes a plate electrode 411A and a via 412A. Plate electrode 411A is connected to plate electrode PL1 through via 412A and faces plate electrode 135. Via 412A and plate electrode 411A define inductor L41, and plate electrode 411A and plate electrode 135 define capacitor C41. Any desired resonance frequency can be provided by adjusting the inductance value based on the lengths of via 412A and of plate electrode 411A and also by adjusting the capacitance value based on the distance between plate electrodes 411A and 135 and the area dimension of these plate electrodes facing each other (i.e., area of plate electrode 411A).

Figure 29:
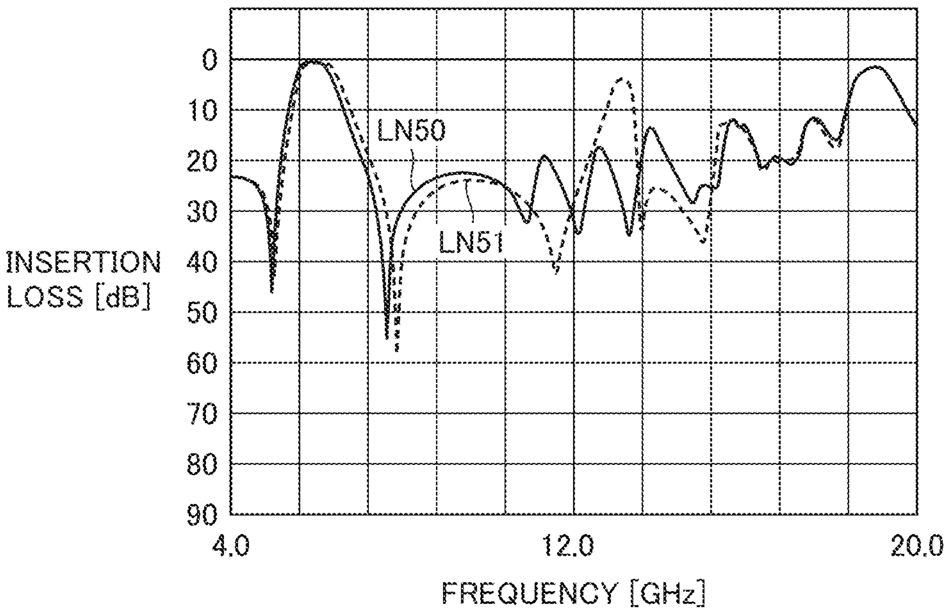
FIG. 29 is a graph showing passband characteristics in the filtering devices according to the first example or the second example of the seventh preferred embodiment of the present invention.

FIG. 29 is a graph showing passband characteristics in the filtering devices according to the first example and the second example. In FIG. 29, insertion loss in the seventh preferred embodiment using the resonator circuits is illustrated with a solid line LN50, while insertion loss in a comparative example with no resonator circuit is illustrated with a broken line LN51. The target passband of the filtering device of FIG. 29 is, for example, a 6 GHz band.

With reference to FIG. 29, the graph of the comparative example (broken line LN51) shows spurious components at frequencies of about 12 GHz to about 13 GHz, for example, the spurious components corresponding to the second order harmonics of the passband. In the seventh preferred embodiment, while no significant change is observed in insertion loss at the passband (about 6 GHz), spurious components at about 12 GHz to about 13 GHz have been removed by the resonator circuits added to the structure.

By adding to the resonators and/or input/output terminals, the LC serial resonator circuits having a resonance frequency adjusted to the spurious components, adverse impacts from spurious components can be successfully removed without degrading the passband characteristics.

In the first and second examples, the LC serial resonator circuits are described as resonator circuits for spurious removal, which may be replaced with different types of resonator circuits, for example, LC parallel resonator circuits.

Third Example

The filter device in a third example of the seventh preferred embodiment describes a configuration in which adverse impacts from spurious components is removed by adding lowpass filters (LPF) to signal paths between input terminal T1 and/or output terminal T2 and the resonators.

Figure 30:
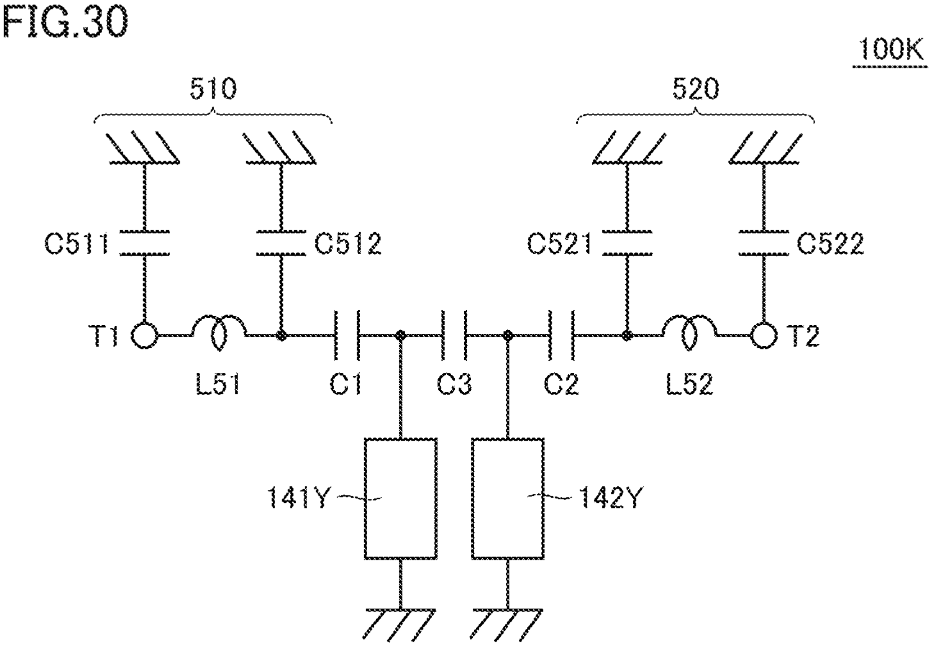
FIG. 30 is an equivalent circuit diagram of a filtering device according to a third example of the seventh preferred embodiment of the present invention.

FIG. 30 is an equivalent circuit diagram of a filtering device 100K according to the third example of the seventh preferred embodiment. As in the earlier examples, filtering device 100K including two resonators 141Y and 142Y is illustrated to simplify the description.

In filtering device 100K illustrated in FIG. 30, LPF 510 is connected to input terminal T1, and resonator 141Y is connected to LPF 510 through capacitor C1. LPF 520 is connected to output terminal T2, and resonator 142Y is connected to LPF 520 through capacitor C2. Resonators 141Y and 142Y are connected to each other through capacitor C3.

LPF 510 includes an inductor L51 and capacitors C511 and C512. Inductor L51 is connected between input terminal T1 and capacitor C1. Capacitor C511 is connected between input terminal T1 and the ground potential. Capacitor C512 is connected between the ground potential and a connection node between inductor L51 and capacitor C1. Thus, LPF 510 defines a π-type lowpass filter, for example.

LPF 520 includes an inductor L52 and capacitors C521 and C522. Inductor L52 is connected between output terminal T2 and capacitor C2. Capacitor C521 is connected between output terminal T2 and the ground potential. Capacitor C522 is connected between the ground potential and a connection node between inductor L52 and capacitor C2. Thus, LPF 520 defines a π-type lowpass filter, for example.

The resonance frequencies of LPF 510 and LPF 520 are set to a frequency so as to pass signals having lower frequencies than the frequency of any spurious component to be removed. This frequency setting may remove signals of higher frequencies than the frequency of any signal allowed to pass through, for example, second and/or third harmonics of the passband, thus removing any adverse impacts associated with spurious components.

Instead of using both of LPF 510 and LPF 520, at least one of these devices may be used. LPF 510 and LPF 520 are not necessarily π-type devices and may be, for example, T-type lowpass filters including two serially connected inductors and capacitors connected between the ground potential and connecting node of these inductors. Other examples may include multi-stage lowpass filters including two or more π-type or T-type filters.

Figure 31:
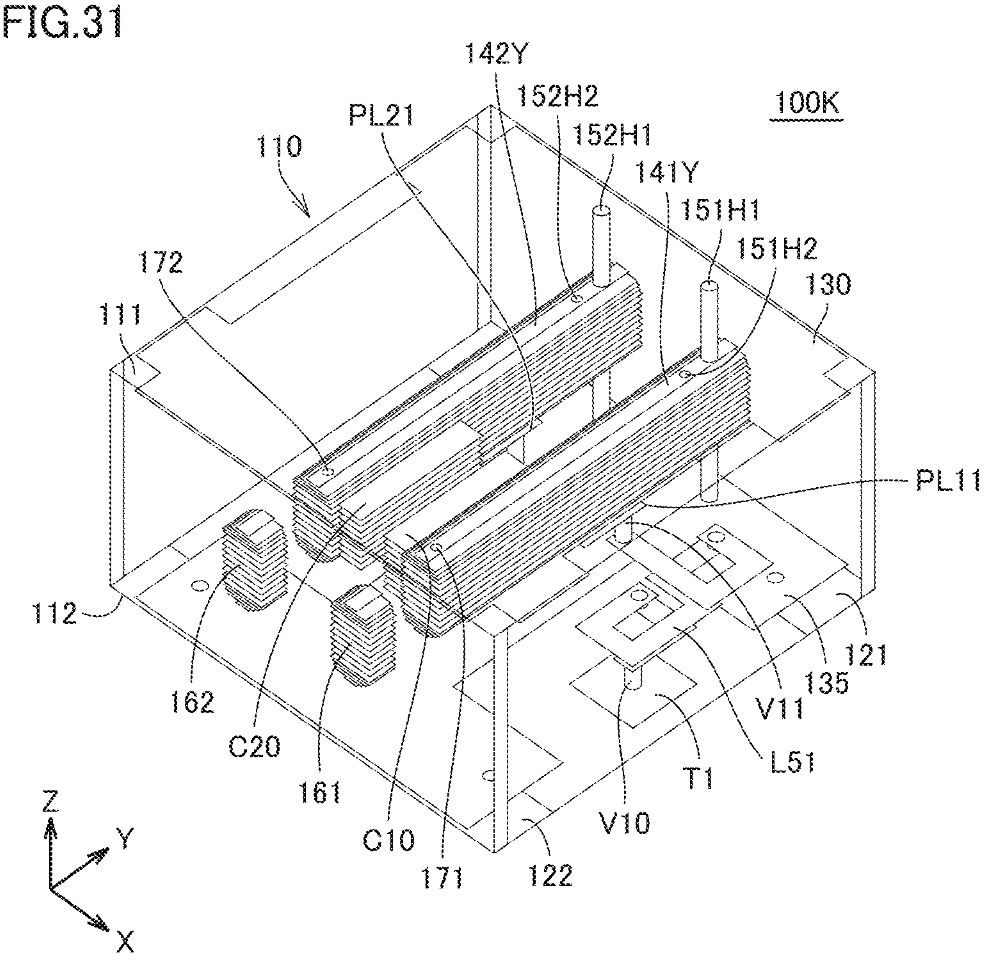
FIG. 31 is a perspective view that illustrates the internal structure of the filtering device illustrated in FIG. 30.

FIG. 31 is a perspective view that illustrates the internal structure of filtering device 100K illustrated in FIG. 30. Filtering device 100K includes resonators 141Y and 142Y each extending in the Y-axis direction, with one end thereof being connected to shield conductor 121. Resonators 141Y and 142Y are respectively connected to plate electrodes 130 and 135 with connecting conductors 151H1 and 152H1. A plurality of conductors defining resonator 141Y are connected to each other with a connecting conductor 151H2 at a position near one end in the positive direction of Y axis. Further, these conductors are connected to each other with a connecting conductor 171 at a position near the other end in the negative direction of Y axis.

Input terminal T1 is connected to plate electrode PL11 through via V10, inductor L51 and via V11. Plate electrode PL11 faces a lowermost one of the conductors of resonator 141Y. Signals received at input terminal T1 are transmitted, through capacitive coupling, to resonator 141Y.

Inductor L51 is a coil including a plurality of plate electrodes and a plurality of vias. Inductor L51 includes a first coil connected to via V10 and a second coil connected to via V11. The first coil and the second coil are each a helically coil wound around an axis in the lamination direction (Z-axis direction). The first coil and the second coil are adjacently disposed in the Y-axis direction and face plate electrode 130 on the side of upper surface 111. The parasitic capacitance between the first coil and plate electrode 130 defines a capacitor C511 illustrated in FIG. 30. The parasitic capacitance between the second coil and plate electrode 130 defines a capacitor C512 illustrated in FIG. 30. Specifically, LPF 510 is defined by inductor L51 and plate electrode 130.

LPF 520 connected to output terminal T2, hidden by resonator 142Y in FIG. 31, is structured similarly to LPF 510 described above.

Figure 32:
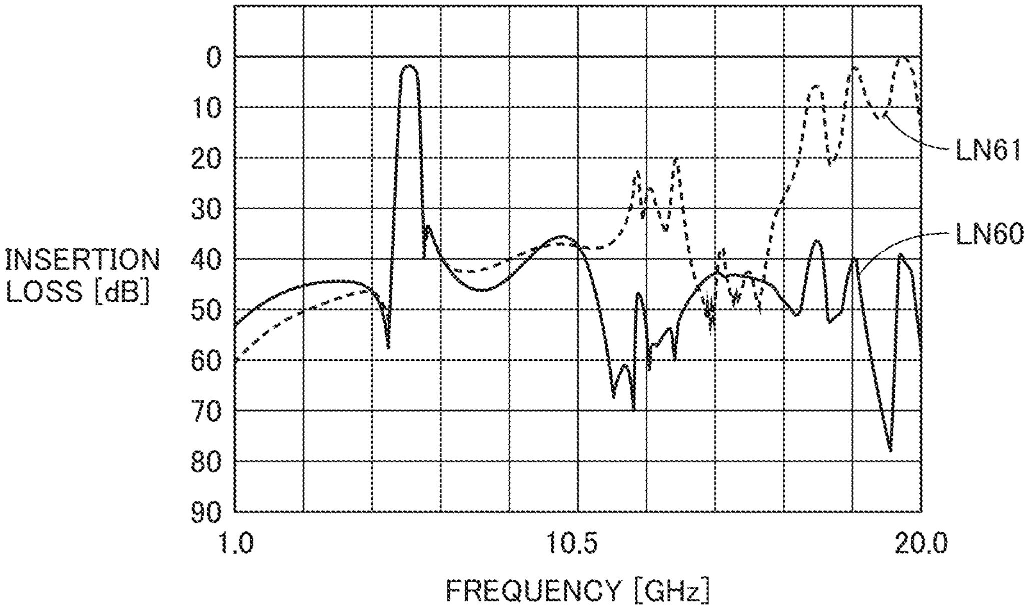
FIG. 32 is a graph showing variability of passband characteristics in the filtering device illustrated in FIG. 30.

FIG. 32 is a graph showing passband characteristics in filtering device 100K illustrated in FIG. 30. In FIG. 32, insertion loss in filtering device 100K of the third example including LPF 510 and LPF 520 is illustrated with a solid line LN60, while insertion loss in a filtering device of a comparative example unequipped with LPF 510 and LPF 520 is illustrated with a broken line LN61. The target passband of filtering device 100K is, for example, a 5 GHz band, while the passband of LPF 510 and LPF 520 is, for example, about 10 GHz or less.

With reference to FIG. 32, insertion loss at the passband of about 5 GHz may be equal or substantially equal between filtering device 100K and the filtering device of the comparative example. In filtering device 100K, any signals exceeding about 10 GHz are certainly blocked by LPF 510 and LPF 520. In particular, filtering device 100K reduces peaks at about 12 GHz and about 16 GHz to about 20 GHz in the comparative example illustrated with broken line LN61.

Thus, by providing, between the resonators and input/output terminals, the lowpass filters that pass signals having frequencies lower than that of any spurious component can successfully eliminate any adverse impacts from spurious components without degrading the passband characteristics.

Eighth Preferred Embodiment

In the earlier preferred embodiments, the input terminal and the output terminal are located on the lower surface side of the multilayer body. In a case in which lateral surfaces of the multilayer body are used to connect to an external device(s) according to required specifications, the input terminal and the output terminal may need to be extended to the upper surface and lateral surfaces of the multilayer body. In this instance, due to an increase of the inductance value at the input/output terminals and an increase of the capacitance value resulting from parasitic capacitance, unwanted resonance modes may occur through these terminals defining as resonator circuits. This may result in the risk of degrading the passband characteristics, particularly in a case of a higher-frequency signal.

An eighth preferred embodiment of the present invention describes a configuration to reduce any unwanted resonance resulting from the input/output terminals in a filtering device including input/output terminals extended to its lateral surfaces.

Figure 33:
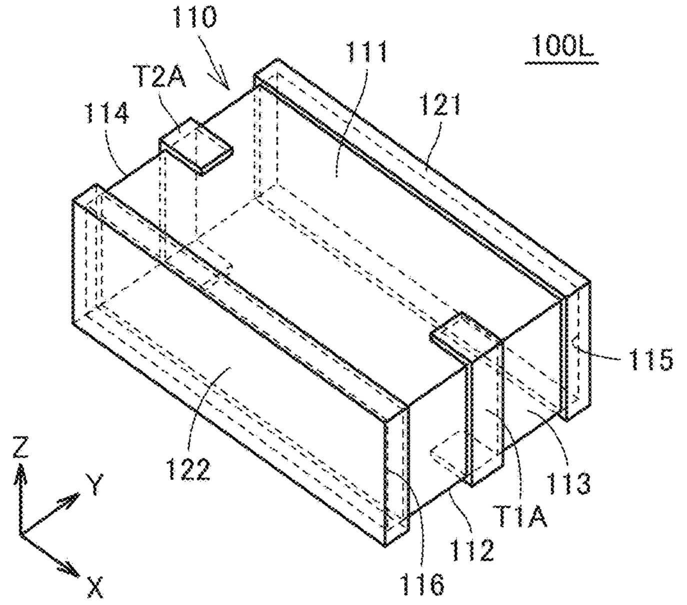
FIG. 33 is an external perspective view of a filtering device according to an eighth preferred embodiment of the present invention.

FIG. 33 is an external perspective view of a filtering device 100L according to the eighth preferred embodiment. Filtering device 100L includes an input terminal T1A and an output terminal T2A, instead of input terminal T1 and output terminal T2 on lower surface 112 of multilayer body 110 of filtering device 100 illustrated in FIG. 2. Any other structural elements of this filtering device the same as or similar to those of filtering device 100 will not be described again.

In filtering device 100L, input terminal T1A has a C shape so as to extend from lower surface 112 as far as upper surface 111 through lateral surface 113 of multilayer body 110. Similarly, output terminal T2A has a C shape so as to extend from lower surface 112 as far as upper surface 111 through lateral surface 114 of multilayer body 110.

Figure 34:
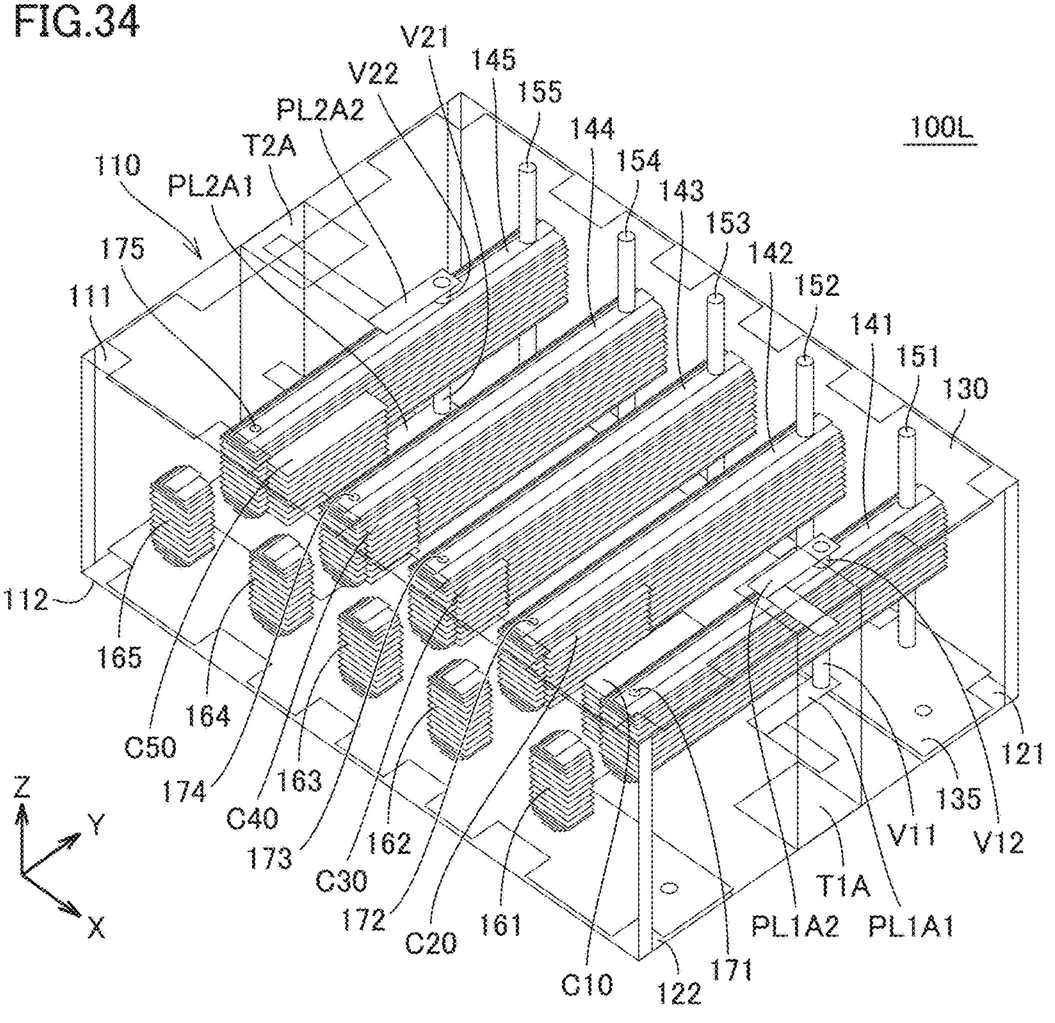
FIG. 34 is a perspective view that illustrates the internal structure of the filtering device illustrated in FIG. 33.

FIG. 34 is a perspective view that illustrates the internal structure of filtering device 100L illustrated in FIG. 33. The configuration of the path extending from the input/output terminal to the resonator in filtering device 100L of FIG. 34 is different from that in filtering device 100 of FIG. 3 in accordance with changes to input terminal T1 and output terminal T2.

To be specific, resonator 141 is connected to an electrode on lateral surface 113 of input terminal T1A through a plate electrode PL1A1 and via V11 connected to a lowermost one of the conductors of resonator 141. Also, resonator 141 is connected to the electrode on lateral surface 113 of input terminal T1A through a plate electrode PL1A2 and via V12 connected to an uppermost one of the conductors of resonator 141. Resonator 141 is connected to input terminal T1A in two different paths.

Resonator 145 on the output side is similarly connected to output terminal T2A in a path through a plate electrode PL2A1 and via V21 connected to a lowermost one of the conductors and in a path through a plate electrode PL2A2 and via V22 connected to an uppermost one of the conductors.

Figure 35:
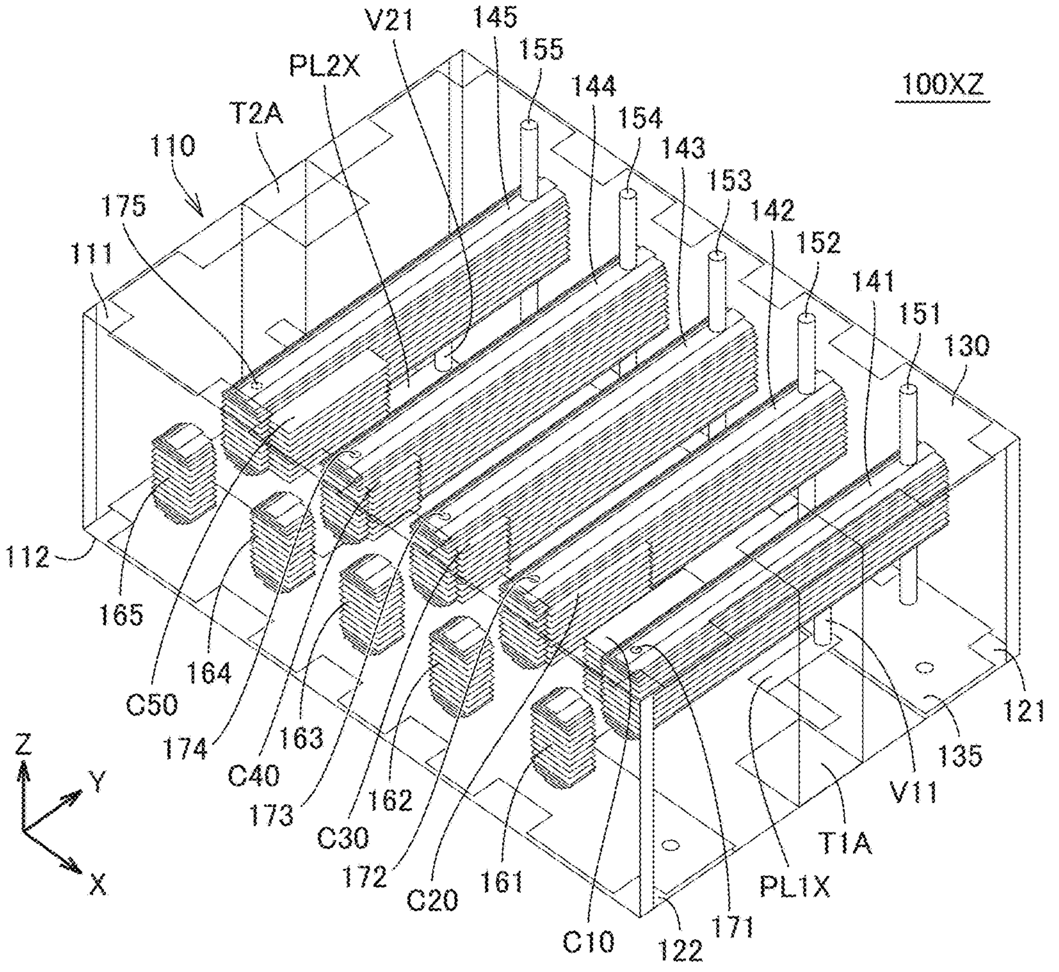
FIG. 35 is a perspective view that illustrates the internal structure of a filtering device according to a comparative example.

FIG. 35 is a perspective view that illustrates the internal structure of a filtering device 100XZ according to a comparative example. In filtering device 100XZ, the input/output terminals are extended to the upper surface and lateral surfaces similarly to filtering device 100L. However, the input/output terminals and resonators are connected in one path.

As with filtering devices 100L and 100XZ, the extended input/output terminals may be likely to increase inductance values of the terminals and also increase parasitic capacitance generated between adjacent shield conductors 121 and 122. This may lower the resonance frequency of the resonator circuit resulting from the input/output terminals than in filtering device 100 of the first preferred embodiment, possibly causing poles generated by unexpected resonation of the resonator circuits to overlap with the passband of the filtering device. As a result, unwanted attenuation may occur in a portion of the passband of the filtering device, which may possibly result in poor filtering characteristics.

In filtering device 100XZ of the comparative example illustrated in FIG. 35, resonator 141 and input terminal T1A, and resonator 145 and output terminal T2A are respectively connected to each other in one path PL1X and PL2X. Thus, inductance in this path may be serially connected to the input/output terminals. In filtering device 100L of the eighth preferred embodiment, on the other hand, resonator 141 and input terminal T1A, and resonator 145 and output terminal T2A are respectively connected in parallel to each other in two different paths. As a result of this connection, the inductance generated at the input/output terminals may have smaller values than in filtering device 100XZ of the comparative example. Thus, the frequency in any unwanted resonance mode of the resonator circuit resulting from the input/output terminals may be thus increased to a higher frequency than in the comparative example. This may reduce the risk of the poles in any unexpected resonance mode of the resonator circuits to overlap with the passband of the filtering device.

In the filtering device in which the input/output terminals are extended from the lower surface to the upper surface and lateral surfaces in the multilayer body, two or more paths are used to connect the input/output terminals and the resonators. Thus, the frequency of any unexpected resonance generated by the resonator circuit resulting from the input/output terminals may be elevated to higher frequencies, and degradation of the filtering characteristics due to such unexpected resonance can be prevented.

Sixth Modification

In the multilayer body, the input/output terminals to be connected to an external device on its lateral surface(s) of the multilayer body may not necessarily be extended to the upper surface of this body. A sixth modification of a preferred embodiment of the present invention describes control of overlap between the passband and resonance frequency of an unwanted resonator circuit by reducing the length of the input/output terminals to reduce the inductance of the unwanted resonator circuit to smaller values.

Figure 36:
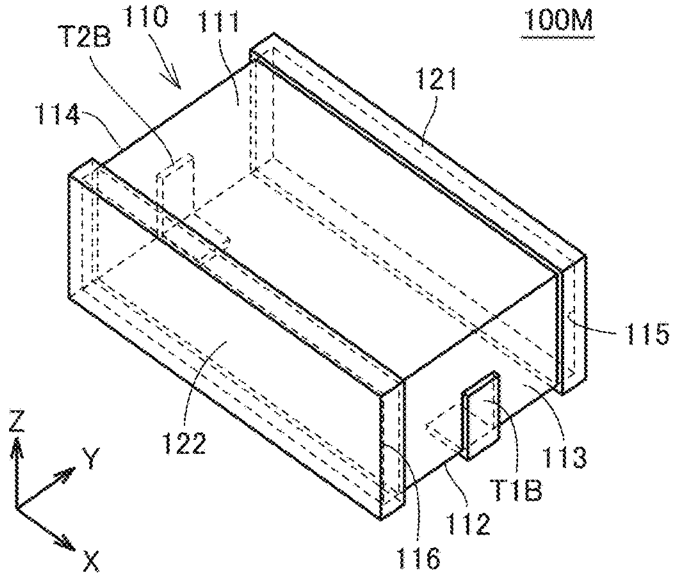
FIG. 36 is an external perspective view of a filtering device according to a sixth modification of a preferred embodiment of the present invention.
Figure 37:
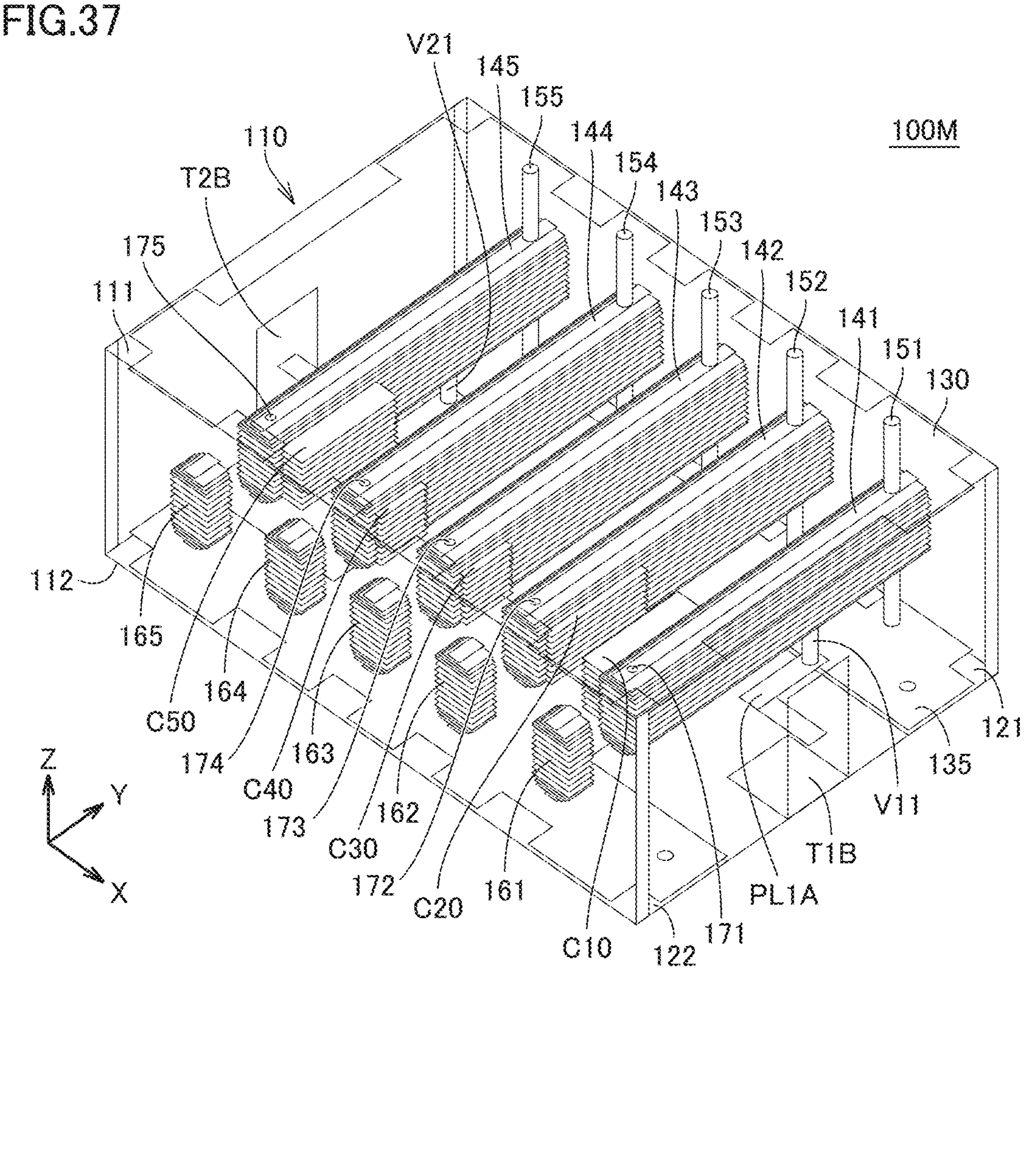
FIG. 37 is a perspective view that illustrates the internal structure of the filtering device according to the sixth modification.

FIGS. 36 and 37 respectively show an external perspective view and a cross-sectional view of a filtering device 100M according to the sixth modification. Filtering device 100M includes, as the input/output terminals, an input terminal T1B extending from lower surface 112 to an intermediate position on lateral surface 113 of multilayer body 110, and an input terminal T2B extending from lower surface 112 to an intermediate position on lateral surface 114 of multilayer body 110. Resonator 141 is connected to a portion of input terminal T1B on the side of lateral surface 113 through plate electrode PL1A and via V11. Resonator 145 is connected to a portion of input terminal T2B on the side of lateral surface 114 through plate electrode PL2A and via V21.

As compared with filtering device 100XZ of the comparative example illustrated in FIG. 35, the frequency of any unexpected resonance generated by the resonator circuit resulting from the input/output terminals may be elevated to higher frequencies by reducing the lengths of the input and output terminals to a minimum required length(s). As a result, degradation of filtering characteristics due to such unexpected resonation can be prevented.

Ninth Preferred Embodiment

A ninth preferred embodiment of the present invention describes improvements of filtering characteristics by decreasing resistance components in paths that connects the input/output terminals to the resonators.

Figure 38:
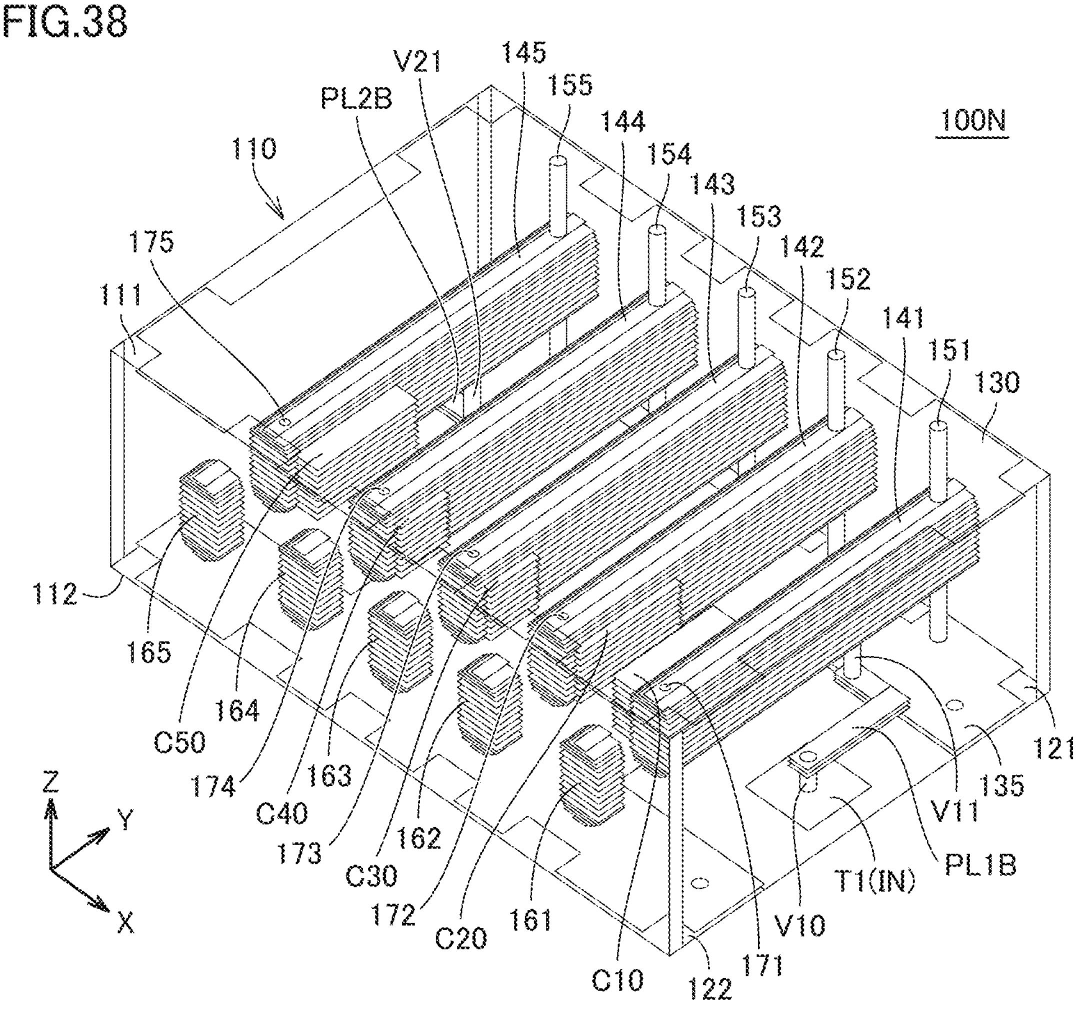
FIG. 38 is a perspective view that illustrates the internal structure of a filtering device according to a ninth preferred embodiment of the present invention.

FIG. 38 is a perspective view that illustrates the internal structure of a filtering device 100N according to the ninth preferred embodiment. In filtering device 100N, plate electrode PL1 in a path that connects input terminal T1 to resonator 141 in filtering device 100 of FIG. 3 has been replaced with a plate electrode PL1B, and plate electrode PL2 in a path that connects output terminal T2 to resonator 141 in filtering device 100 has been replaced with a plate electrode PL2B. Any other structural elements of this filtering device that are the same as or similar to those of filtering device 100, the elements also used in FIG. 3 will not be described again.

Specifically, plate electrodes PL1 and PL2 of filtering device 100 are each a mono-layer electrode, while plate electrodes PL1B and PL2B in this example are each a multi-layered electrode. In the example of FIG. 38, plate electrodes PL1B and PL2B are each a three-layered electrode, for example.

By thus using two or more plate electrodes in a path that connects the input/output terminals to the resonators, resistance components may be decreased as compared with a mono-layer plate electrode, which can improve insertion loss of the filtering device.

Next, a simulation result of adverse impacts on insertion loss that differ with the number of electrode layers in plate electrode PL1B, PL2B is hereinafter described with reference to FIGS. 39A, 39B and FIGS. 40A and 40B. FIGS. 39A, 39B and FIGS. 40A and 40B show a simulation result using a filtering device model including two resonators 141Y and 142Y to simplify the description.

Figure 39A:
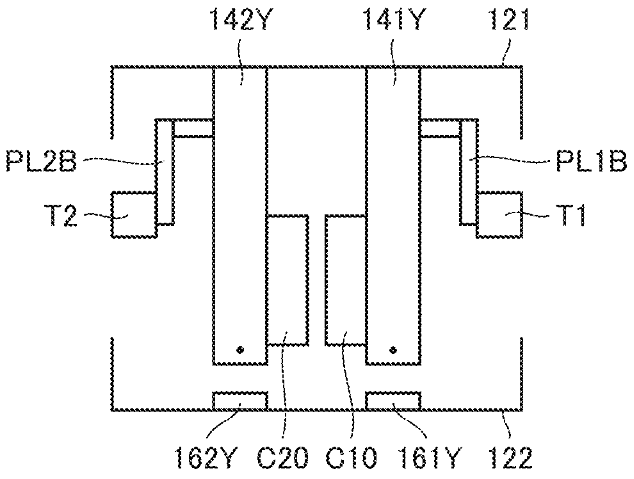
FIGS. 39A and 39B are first drawings that illustrates any impact on filtering characteristics depending on the number of electrodes.
Figure 39B:
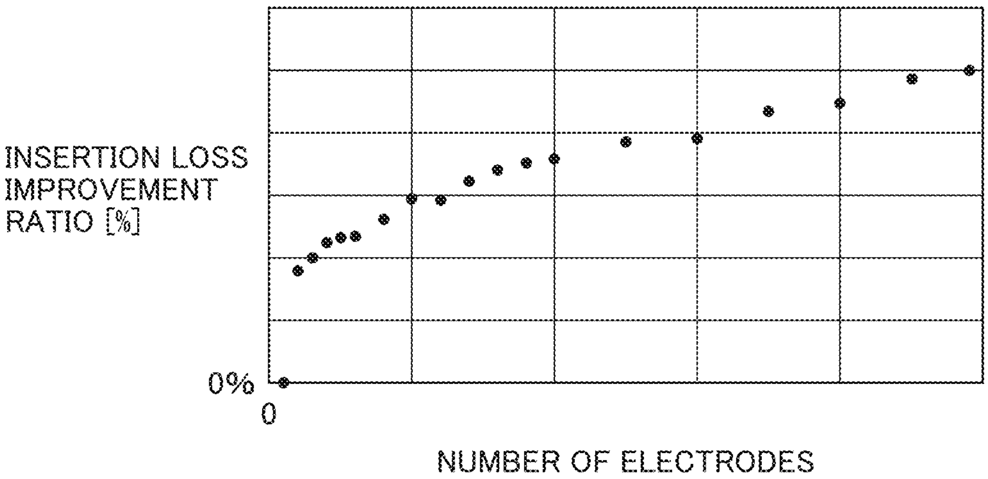
Figure 40A:
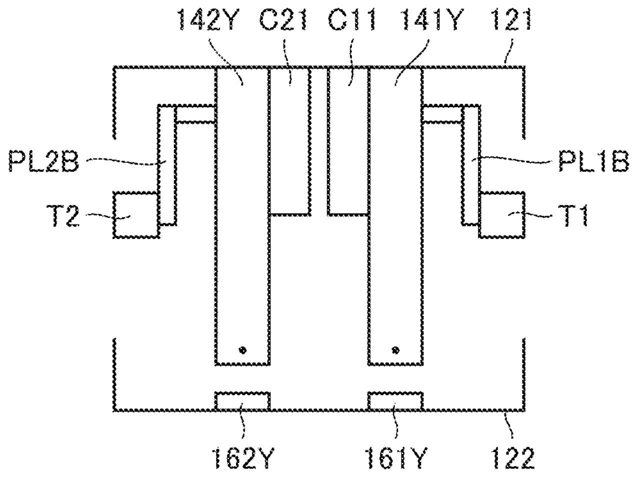
FIGS. 40A and 40B are second drawings that illustrates any impact on filtering characteristics depending on the number of electrodes.
Figure 40B:
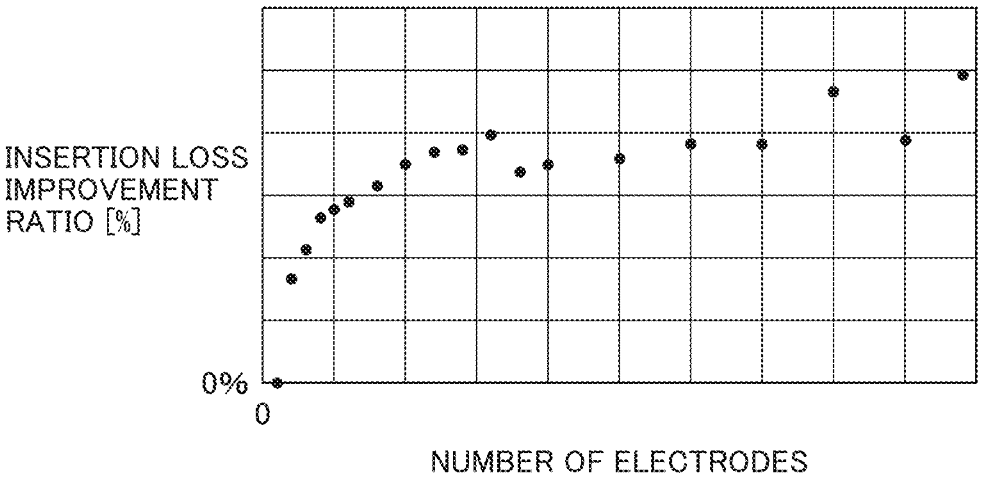

In FIGS. 39A, 39B and FIGS. 40A and 40B, FIGS. 39A and 40A are schematic diagrams of a model used for the simulation, and FIGS. 39B and 40B are graphs of the improvement rate of insertion loss for different numbers of electrodes layers. FIGS. 39A and 39B presents a simulation result obtained when capacitor electrodes C10 and C20 for adjustment of inter-resonator coupling are disposed on the opening-end side of the resonators (closer to capacitor electrodes 161Y, 162Y). FIGS. 40A and 40B show a simulation result when capacitor electrodes C11 and C21 are disposed on the grounding-end side (closer to shield conductor 121) of the resonators.

FIGS. 39A, 39B and FIGS. 40A and 40B both demonstrate a great deal of improvement of insertion loss with a larger number of electrodes layers. Filtering device 100N according to the ninth preferred embodiment may further improve filtering characteristics than filtering device 100 according to the first preferred embodiment.

Tenth Preferred Embodiment

A tenth preferred embodiment of the present invention describes a configuration to reduce adverse impacts on variability during the manufacturing process of shield electrodes.

Figure 41:
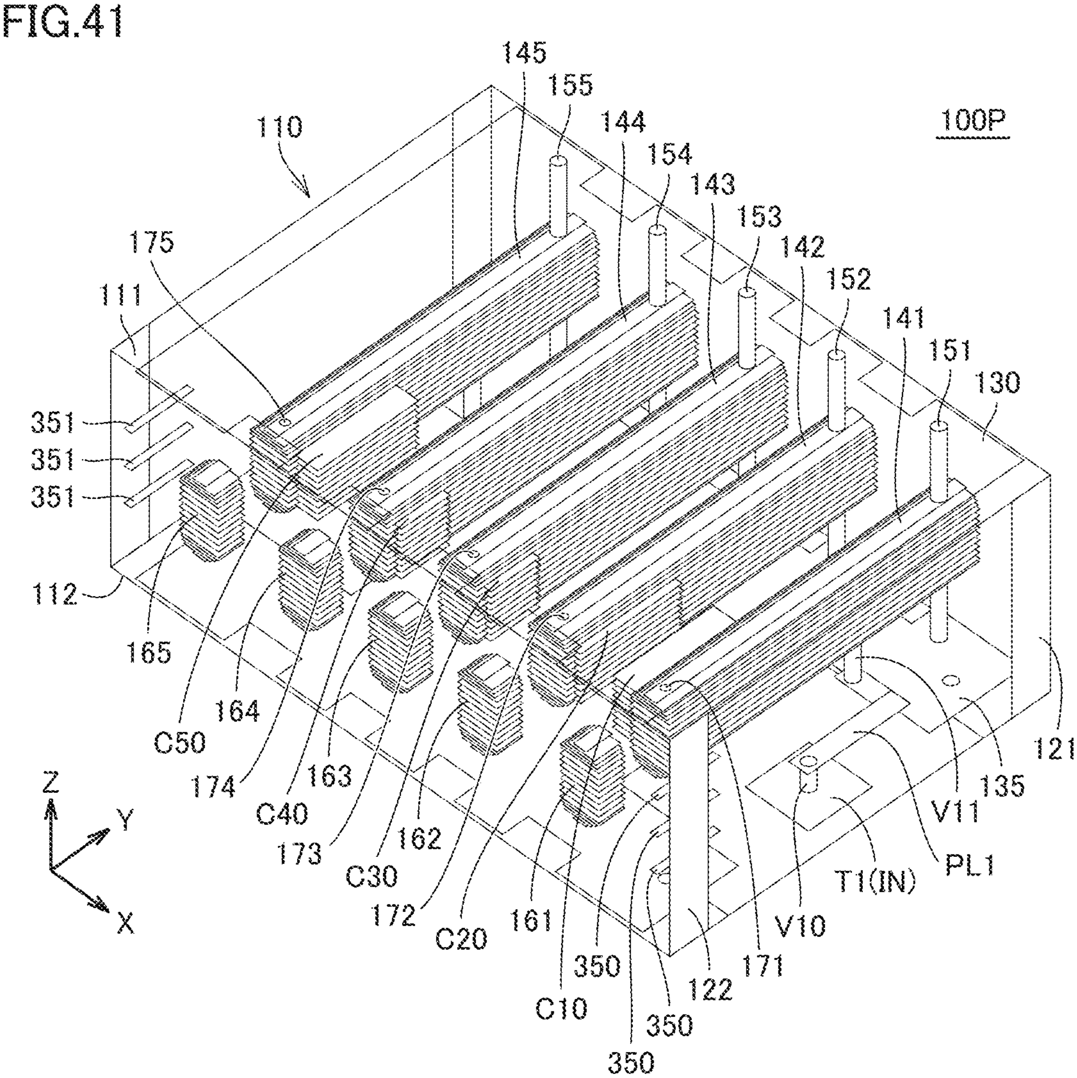
FIG. 41 is a perspective view that illustrates the internal structure of a filtering device according to a tenth preferred embodiment of the present invention.
Figure 42:
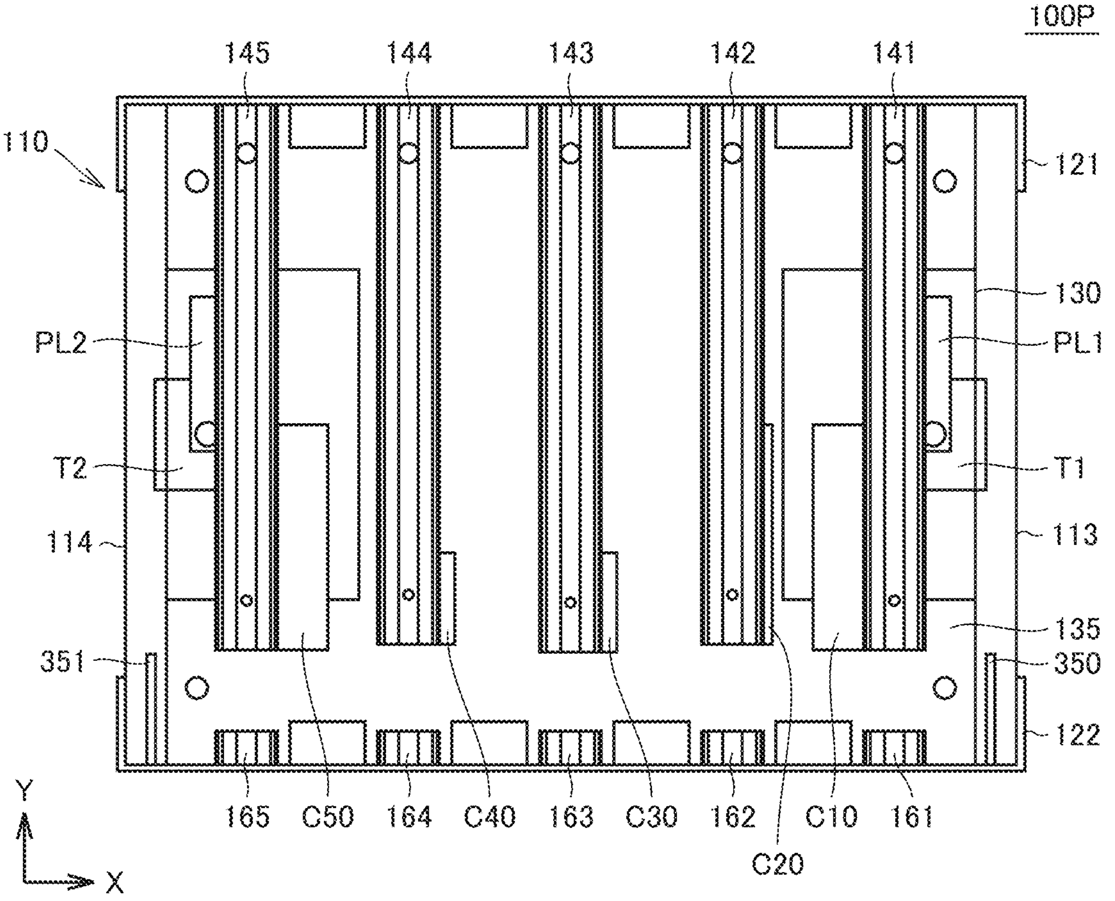
FIG. 42 is a plan view of the filtering device illustrated in FIG. 41.

FIG. 41 is a perspective view that illustrates the internal structure of a filtering device 100P according to the tenth preferred embodiment. FIG. 42 is a plan view of filtering device 100P when viewed from the lamination direction. Filtering device 100P includes, in addition to the structural elements of filtering device 100 of FIG. 3 according to the first preferred embodiment, plate electrodes 350 and 351 extending from shield conductor 122 in the positive direction of Y axis in proximity to lateral surfaces 113 and 114 of multilayer body 110. Any other structural elements of filtering device 100P the same as or similar to those of filtering device 100 will not be described again.

The manufacture of the filtering device described above may be typically completed, by arranging a plurality of filtering elements having the same or similar structure in an array arrangement in the multilayer body of a larger dielectric member and then cutting them into individual pieces. Each of these pieces will be a final product. Accordingly, electrodes for external connection disposed on the outer side of this multilayer body will be provided in each individual piece by printing or dipping, for example. At this time, shield conductors 121 and 122 may be partially provided on lateral surfaces 113 and 114 as well as on lateral surfaces 115 and 116, as illustrated in FIG. 41. In this instance, resonator 141 on the input side and resonator 145 on the output side may produce capacitive coupling with shield conductor 122 disposed on lateral surfaces 113 and 114. Then, the resonance frequencies of resonators 141 and 145 may shift from design resonance frequencies, possibly adversely affecting characteristics of the filtering device.

In multilayer body 110 of filtering device 100P, plate electrode 350 is disposed in proximity to lateral surface 113, while plate electrode 351 is disposed in proximity to lateral surface 114. Plate electrodes 350 and 351 are connected to shield conductor 122 on lateral surface 116 of multilayer body 110. The dimension of plate electrodes 350 and 351 in the Y-axis direction is larger than that of shield conductor 122 provided on lateral surfaces 113 and 114.

Even when shield conductor 122 is structured to extend around lateral surfaces 113 and 114, by disposing plate electrodes 350 and 351 as described above, capacitive coupling may preferably occur between plate electrode 350 and resonator 141 and between plate electrode 351 and resonator 145. In a case in which shield conductor 122 is positionally variable on lateral surfaces 113 and 114, resonators 141 and 145 may have stable resonance frequencies, which can reduce the risk of degrading filtering characteristics.

Figure 43:
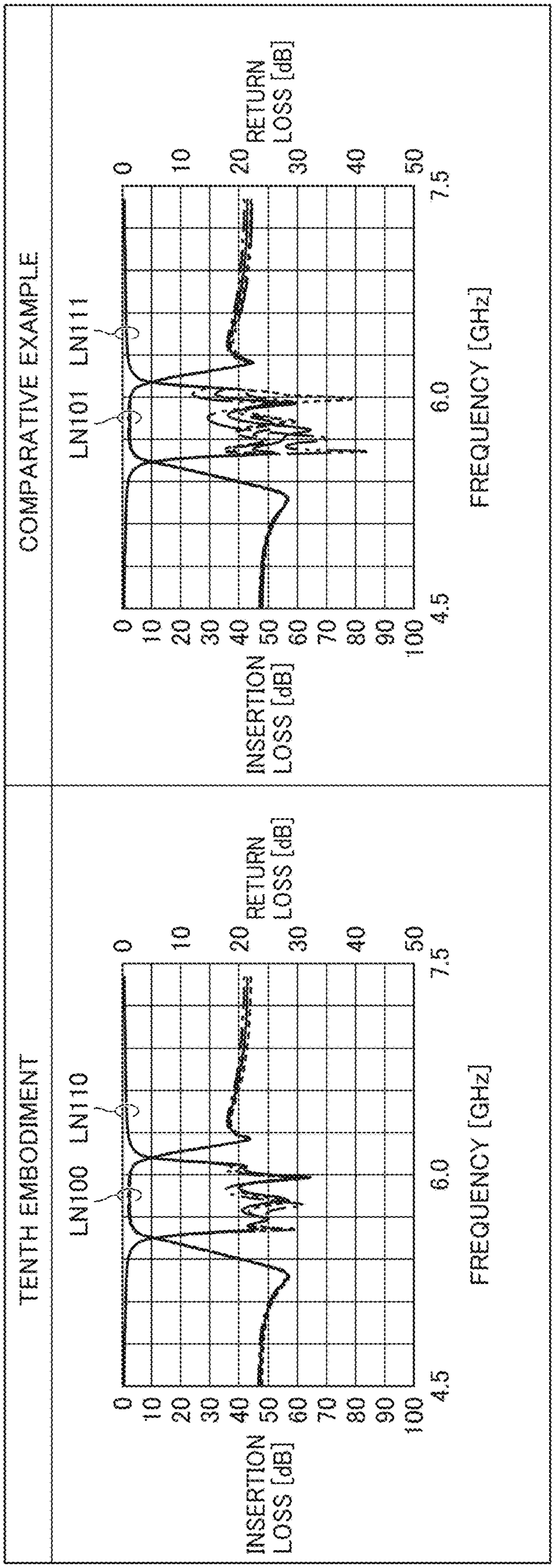
FIG. 43 is a graph showing passband characteristics in the filtering device illustrated in FIG. 41.

FIG. 43 shows graphs in which variability of filtering characteristics is discussed for a production lot of filtering devices including plate electrodes 350 and 351 as described in the tenth preferred embodiment and for a production lot of filtering devices not including plate electrodes 350 and 351. Each graph shows insertion loss of each filtering device (line LN100, LN101) and return loss (line LN110, LN111). As illustrated in FIG. 43, the comparative example exhibits an increase of variability among the filters in regard to return loss in the passband, while the tenth preferred embodiment exhibits a well-balanced stability of return loss.

By disposing the plate electrodes connected to the shield electrodes in proximity to lateral surfaces of the multilayer body along the direction of extension of the resonators, adverse impacts to the filtering characteristics due to the shield electrodes extending around these lateral surfaces can be reduced or prevented.

In the example of FIG. 41, plate electrodes 350 and 351 each include three electrodes, for example. The number of electrodes in plate electrodes 350 and 351 is not limited to this number, and may be appropriately set depending on any desired amount of coupling with the resonators.

Eleventh Preferred Embodiment

An eleventh preferred embodiment of the present invention and seventh to ninth modifications thereof hereinafter describe variations to adjust capacitive coupling between adjacent resonators.

Figure 44:
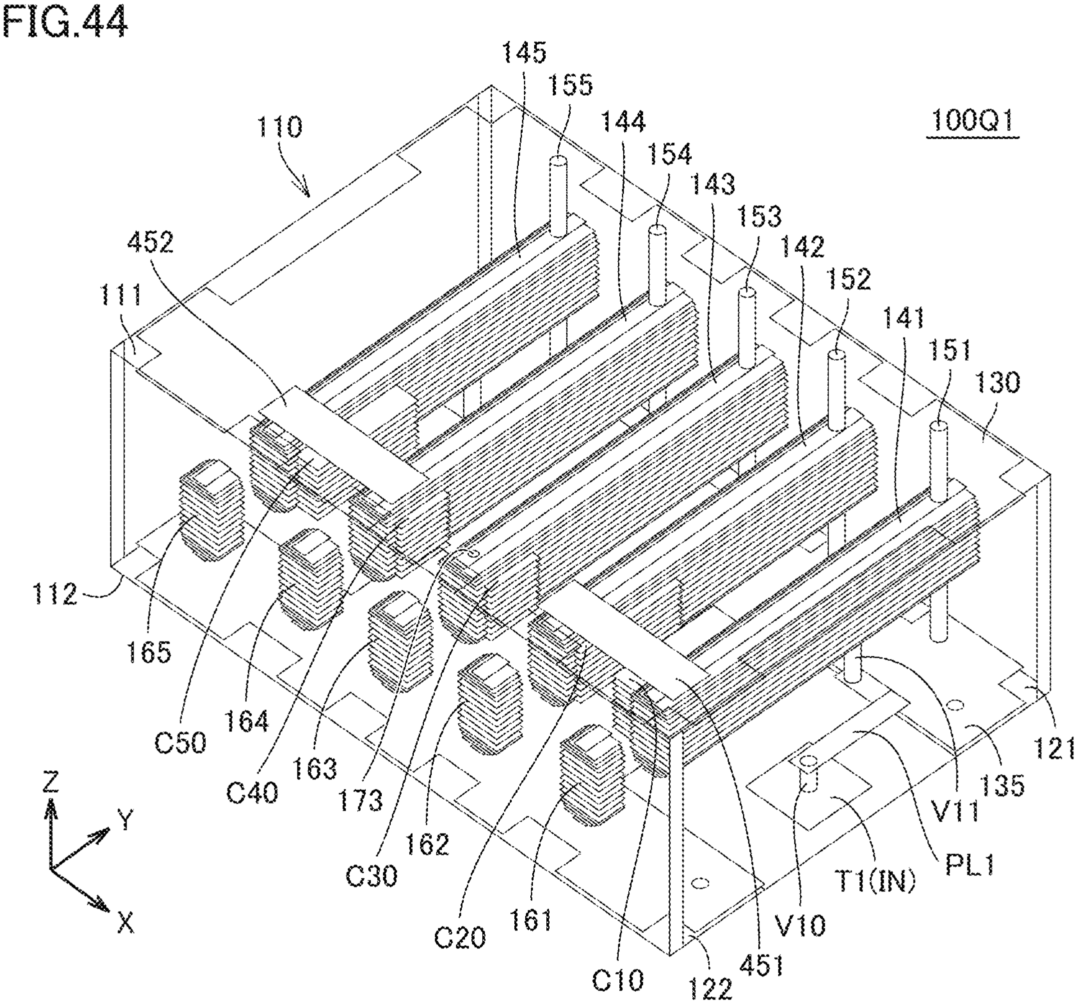
FIG. 44 is a perspective view that illustrates the internal structure of a filtering device according to an eleventh preferred embodiment of the present invention.

FIG. 44 is a perspective view that illustrates the internal structure of a filtering device 100Q1 according to the eleventh preferred embodiment. Filtering device 100Q1 includes, in addition to the structural elements of filtering device 100 illustrated in FIG. 3, plate electrodes 451 and 452. Any other structural elements of filtering device 100Q1 the same as or similar to those of filtering device 100 will not be described again.

With reference to FIG. 44, plate electrode 451 is disposed so as to overlap with resonators 141 and 142 in plan view from the lamination direction of multilayer body 110. Similarly, plate electrode 452 is disposed so as to overlap with resonators 144 and 145 in plan view from the lamination direction of multilayer body 110. In FIG. 44, plate electrodes 451 and 452 are disposed at positions spaced apart and closer to upper surface 111 than the resonators on the opening-end side of the resonators.

As described earlier, capacitive coupling of the resonators may be adjustable by capacitor electrodes C10 to C50 disposed on the resonators, but may also be adjustable by providing plate electrodes 451 and 452. As for plate electrodes 451 and 452, the amount of coupling may be adjustable depending on their distance(s) from the resonator, positions in the Y-axis direction, and area dimension of these electrodes facing the resonators.

In the example illustrated in FIG. 44, plate electrodes 451 and 452 are disposed at positions closer to upper surface 111 than the resonators. Instead of or in addition to this, plate electrodes 451 and 452 may be disposed at positions closer to lower surface 112 than the resonators. Optionally, a plate electrode(s) may be further disposed to adjust the amount of coupling between adjacent ones of the resonators, i.e., between resonators 142 and 143 and/or between resonators 143 and 144.

By thus providing the plate electrodes so that they overlap with adjacent ones of the resonators to adjust the capacitive coupling between the resonators, the filtering characteristics may be adjustable as desired.

Seventh Modification

A seventh modification of a preferred embodiment of the present invention describes a configuration to adjust the amount of coupling between the resonators using vias (columnar members).

Figure 45:
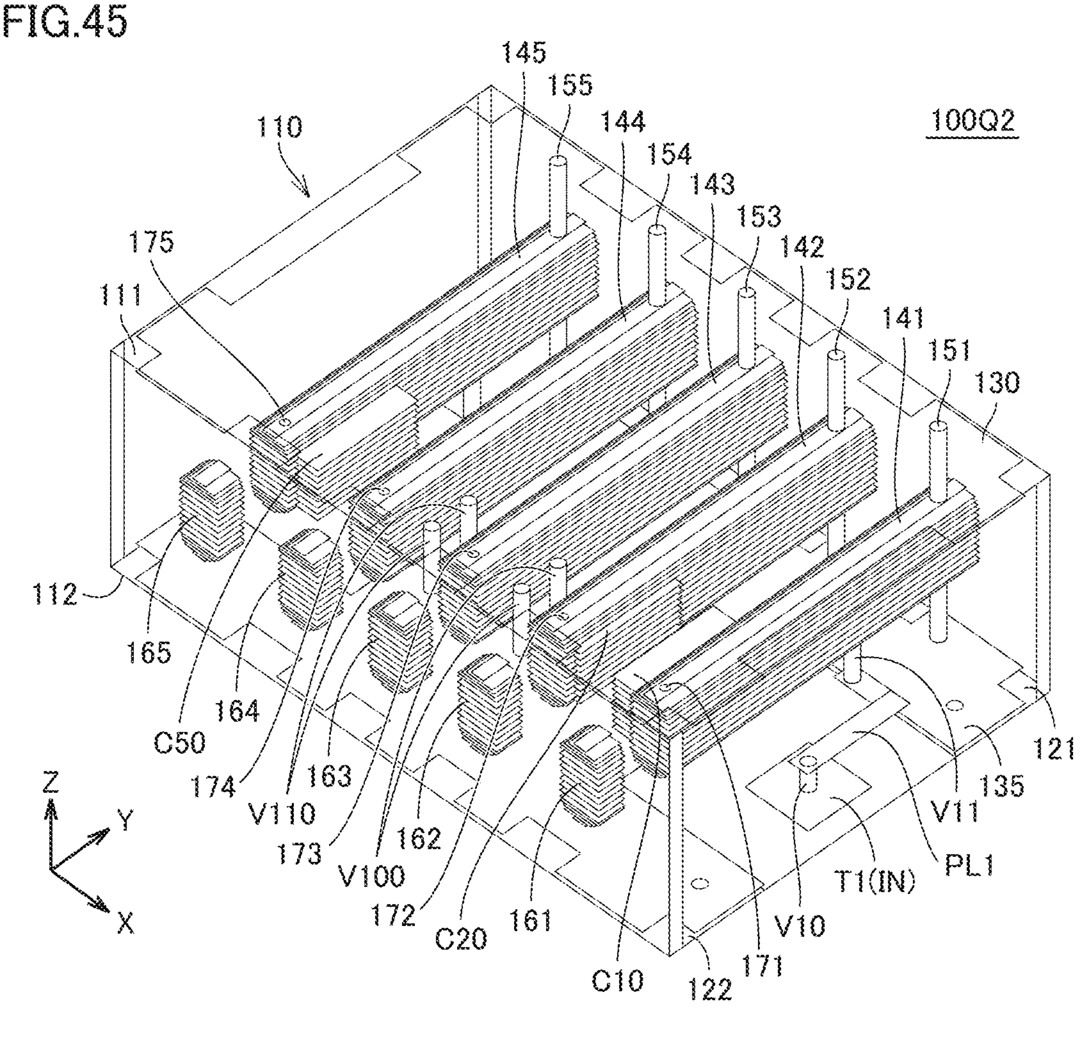
FIG. 45 is a perspective view that illustrates the internal structure of a filtering device according to a seventh modification of a preferred embodiment of the present invention.

FIG. 45 is a perspective view that illustrates the internal structure of a filtering device 100Q2 according to seventh modification. Filtering device 100Q1 includes, in addition to the structural elements of filtering device 100 illustrated in FIG. 3, vias V100 and V110. Any other structural elements of filtering device 100Q2 the same as or similar to those of filtering device 100 will not be described again.

With reference to FIG. 45, filtering device 100Q2 includes via V100 between resonators 142 and 143 and further includes via V110 between resonators 143 and 144.

With reference to FIG. 45, vias V100 and V110 are columnar electrodes that are an electrically conductive material that fill a through hole penetrating through between the dielectric layers. These through holes are filled with an electrically conductive material. In this instance, vias V100 and V110 are connected to plate electrode 130 or plate electrode 135 connected to the ground potential. Vias V100 and V110 thus define and function as shielding members, to weaken the capacitive coupling between the resonators.

Vias V100 and V110 may be formed using any other dielectric material having a dielectric constant that differs from that of the dielectric material of multilayer body 110. The capacitive coupling between the resonators may be strengthened by using any dielectric material having a dielectric constant higher than that of multilayer body 110. The capacitive coupling between the resonators, on the other hand, may be weakened by using any dielectric material having a dielectric constant lower than that of multilayer body 110. Vias V100 and V110 may be hollowed-out vias, for example.

By thus providing the vias made of a suitable material between the resonators to adjust the capacitive coupling between the resonators, the filtering characteristics may be adjustable as desired.

Eighth Modification

An eighth modification of a preferred embodiment of the present invention describes adjustment of the capacitive coupling between the resonators by changing positions of connecting conductors 180 and 181 in filtering device 100A of the second preferred embodiment illustrated in FIG. 11.

Figure 46:
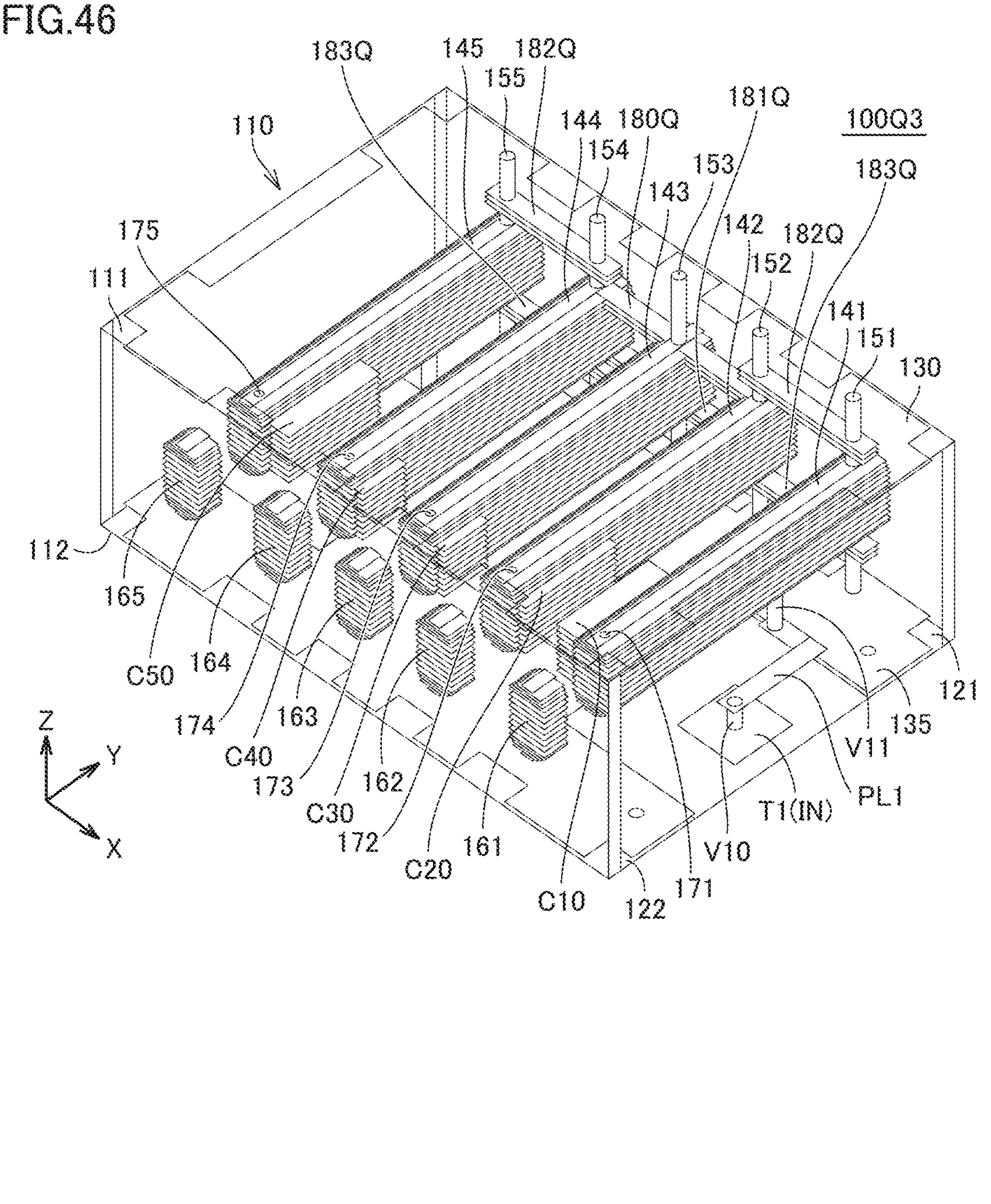
FIG. 46 is a perspective view that illustrates the internal structure of a filtering device according to an eighth modification of a preferred embodiment of the present invention.

FIG. 46 is a perspective view that illustrates the internal structure of a filtering device 100Q3 according to the eighth modification. In filtering device 100Q3, connecting conductors 180 and 181 connecting the resonators at connecting conductors 150 in filtering device 100A of FIG. 11 have been replaced with connecting conductors 180Q to 183Q. In filtering device 100Q3, connecting conductor 180 of filtering device 100A has been replaced with connecting conductor 180Q, 182Q, and connecting conductor 181 of filtering device 100A has been replaced with connecting conductor 181Q, 183Q. Any other structural elements of filtering device 100Q3 the same as or similar to those of filtering device 100A will not be described again.

Referring to FIG. 46, connecting conductor 180Q is used to connect resonators 142, 143 and 144 to one another at positions the same as or similar to connecting conductor 180. Connecting conductor 181Q is used to connect resonators 142, 143 and 144 to one another at positions the same as or similar to connecting conductor 181.

Connecting conductor 182Q connects connecting conductors 151 and 152 and also connects connecting conductors 154 and 155, at positions distant from the resonators and closer to upper surface 111. Connecting conductor 183Q connects connecting conductors 151 and 152 and also connects connecting conductors 154 and 155, at positions distant from the resonators and closer to lower surface 112.

As described in the second preferred embodiment, connecting the conductors of resonators on their ground-end side may strengthen the inductive coupling between the resonators. In filtering device 100Q3 of the eighth modification, connecting conductors 182Q and 183Q are used to connect connecting conductors 150 at positions spaced away from the resonators. This may relatively weaken the degrees of inductive coupling between resonators 141 and 142 and of inductive coupling between resonators 144 and 145, as compared with filtering device 100A of FIG. 11. As a result of that, capacitive coupling between resonators 141 and 142 and capacitive coupling between resonators 144 and 145 can be relatively strengthened, as compared with filtering device 100A.

As described above, capacitive coupling between the resonators may be adjustable by changing distances of the connecting conductors connecting the resonators on their ground-end side.

Ninth Modification

A ninth modification of a preferred embodiment of the present invention describes the adjustment of capacitive coupling by adjusting the degree of overlap between capacitor electrodes in the conductors of two resonators adjacently disposed.

Figure 47:
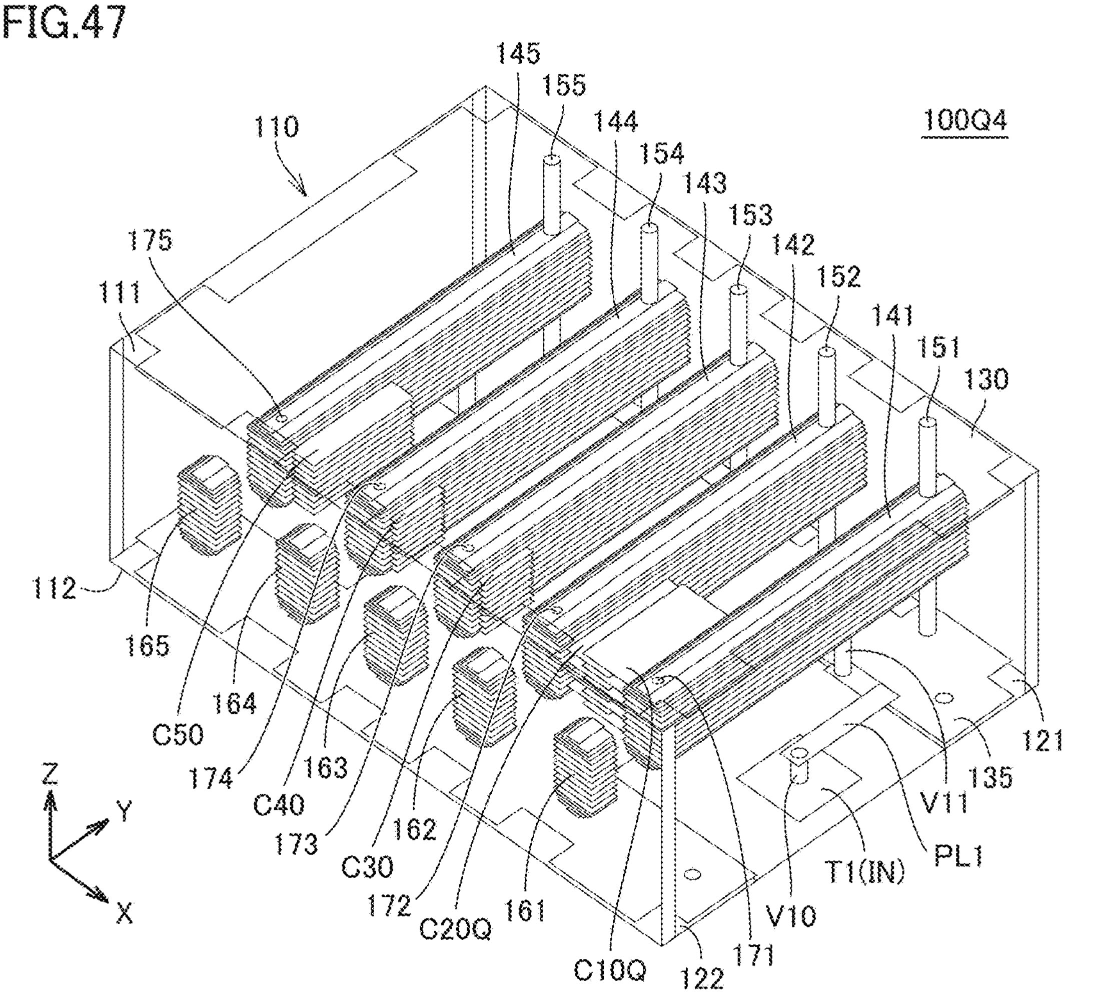
FIG. 47 is a perspective view that illustrates the internal structure of a filtering device according to a ninth modification of a preferred embodiment of the present invention.

FIG. 47 is a perspective view that illustrates the internal structure of a filtering device 100Q4 according to the ninth modification. In filtering device 100Q4, capacitor electrodes C10 and C20 in resonators 141 and 142 of filtering device 100 illustrated in FIG. 3 have been replaced with capacitor electrodes C10Q and C20Q. Any other structural elements of filtering device 100Q4 the same as or similar to those of filtering device 100 will not be described again.

Referring to FIG. 47, capacitor electrode C10Q is disposed so as to protrude from resonator 141 toward resonator 142. Capacitor electrode C20Q is disposed so as to protrude from resonator 142 toward resonator 141. The degrees of protrusion of capacitor electrodes C10Q and C20Q in the X-axis direction is greater than those of capacitor electrodes C10 and C20 of filtering device 100 illustrated in FIG. 3. In plan view from the lamination direction (Z-axis direction) of multilayer body 110, capacitor electrode C10Q and capacitor electrode C20Q partially overlap with each other. This may further strengthen the capacitive coupling between resonators 141 and 142 than in filtering device 100. The capacitive coupling between resonators 141 and 142 may be adjustable by adjusting the degree of overlap between capacitor electrode C10Q and capacitor electrode C20Q.

This structural feature may also be applicable to between resonators 142 and 143, between resonators 143 and 144, and between resonators 144 and 145.

Thus, the capacitive coupling may be successfully adjustable by adjusting the degree of overlap between the capacitor electrodes in the conductors of the resonators.

Twelfth Preferred Embodiment

A twelfth preferred embodiment of the present invention describes variations in the shape of a plurality of conductors defining the resonators.

Figure 48:
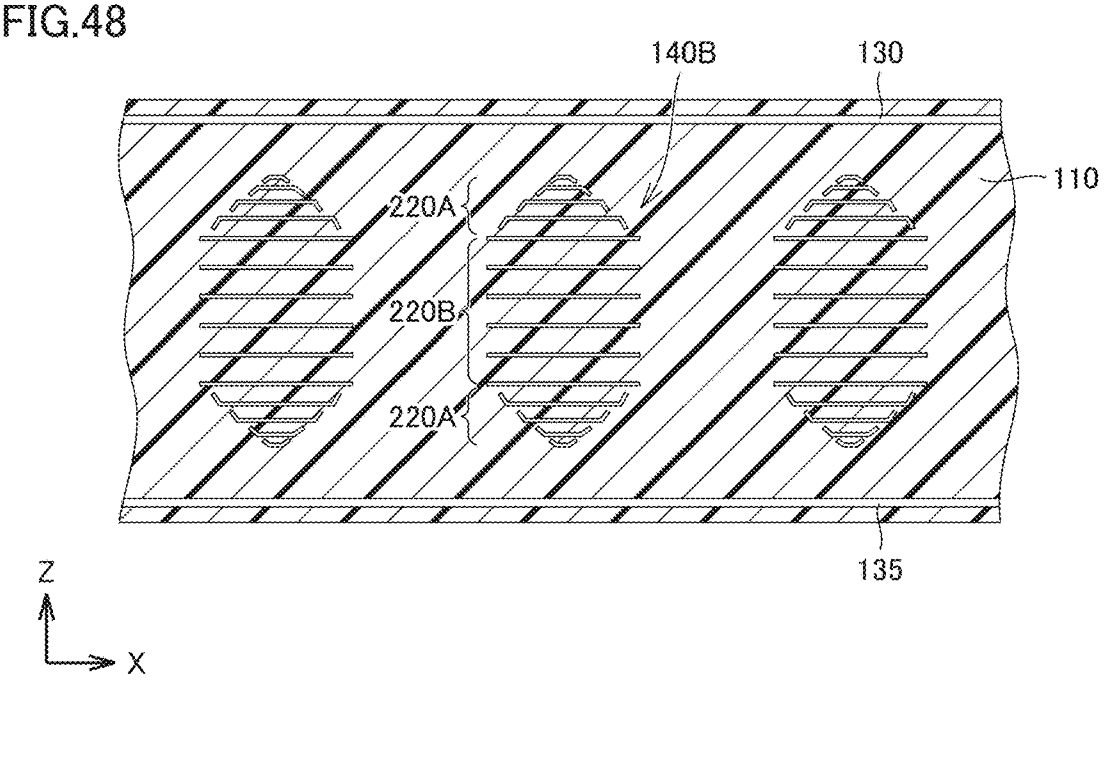
FIG. 48 is a cross-sectional view of a resonator according to a twelfth preferred embodiment of the present invention.

FIG. 48 is a cross-sectional view of a resonator 140B along Z-X plane according to the twelfth preferred embodiment. As described earlier, resonator 140B has, for example, an oval or substantially oval shape in cross section. Resonator 140B includes an electrode 220B with a first width and an electrode 220A with a second width smaller than the first width. Electrode 220A is disposed at a position closer to upper surface 111 or lower surface 112 than electrode 220B. In resonator 140B, both ends of electrode 220A in the direction of width (X-axis direction) are bent toward electrode 220B along the envelope of the resonator's oval or substantially oval shape.

As described earlier, radio frequency electric current tends to flow around ends of a conductor because of the cut-edge effect. Thus, both ends of electrode 220A are bent along the envelope of the resonator's oval or substantially oval shape. This can increase the continuity of conductors along the current flow path, thus reducing resistance components. As a result, current loss may decrease, thus improving insertion loss of the filtering device.

The ends of electrode 220A may be bent in a direction opposite to the direction toward electrode 220B.

Tenth Modification

A tenth modification of a preferred embodiment of the present invention describes electrode 220 with increased thickness in resonator 140B of the twelfth preferred embodiment illustrated in FIG. 48.

Figure 49:
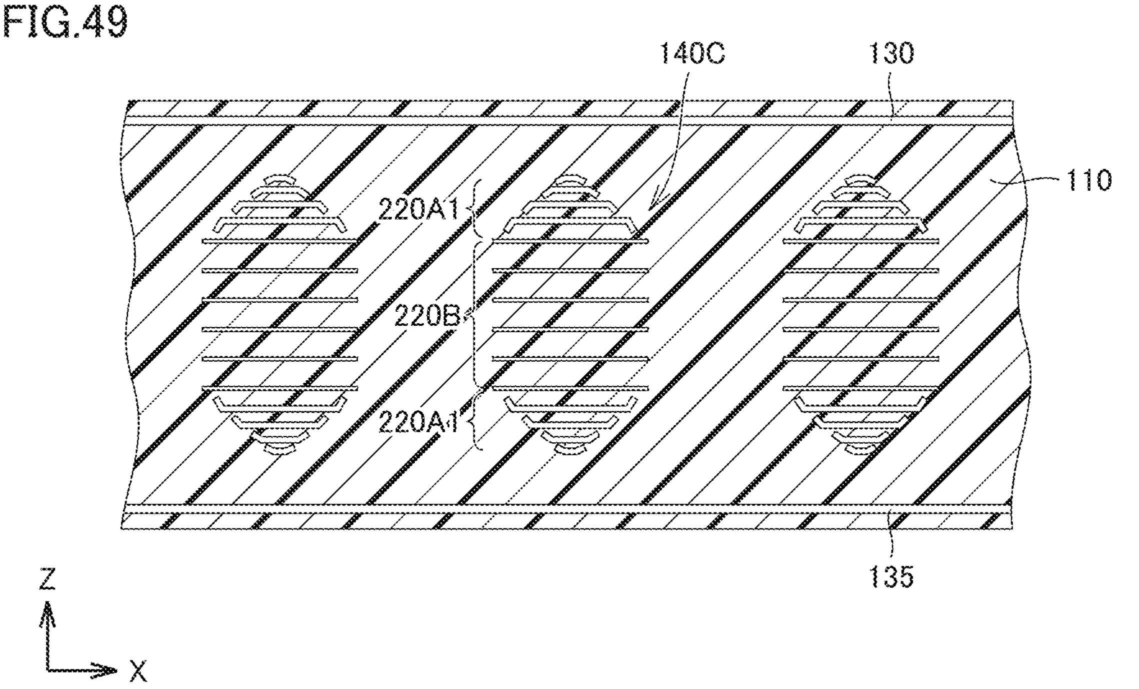
FIG. 49 is a cross-sectional view of a resonator according to a tenth modification of a preferred embodiment of the present invention.

FIG. 49 is a cross-sectional view of a resonator 140C along Z-X plane according to the tenth modification. Resonator 140C includes electrode 220B with a first width and an electrode 220A1 with a second width smaller than the first width. As with electrode 220A, both ends of electrode 220A1 in the direction of width are bent toward electrode 220B along the envelope of the resonator's oval or substantially oval shape. Electrode 220A1 has a greater thickness than electrode 220B.

In view of reduction of current loss, electrode 220B may also preferably be increased in thickness. Increasing thicknesses of all of the electrodes in a resonator may lead to a higher conductor density in the lamination direction. Then, different coefficients of thermal expansion between the dielectric material and the conductor may be likely to cause a structural error(s), such as cracks, during the manufacture. To avoid the risk, electrode 220A that gradually changes in width is increased in thickness. Thus, filtering characteristics can be improved, with a lower risk of structural errors.

Eleventh Modification

An eleventh modification of a preferred embodiment of the present invention describes an improvement of filtering characteristics by structuring the multilayer body to partially have different dielectric constants.

Figure 50:
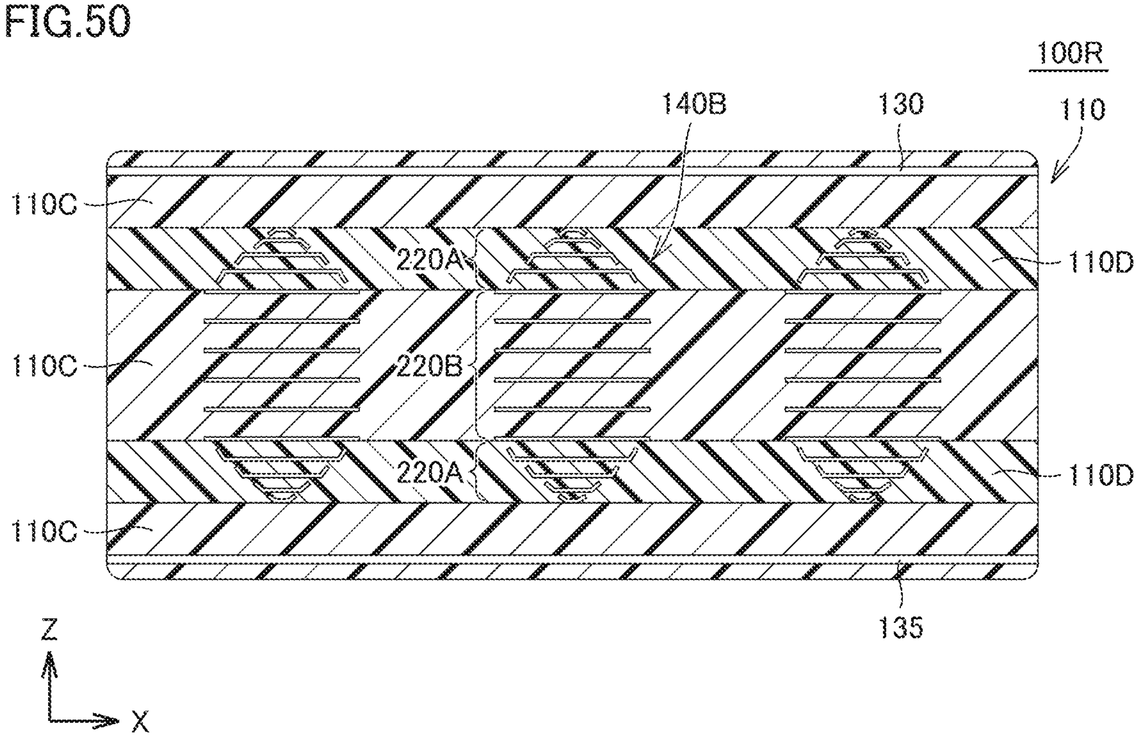
FIG. 50 is a cross-sectional view of a resonator according to an eleventh modification of a preferred embodiment of the present invention.

FIG. 50 is a cross-sectional view of a resonator in a filtering device 100R along Z-X plane according to the eleventh modification. The resonator of filtering device 100R is the same or substantially the same as resonator 140B described in the twelfth preferred embodiment. This resonator includes electrode 220B with a first width and electrode 220A with a second width smaller than the first width. The ends of electrode 220A in the direction of width are bent.

In filtering device 100R, multilayer body 110 includes a dielectric substrate 110C and a dielectric substrate 110D that differ in dielectric constant from each other. More specifically, this multilayer body includes dielectric substrate 110D in a portion where electrode 220A is located and dielectric substrate 110C in a portion where electrode 220B is located and any other portions.

Dielectric substrate 110D mounted with electrode 220A has a dielectric constant lower than that of dielectric substrate 110C. The concentration of electric field on arc-shaped portions of the oval or substantially oval shape in cross section can thus be reduced or prevented, which can improve insertion loss.

While preferred embodiments of the present invention have been described above, it is to be understood that variations and modifications will be apparent to those skilled in the art without departing from the scope and spirit of the present invention. The scope of the present invention, therefore, is to be determined solely by the following claims.

What is claimed is:

1. A dielectric filter comprising:

a multilayer body with a cuboidal shape and including a plurality of dielectric layers;

a first plate electrode and a second plate electrode in the multilayer body, the first plate electrode and the second plate electrode being spaced apart from one another in a lamination direction of the multilayer body;

a plurality of resonators between the first plate electrode and the second plate electrode, the plurality of resonators extending in a first direction orthogonal or substantially orthogonal to the lamination direction;

a first shield conductor and a second shield conductor respectively located on a first lateral surface and a second lateral surface in the multilayer body, the first lateral surface and the second lateral surface being orthogonal or substantially orthogonal to the first direction, the first shield conductor and the second shield conductor being connected to the first plate electrode and the second plate electrode; and a first connecting conductor connecting a first resonator included in the plurality of resonators to the first plate electrode and the second plate electrode; wherein the plurality of resonators are arranged side by side in a second direction orthogonal or substantially orthogonal to both of the lamination direction and the first direction in the multilayer body;

first ends of the plurality of resonators are connected to the first shield conductor;

second ends of the plurality of resonators are spaced away from the second shield conductor; and a diameter of the first connecting conductor inside the first resonator is smaller than a diameter of the first connecting conductor outside the first resonator.

2. The dielectric filter according to claim 1, wherein the first connecting conductor is provided on a side closer to the first end of the first resonator than to the second end of the first resonator.

3. The dielectric filter according to claim 2, wherein the first connecting conductor includes a plurality of via conductors electrically connected to each other; and the plurality of via conductors are provided in a zigzag arrangement in the lamination direction.

4. The dielectric filter according to claim 2, wherein the first connecting conductor includes a plurality of via conductors including a first via conductor and a second via conductor, the first via conductor and the second via conductor having values of Young's modulus that differ from each other; and the first via conductor and the second via conductor are alternately arranged in the lamination direction.

5. The dielectric filter according to claim 4, wherein the first via conductor has a tapered shape with a diameter that decreases progressively in a direction from the first plate electrode toward the second plate electrode; and the second via conductor has a tapered shape with a diameter that decreases progressively in a direction from the second plate electrode toward the first plate electrode.

6. The dielectric filter according to claim 1, wherein the plurality of resonators include a plurality of conductors extending in the first direction and arranged in the lamination direction.

7. The dielectric filter according to claim 6, wherein at least a portion of the plurality of conductors includes an aperture in plan view from the lamination direction.

8. The dielectric filter according to claim 6, further comprising:

a second connecting conductor on a side closer to the second ends of the plurality of resonators than to the first ends of the plurality of resonators; wherein the second connecting conductor electrically connects the plurality of conductors to each other.

9. The dielectric filter according to claim 8, wherein $\lambda$ is a wavelength of a radio frequency signal transmitted by the dielectric filter; and a distance in the first direction between the second end of the first resonator and the first connecting conductor of the plurality of resonators is approximately $\lambda/4$.

10. The dielectric filter according to claim 8, wherein the second connecting conductor includes a plurality of via conductors electrically connected to each other; and the plurality of via conductors are provided in a zigzag arrangement in the lamination direction.

11. The dielectric filter according to claim 8, wherein the second connecting conductor includes a plurality of via conductors including a first via conductor and a second via conductor, the first via conductor and the second via conductor having values of Young's modulus that differ from each other; and the first via conductor and the second via conductor are alternately arranged in the lamination direction.

12. The dielectric filter according to claim 6, wherein the plurality of conductors include a first conductor with a first width and a second conductor with a second width that differs from the first width.

13. The dielectric filter according to claim 12, wherein the multilayer body includes a third substrate with a third dielectric constant and a fourth substrate with a fourth dielectric constant lower than the third dielectric constant;

the first conductor is provided on the third substrate; and the second conductor is provided on the fourth substrate.

14. The dielectric filter according to claim 12, wherein an end of the second conductor in the second direction is bent toward the first conductor.

15. The dielectric filter according to claim 14, wherein the second conductor has a thickness in the lamination direction greater than a thickness of the first conductor in the lamination direction.

16. The dielectric filter according to claim 1, further comprising:

a third connecting conductor connecting the plurality of resonators to each other; wherein the third connecting conductor is connected to a side closer to the first ends of the plurality of resonators than to the second ends of the plurality of resonators.

17. The dielectric filter according to claim 16, wherein the third connecting conductor is partially provided at a position spaced away from the plurality of resonators.

18. The dielectric filter according to claim 1, wherein the plurality of resonators each include the first connecting conductor.

19. The dielectric filter according to claim 1, further comprising a capacitor electrode facing the second end of the first resonator and connected to the second shield conductor.

20. The dielectric filter according to claim 1, wherein the multilayer body includes a first substrate having a first dielectric constant and a second substrate having a second dielectric constant higher than the first dielectric constant.

21. The dielectric filter according to claim 20, wherein the plurality of resonators are provided on the first substrate.

22. The dielectric filter according to claim 20, wherein the plurality of resonators are provided on the second substrate.

23. A multiplexer comprising:

a first filter with a first passband; and a second filter with a second passband that differs from the first passband; wherein the first filter and the second filter are each defined by the dielectric filter according to claim 1.

24. The dielectric filter according to claim 1, wherein the first plate electrode and the second plate electrode each have a mesh structure.

25. The dielectric filter according to claim 1, further comprising:

a resonator circuit connected to at least one of the plurality of resonators; wherein the resonator circuit has a resonance frequency set to a frequency adjusted to a spurious component generated in the dielectric filter.

26. The dielectric filter according to claim 1, further comprising:

an input terminal to receive a radio frequency signal;

an output terminal to output a signal passing through each of the plurality of resonators; and a resonator circuit connected to at least one of the input terminal and the output terminal; wherein the resonator circuit has a resonance frequency set to a frequency adjusted to a spurious component generated in the dielectric filter.

27. The dielectric filter according to claim 1, further comprising:

an input terminal to receive a radio frequency signal;

an output terminal to output a signal passing through the plurality of resonators; and a lowpass filter connected to at least one of signal paths, the signal paths including:

a signal path connecting the input terminal to the plurality of resonators; and a signal path connecting the output terminal to the plurality of resonators; wherein the lowpass filter is configured to pass a signal having a lower frequency than a spurious component generated in the dielectric filter therethrough.

28. The dielectric filter according to claim 1, further comprising:

an input terminal to receive a radio frequency signal; and an output terminal to output a signal passing through the plurality of resonators; wherein the input terminal and the output terminal each extend from a lower surface to an upper surface through a lateral surface of the multilayer body; and the input terminal and the output terminal are each connected to the plurality of resonators in two signal paths.

29. The dielectric filter according to claim 1, further comprising:

an input terminal to receive a radio frequency signal;

an output terminal to output a signal passing through the plurality of resonators; and a third plate electrode on a signal path connecting each of the input terminal and the output terminal to the plurality of resonators; wherein the third plate electrode includes conductors in a plurality of layers of the multilayer body.

30. The dielectric filter according to claim 1, wherein the multilayer body includes a third lateral surface and a fourth lateral surface along the first direction; and the dielectric filter further comprises:

a fourth plate electrode in proximity to and along the third lateral surface, the fourth plate electrode being connected to the second shield conductor; and a fifth plate electrode in proximity to and along the fourth lateral surface, the fifth plate electrode being connected to the second shield conductor.

31. The dielectric filter according to claim 1, further comprising a sixth plate electrode overlapping with two adjacent ones of the plurality of resonators in plan view from the lamination direction of the multilayer body.

32. The dielectric filter according to claim 1, further comprising a column between two adjacent ones of the plurality of resonators.

33. The dielectric filter according to claim 1, wherein the plurality of resonators include a second resonator adjacent to the first resonator;

the first resonator includes a first electrode protruding toward the second resonator;

the second resonator includes a second electrode protruding toward the first resonator; and the first electrode partially overlaps with the second electrode in plan view from the lamination direction of the multilayer body.

* * * * *